US008480002B2

(12) United States Patent
Poidomani et al.

(10) Patent No.: US 8,480,002 B2
(45) Date of Patent: Jul. 9, 2013

(54) CONDUCTING A TRANSACTION WITH AN ELECTRONIC CARD

(76) Inventors: Mark Poidomani, Windemere, FL (US); Joan Ziegler, Tiburon, CA (US); Eric Foo, Thousand Oaks, CA (US); Ziv Alon, Newbury Park, CA (US); Charles McGuire, Newbury Park, CA (US); Lawrence Routhenstein, Ocoee, FL (US)

(*) Notice: Subject to any disclaimer, the term of this patent is extended or adjusted under 35 U.S.C. 154(b) by 0 days.

(21) Appl. No.: 13/448,266

(22) Filed: Apr. 16, 2012
(Under 37 CFR 1.47)

(65) Prior Publication Data

US 2012/0234927 A1 Sep. 20, 2012

Related U.S. Application Data

(63) Continuation of application No. 13/102,991, filed on May 6, 2011, now Pat. No. 8,231,063, which is a continuation of application No. 12/726,868, filed on Mar. 18, 2010, now Pat. No. 7,954,724, which is a continuation of application No. 11/413,595, filed on Apr. 27, 2006, now abandoned, which is a continuation-in-part of application No. 11/391,719, filed on Mar. 27, 2006, now abandoned.

(60) Provisional application No. 60/675,388, filed on Apr. 27, 2005, provisional application No. 60/594,300, filed on Mar. 26, 2005.

(51) Int. Cl.
*G06K 19/06* (2006.01)
*G06K 7/08* (2006.01)

(52) U.S. Cl.
USPC .......... 235/492; 235/380; 235/449; 235/451; 235/493

(58) Field of Classification Search
USPC ................ 235/375, 380, 449, 451, 486, 492, 235/493, 450
See application file for complete search history.

(56) References Cited

U.S. PATENT DOCUMENTS

| | | | |
|---|---|---|---|
| 4,353,064 | A | 10/1982 | Stamm |
| 4,394,654 | A | 7/1983 | Hoffmann-Cerfontaine |
| 4,529,870 | A | 7/1985 | Chaum |
| 4,614,861 | A | 9/1986 | Pavlov et al. |
| 4,667,087 | A | 5/1987 | Quintana |
| 4,701,601 | A | 10/1987 | Francini et al. |

(Continued)

FOREIGN PATENT DOCUMENTS

| | | |
|---|---|---|
| WO | WO9852735 | 11/1998 |
| WO | WO0247019 A1 | 6/2002 |
| WO | WO2006105092 | 10/2006 |
| WO | WO2006116772 | 11/2006 |

*Primary Examiner* — Tuyen K Vo

(74) *Attorney, Agent, or Firm* — Roy L Anderson; Wagner, Anderson & Bright, P.C.

(57) ABSTRACT

An apparatus and process for conducting a transaction with an electronic card that dynamically generates transaction specific data determines whether the transaction is being conducted with a smart card reader or with a magnetic stripe reader. A smart card reader mode is activated if the transaction is being conducted with a smart card reader; a magnetic stripe reader mode is activated if the transaction is being conducted with a magnetic stripe reader. The electronic card is activated from a reduced power mode to a full power mode after either the smart card reader mode or the magnetic stripe reader mode is activated and the dynamic field of data is not generated until the full power mode is activated.

20 Claims, 42 Drawing Sheets

EEPROM or Secure RAM
RAM
RAM
RAM
ISO7816
M1 (Proprietary Security)
Internal Bus
M2 Operations Signal Generation
User I/O
Power
Display
Swipe Activators
Output Signals
RC Signal Conversion
RCAC
Track 1
Track 2
BS
Transaction Sensor
Broadcaster
Sensor 2
F

U.S. PATENT DOCUMENTS 4,720,860 A 1/1988 Weiss
4,786,791 A 11/1988 Hodama
4,791,283 A 12/1988 Burkhardt
4,797,542 A 1/1989 Hara
5,038,251 A 8/1991 Sugiyama et al.
5,168,520 A 12/1992 Weiss
5,237,614 A 8/1993 Weiss
5,272,596 A 12/1993 Honore
5,276,311 A 1/1994 Hennige
5,347,580 A 9/1994 Molva et al.
5,361,062 A 11/1994 Weiss et al.
5,412,199 A 5/1995 Finkelstein et al.
5,434,398 A * 7/1995 Goldberg ..................... 235/380
5,434,405 A 7/1995 Finkelstein et al.
5,478,994 A 12/1995 Rahman et al.
5,479,512 A 12/1995 Weiss
5,484,997 A 1/1996 Haynes
5,485,519 A 1/1996 Weiss
5,585,787 A 12/1996 Wallerstein
5,591,949 A 1/1997 Bernstein
5,608,203 A 3/1997 Finkelstein et al.
5,623,552 A 4/1997 Lane
5,657,388 A 8/1997 Weiss
5,748,737 A 5/1998 Daggar
5,834,756 A 11/1998 Gutman et al.
5,856,661 A 1/1999 Finkelstein et al.
5,864,623 A 1/1999 Messina et al.
5,907,142 A 5/1999 Kelsey
5,913,203 A 6/1999 Wong et al.
5,937,394 A 8/1999 Wong et al.
5,955,021 A 9/1999 Tiffany, III
5,956,699 A 9/1999 Wong et al.
6,025,054 A 2/2000 Tiffany, III
6,045,043 A 4/2000 Bashan et al.
6,068,193 A * 5/2000 Kreft ............................ 235/492
6,076,163 A 6/2000 Hoffstein et al.
6,085,320 A 7/2000 Kaliski, Jr.
6,095,416 A 8/2000 Grant et al.
6,130,621 A 10/2000 Weiss
6,145,079 A 11/2000 Mitty et al.
6,157,920 A 12/2000 Jakobsson et al.
6,161,181 A 12/2000 Haynes, III et al.
6,163,771 A 12/2000 Walker et al.
6,176,430 B1 1/2001 Finkelstein et al.
6,182,894 B1 2/2001 Hackett et al.
6,189,098 B1 2/2001 Kaliski, Jr.
6,199,052 B1 3/2001 Mitty et al.
6,206,293 B1 3/2001 Gutman et al.
6,240,184 B1 5/2001 Huynh et al.
6,241,153 B1 6/2001 Tiffany, III
6,256,873 B1 7/2001 Tiffany, III
6,269,163 B1 7/2001 Rivest et al.
6,286,022 B1 9/2001 Kaliski, Jr. et al.
6,313,724 B1 11/2001 Osterweil
6,323,770 B1 11/2001 Dames
6,378,774 B1 * 4/2002 Emori et al. ................. 235/492
6,389,442 B1 5/2002 Yin et al.
6,393,447 B1 5/2002 Jakobsson et al.
6,411,715 B1 6/2002 Liskov et al.
6,446,052 B1 9/2002 Juels
6,460,141 B1 10/2002 Olden
6,592,044 B1 7/2003 Wong et al.
6,607,127 B2 8/2003 Wong
6,609,654 B1 8/2003 Anderson et al.
6,631,849 B2 10/2003 Blossom
6,641,050 B2 11/2003 Kelley et al.
6,655,585 B2 12/2003 Shinn
6,681,988 B2 1/2004 Stack et al.
6,705,520 B1 3/2004 Pitroda et al.
6,755,341 B1 6/2004 Wong et al.
6,769,618 B1 8/2004 Finkelstein
6,776,332 B2 8/2004 Allen et al.
6,805,288 B2 10/2004 Routhenstein et al.
6,811,082 B2 11/2004 Wong
6,813,354 B1 11/2004 Jakobsson et al.
6,817,532 B2 11/2004 Finkelstein
6,853,412 B2 2/2005 Stephenson
6,873,974 B1 3/2005 Schutzer
6,902,116 B2 6/2005 Finkelstein
6,970,070 B2 11/2005 Juels et al.
6,980,969 B1 12/2005 Tuchler et al.
6,985,583 B1 1/2006 Brainard et al.
6,991,155 B2 1/2006 Burchette, Jr.
7,013,030 B2 3/2006 Wong et al.
7,035,443 B2 4/2006 Wong
7,039,223 B2 5/2006 Wong
7,044,394 B2 5/2006 Brown
7,051,929 B2 5/2006 Li
7,100,049 B2 8/2006 Gasparini et al.
7,100,821 B2 9/2006 Rasti
7,111,172 B1 9/2006 Duane et al.
7,114,652 B2 10/2006 Moullette et al.
7,136,514 B1 11/2006 Wong
7,140,550 B2 11/2006 Ramachandran
7,143,953 B2 12/2006 Takahashi et al.
7,163,153 B2 1/2007 Blossom
7,195,154 B2 3/2007 Routhenstein
7,197,639 B1 3/2007 Juels et al.
7,219,368 B2 5/2007 Juels et al.
7,225,537 B2 6/2007 Reed
7,225,994 B2 6/2007 Finkelstein
7,237,724 B2 7/2007 Singleton
7,246,752 B2 7/2007 Brown
7,264,172 B2 * 9/2007 Amiot et al. ................. 235/486
7,278,586 B2 10/2007 Takahashi et al.
7,298,243 B2 11/2007 Juels et al.
7,337,326 B2 2/2008 Palmer et al.
7,346,775 B2 3/2008 Gasparinl et al.
7,356,696 B1 4/2008 Jakobsson et al.
7,357,319 B1 4/2008 Liu et al.
7,359,507 B2 4/2008 Kaliski, Jr.
7,360,688 B1 4/2008 Harris
7,363,494 B2 4/2008 Brainard et al.
7,380,710 B2 6/2008 Brown
7,389,425 B2 6/2008 Hasbun
7,398,253 B1 7/2008 Pinnell
7,404,087 B2 7/2008 Teunen
7,424,570 B2 9/2008 D'Albore et al.
7,427,033 B1 9/2008 Roskind
7,454,349 B2 11/2008 Teunen et al.
7,461,250 B1 12/2008 Duane et al.
7,461,399 B2 12/2008 Juels et al.
7,472,093 B2 12/2008 Juels
7,472,829 B2 1/2009 Brown
7,494,055 B2 2/2009 Fernandes et al.
7,502,467 B2 3/2009 Brainard et al.
7,502,933 B2 3/2009 Jakobsson et al.
7,503,485 B1 3/2009 Routhenstein
7,516,492 B1 4/2009 Nisbet et al.
7,523,301 B2 4/2009 Nisbet et al.
7,532,104 B2 5/2009 Juels
7,543,739 B2 6/2009 Brown et al.
7,562,222 B2 7/2009 Gasparini et al.
7,580,898 B2 8/2009 Brown et al.
7,584,153 B2 9/2009 Brown et al.
7,591,426 B2 9/2009 Osterweil et al.
7,591,427 B2 9/2009 Osterweil
7,602,904 B2 10/2009 Juels et al.
7,641,124 B2 1/2010 Brown et al.
7,660,902 B2 2/2010 Graham et al.
8,015,592 B2 * 9/2011 Doughty et al. ................. 726/2
2001/0034702 A1 10/2001 Mockett et al.
2001/0047335 A1 11/2001 Arndt et al.
2002/0059114 A1 5/2002 Cockrill et al.
2002/0082989 A1 6/2002 Fife et al.
2002/0096570 A1 7/2002 Wong et al.
2002/0120583 A1 8/2002 Keresman, III et al.
2003/0034388 A1 2/2003 Routhenstein et al.
2003/0052168 A1 3/2003 Wong
2003/0057278 A1 3/2003 Wong
2003/0105964 A1 6/2003 Brainard et al.
2003/0116635 A1 6/2003 Taban
2003/0152253 A1 8/2003 Wong
2003/0173409 A1 9/2003 Vogt et al.
2003/0179909 A1 9/2003 Wong et al.
2003/0179910 A1 9/2003 Wong
2003/0226899 A1 12/2003 Finkelstein 2004/0035942 A1 2/2004 Silverman
2004/0133787 A1* 7/2004 Doughty et al. .............. 713/186
2004/0162732 A1 8/2004 Rahim et al.
2004/0172535 A1 9/2004 Jakobsson et al.
2004/0177045 A1 9/2004 Brown
2005/0001711 A1* 1/2005 Doughty et al. ............. 340/5.74
2005/0043997 A1 2/2005 Sahota et al.
2005/0080747 A1 4/2005 Anderson et al.
2005/0086160 A1 4/2005 Wong et al.
2005/0086177 A1 4/2005 Anderson et al.
2005/0116026 A1 6/2005 Burger et al.
2005/0119940 A1 6/2005 Concilio et al.
2005/0154643 A1 7/2005 Doan et al.
2005/0228959 A1 10/2005 D'Albore et al.
2006/0000900 A1 1/2006 Fernandes et al.
2006/0037073 A1 2/2006 Juels et al.
2006/0041759 A1 2/2006 Kaliski, Jr. et al.
2006/0085328 A1 4/2006 Cohen et al.
2006/0091223 A1 5/2006 Zellner et al.
2006/0161435 A1 7/2006 Atef et al.
2006/0161789 A1* 7/2006 Doughty et al. .............. 713/186
2006/0163353 A1 7/2006 Moulette et al.
2006/0174104 A1 8/2006 Crichton et al.
2006/0186209 A1 8/2006 Narendra et al.
2006/0256961 A1 11/2006 Brainard et al.
2007/0114274 A1 5/2007 Gibbs et al.
2007/0174614 A1 7/2007 Duane et al.
2007/0192249 A1 8/2007 Biffle et al.
2007/0241201 A1 10/2007 Brown et al.
2008/0040271 A1 2/2008 Hammad et al.
2008/0040276 A1 2/2008 Hammad et al.
2008/0096326 A1 4/2008 Reed
2008/0148394 A1 6/2008 Poidomani et al.
2009/0108064 A1 4/2009 Fernandes et al.
2009/0255996 A1 10/2009 Brown et al.
2010/0030633 A1* 2/2010 Beenau et al. ............. 705/14.17

* cited by examiner

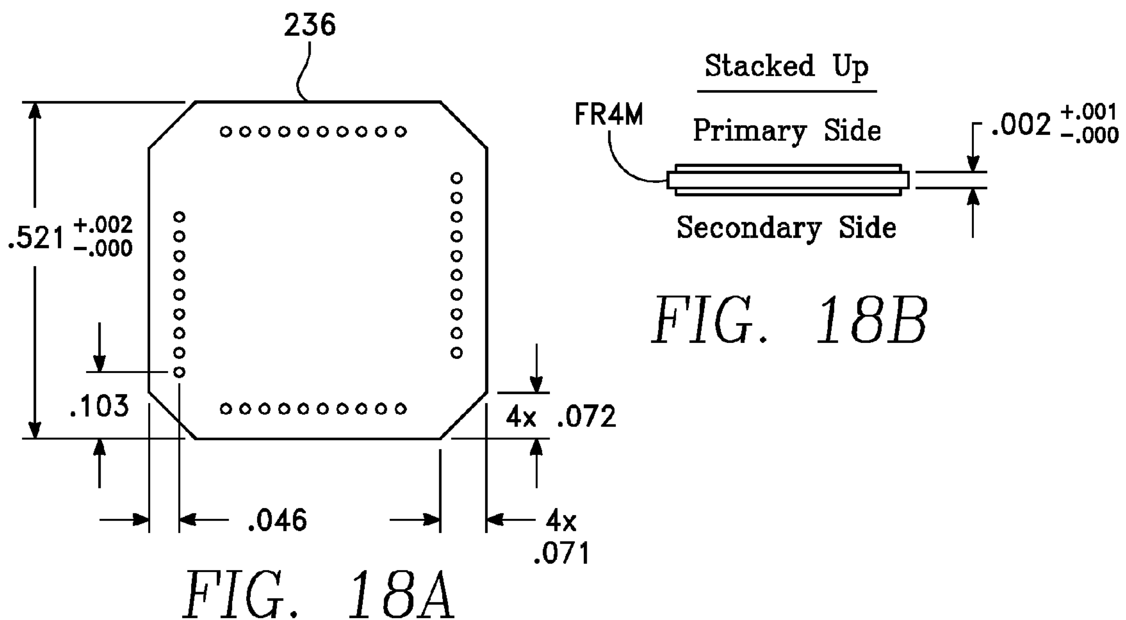
FIG. 18A
FIG. 18B
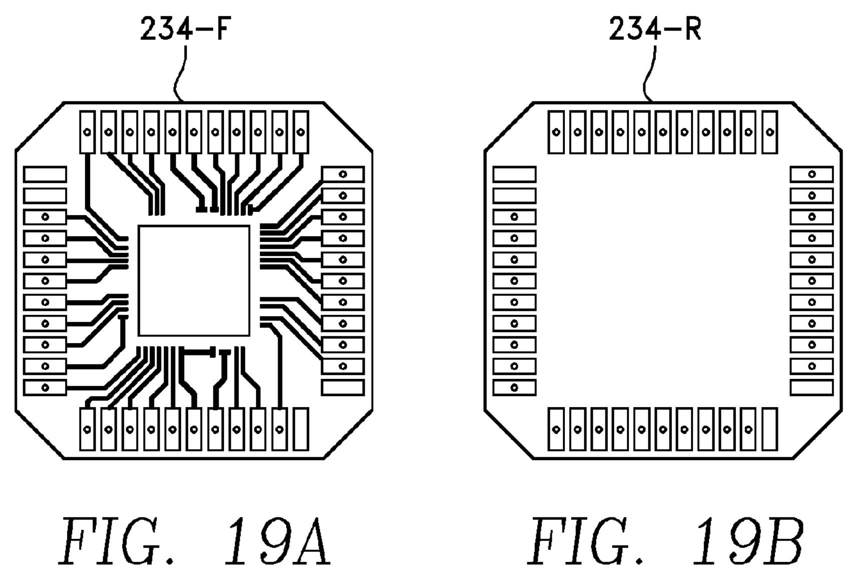
FIG. 19A
FIG. 19B

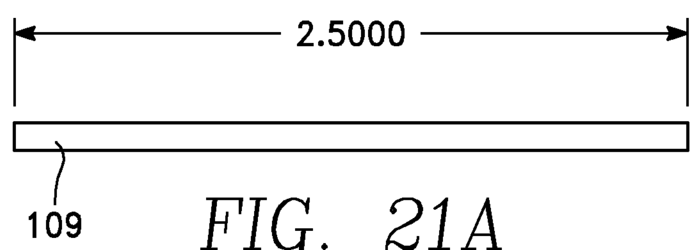
FIG. 21A
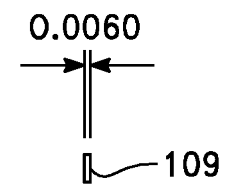
FIG. 21B
109
FIG. 21C
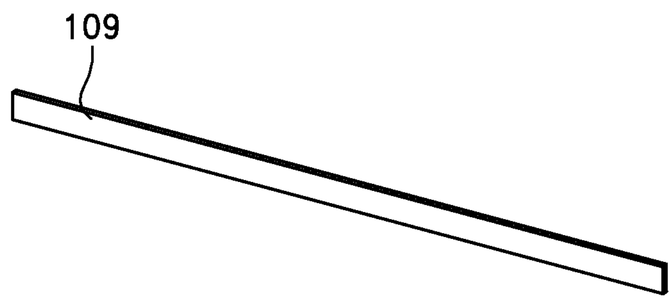
FIG. 21D

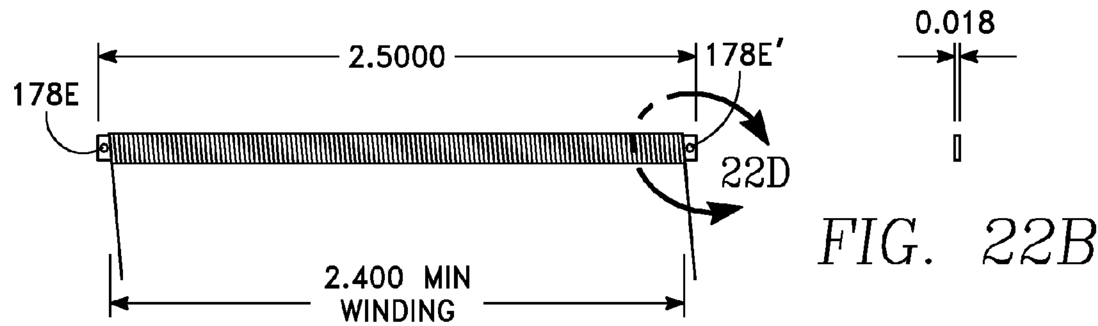
FIG. 22A
FIG. 22B
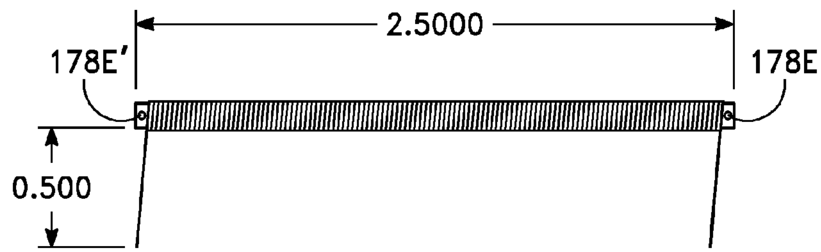
FIG. 22C
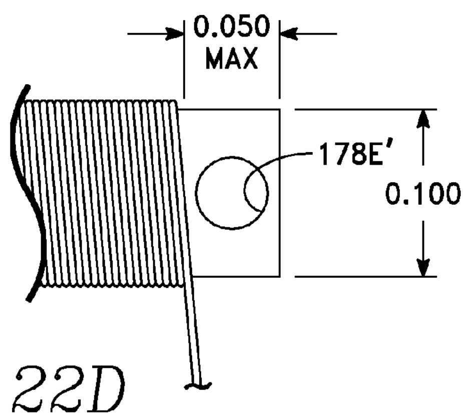
FIG. 22D

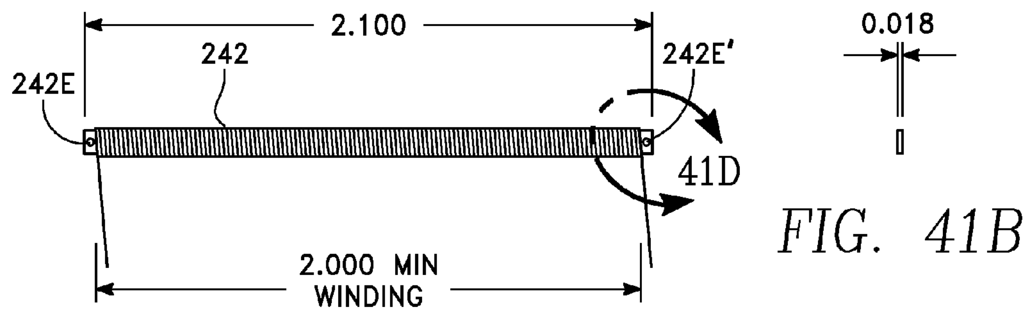
FIG. 41A
FIG. 41B
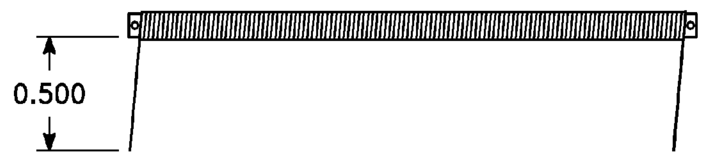
FIG. 41C
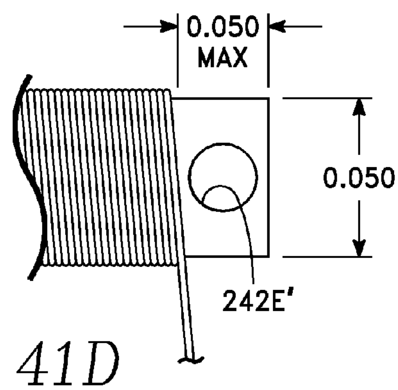
FIG. 41D

Stack Up

Primary Side

Mask .001 MAX
1/2oz .0007
Core .003 ± .001
1/2oz .0007
Mask .001 MAX

.0075 MAX

Secondary Side

CONDUCTING A TRANSACTION WITH AN ELECTRONIC CARD

CROSS-REFERENCE TO RELATED APPLICATIONS

The present application is a continuation application of U.S. patent application Ser. No. 13/102,991, filed May 6, 2011, which is a continuation of U.S. Ser. No. 12/726,868, now issued as U.S. Pat. No. 7,954,724, which was a continuation application of U.S. Ser. No. 11/413,595, filed Apr. 27, 2006, which claimed the priority benefit of U.S. Ser. No. 60/675,388, filed Apr. 27, 2005, all of which are specifically incorporated herein by reference. This application is also a continuation-in part application of U.S. Ser. No. 11/391,719, filed Mar. 27, 2006, which claimed the priority benefit of U.S. Ser. No. 60/594,300 filed Mar. 26, 2005, all of which are specifically incorporated herein by reference. This application sets forth the disclosure of U.S. Ser. No. 60/675,388.

BACKGROUND

A magnetic stripe plastic card contains a magnetic tape material much like the magnetic tape used in digital data recording. The magnetic stripe consists of a magnetic oxide, and binder compounds that provide the magnetic stripe with data encoding and durability capabilities needed for plastic card applications. While these magnetic tape components have been optimized for plastic card applications the magnetic tape used for the magnetic stripe on a plastic card is very similar to standard digital data recording tape. The encoding of the magnetic stripe on a plastic card also follows standard digital recording techniques but is again optimized for plastic card applications. The encoded data takes the form of zones of magnetization in the magnetic stripe with alternate magnetic polarities. The north and south poles of the magnetized zones alternate in direction providing an encoding technique that can represent the binary "zeroes" and "ones" of a binary digital code. The standard encoding technique for the magnetic stripe on a plastic card is the F2F (Aiken double frequency) code where a binary zero is represented by a long magnetized zone and a binary one is represented by two magnetized zones each one-half the length of the zero—a long magnetized zone. The exact length of these zones of magnetization is determined by how much data needs to be recorded on the magnetic stripe. For example Track 2 data is encoded at 75 bits per inch or 75 long zero zones per inch—International Standards Organization (ISO) specifications 7811-2/6. That equates to 0.01333 inches in length for the zero magnetized zone. The binary one would then be two zones of one half that length or 0.00666 inches in length. Other lengths can be obtained for different data densities such as the 210 bits per inch used in Track 1 and Track 2 of the magnetic stripe.

A magnetic stripe encoder consists of a magnetic write head and an electronic current drive circuit capable of magnetizing the magnetic oxide in the magnetic stripe to full magnetization (saturation). The encoding current in the write head is capable of alternating direction thereby producing alternating zones of magnetization direction in the magnetic stripe that will form the data encoding of the magnetic stripe.

The two most common magnetic oxides used in magnetic stripe cards are referred to as low coercivity (LoCo) and high coercivity (HiCo) magnetic stripes. Coercivity measures how difficult it is to magnetize or demagnetize a magnetic tape or stripe and is measured in oersteds. Low coercivity magnetic stripes are typically 300 oersteds and high coercivity magnetic stripes are above 2700 oersteds. A high coercivity magnetic stripe requires about three times more energy to encode or erase then does a low coercivity magnetic stripe. Many magnetic stripe card applications have gone to HiCo magnetic stripes because it is much harder to accidentally erase the encoded data then on a LoCo magnetic stripe. This provides greater durability and readability of the encoded data in use for many applications.

Reading the encoded data in the magnetic stripe is done by capturing the magnetic flux field extending from the magnetized zones in the magnetic stripe by a magnetic read head. The read head converts the changing magnetic flux in the coil of the read head to a voltage pattern mirroring the magnetization zones of the encoded data. The voltage pattern can then be translated by the decoding electronics into the binary zeroes and ones of the data as is well known in the industry.

The process of magnetic tape application to plastic cards, the encoding of the magnetic stripe and the reading of the encoded data in the magnetic stripe at point of use has been a reliable and cost effective method for portable personal data storage for financial, ID and other plastic card based applications. However, the relative ease of reading and encoding or re-encoding of the magnetic stripe data has made the magnetic stripe plastic card subject to counterfeiting, copying the data to one or more cards (skimming) and other fraud abuses. Skimming fraud is growing around the world and has reached financial dollar losses that call for immediate solutions.

Smart plastic cards using memory chips and microprocessor chips were first introduced to provide another type of data storage medium not subject to the types of fraud found in magnetic stripe cards. The Smart Cards did reduce some types of fraud but the cards where much more expensive than a magnetic stripe card and the magnetic stripe readers at the point-of-transaction had to be replaced with readers that could read the data storage chip and the magnetic stripe by either contact or RF contact-less data transmission. These cost factors and the large changes in the existing infrastructure built up around the magnetic stripe plastic card systems and applications have prevented the rapid and more general acceptance of Smart Cards at point-of-transaction. Another factor in the slow acceptance of Smart Cards has been the lack of visible benefits to the end user or consumer. The consumer is just as content to use the magnetic stripe as to use the chip to complete a transaction.

The need for fraud reduction with a versatile and inexpensively manufactured transaction card is urgent. In the US fraud is tending to cover from 7.5 to 12 basis points, and skimming is projected to cost $8 billion dollars in 2005. Internationally, the need is even more dire, with fraud tending from 25 to 40 basis points and 60 percent of that due to skimming. Nevertheless, merchants in the United States and elsewhere are reluctant to invest the resources necessary to change all of their current magnetic-card transaction equipment for various reasons, including cost, convenience, disruption to business and reliability.

SUMMARY OF THE INVENTION

The present invention is generally directed to an apparatus and a process using it for conducting a transaction with an electronic card. The card determines whether the transaction is being conducted with a smart card reader or with a magnetic stripe reader. A smart card reader mode is activated if the transaction is being conducted with a smart card reader; a magnetic stripe reader mode is activated if the transaction is being conducted with a magnetic stripe reader. A transaction specific dynamic field of data is generated within the electronic card and either transmitted to the smart card reader if the smart card reader mode is activated or to the magnetic stripe reader if the magnetic stripe reader mode is activated.

The electronic card can determine whether the transaction is being conducted with the smart card reader or with the magnetic stripe reader with or without use of a user input (e.g., a user activation button). A sensor in the card can detect the presence of a magnetic read head of the magnetic stripe reader that triggers activation of the magnetic stripe reader mode while the smart card reader mode can be triggered by physical contact between the electronic card and the smart card reader.

The electronic card is activated from a reduced power mode to a full power mode after either the smart card reader mode or the magnetic stripe reader mode is activated and the dynamic field of data is not generated until the full power mode is activated.

One account function can be selected from multiple account functions, such as, for example selecting between a credit account, a debit account and a rewards points program account.

The transaction specific data packet is dynamically generated by a microprocessor and either transmitted by a broadcaster to a magnetic stripe reader (as a time varying and spatial varying magnetic field that is interpreted as if originating from a standard magnetic stripe) or through a communications port that can communicate the transaction specific data packet to a smart card reader. The card can be compliant with a CR80 format and include a user activation interface that is not a power on user input button.

Accordingly, it is a primary object of the present invention to provide for improved use of an electronic card to complete a transaction through use of transaction specific data dynamically generated.

This and further objects and advantages will be apparent to those skilled in the art in connection with the drawings and the detailed description of the invention set forth below.

BRIEF DESCRIPTION OF THE DRAWINGS

FIGS. 18A and B shows the processor placement from front and side views respectively.

FIG. 19A illustrates an outline of the processor configuration, in a first embodiment from a front view and FIG. 19B illustrates the reverse view of the processor configuration wirebonding assembly.

FIGS. 21 A-D illustrate the broadcasting coil core in a first embodiment from four views.

FIGS. 22 A-C illustrate the broadcasting core assembly in a first embodiment, from three views.

FIG. 22D illustrates details of the broadcasting core in a first embodiment.

FIGS. 41A-C illustrate various features of the broadcasting core assembly in a second embodiment from front, side a back views, respectively.

FIG. 41D illustrates the details of the broadcasting core assembly in FIGS. 41A-C.

DETAILED DESCRIPTION OF THE INVENTION

Electronic card technology in the present invention is in the form of an electronic Smart Card (inventive transaction card) that can be used in any standard magnetic stripe readers. The inventive transaction card has all of the major characteristics and components of a plastic card with the addition of being able to communicate the information stored in chip's memory from the inventive transaction card to a standard magnetic stripe reader by broadcasting the data from a special broadcast antenna coil. The inventive transaction card contains an internal power source in the form of a battery and power management system to provide power to the chip and antenna broadcast system plus other security and user interface functions.

The addition of a power source internal to the card provides many unique electronic components and functions previously not available to passive magnetic stripe or standard Smart Cards. These new electronic functions can take the form of powered or passive electronic components and interactive or secure software programs. These powered and passive electronic components and the associated firmware/software provide the card with new applications, much greater security from magnetic stripe and ID theft fraud while providing direct user benefits that will give the user reasons and motivation to accept and use this inventive transaction card.

The use of a powered antenna broadcast system in the inventive transaction card overcomes one of the major problems in the adaptation of Smart Cards. The antenna broadcast system allows the inventive transaction card to directly transmit the data from the card into a standard magnetic stripe terminal's read head without modification to the standard magnetic stripe terminal. This means that all of the existing point-of-transaction terminals existing in user locations would be able to read the data from an inventive transaction card. The inventive transaction card provides immediate access to greater security, control and user benefits to a large population of users.

The range of solutions provided by the Applicant's integrated solutions for the electronic transaction industry range from simple "anti-skimming" solutions in the "dark card" most basic commercial embodiments to fairly complex identity and anti-theft solutions with add-on PINS. However, the cost-effectiveness of all of the claimed inventions remains high in the prevention of fraud. In particular embodiments of the invention "add-on" features are present and perform addition security and/or transaction features, which will be described below.

Figure 1A:
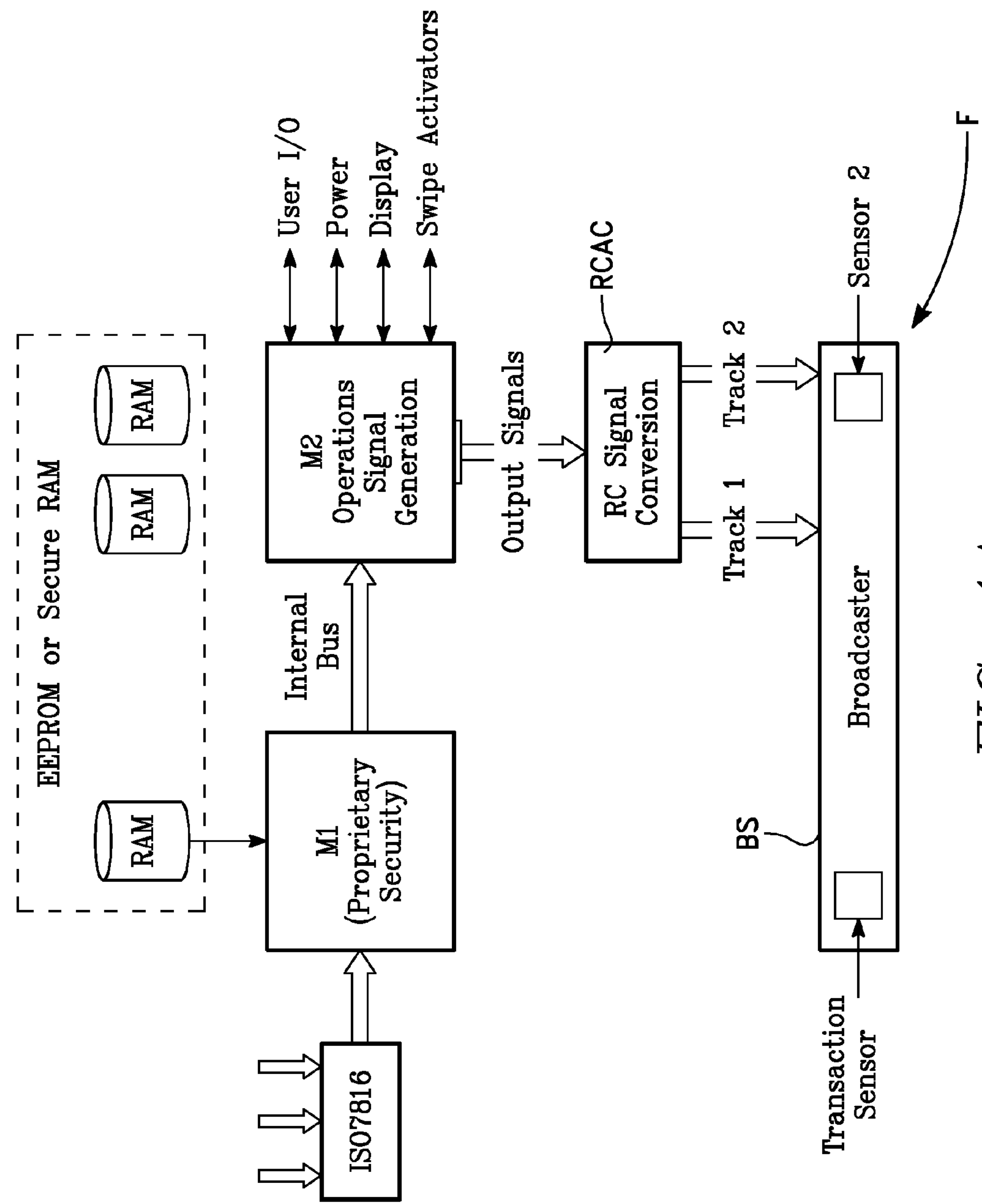
FIG. 1A conceptually illustrates a functional component overview of the inventive multi-standard transaction card while FIG. 1AA illustrates the same components in card format.
Figure 1A:
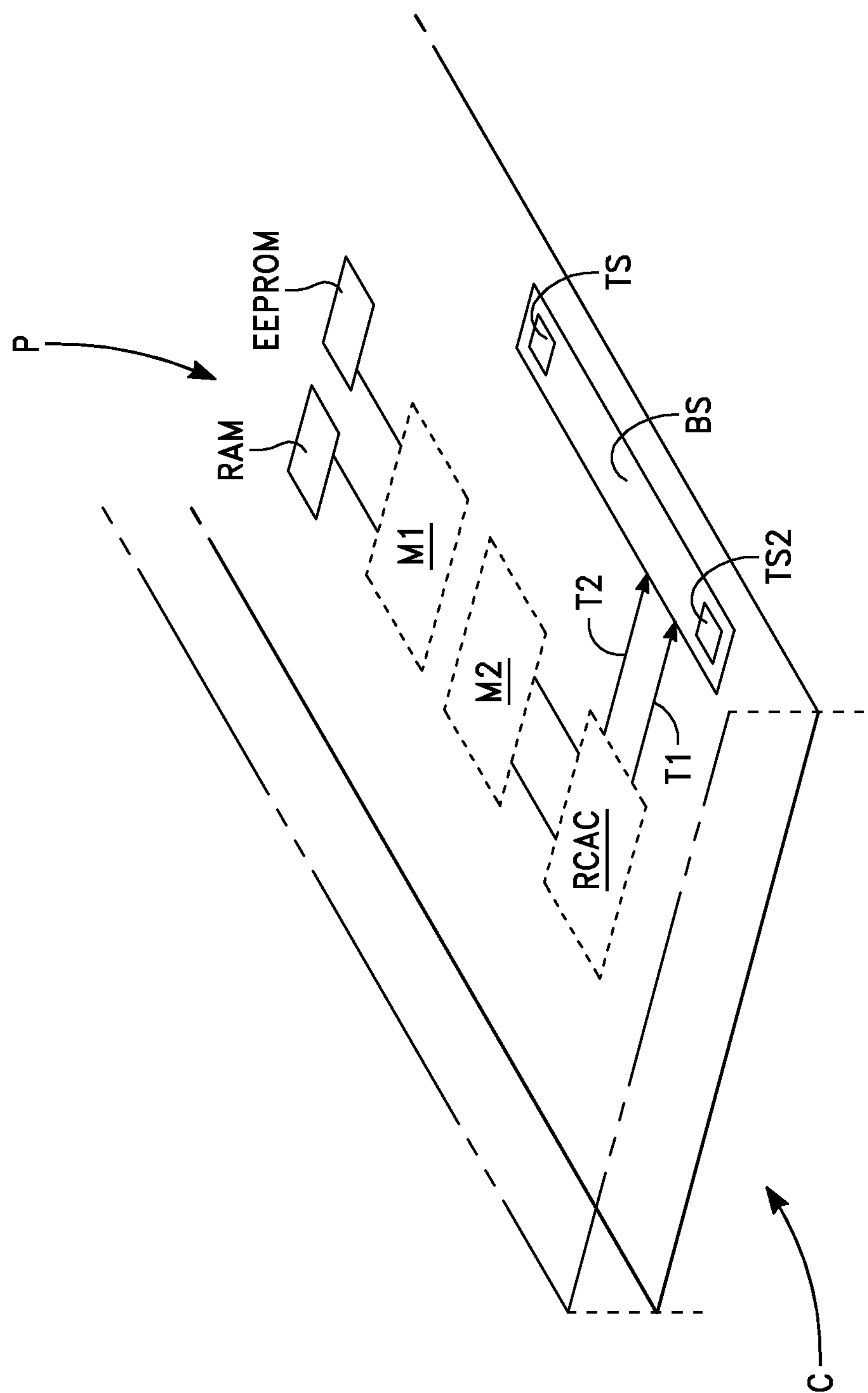

FIG. 1A shows the relevant components of the PrivaSys-enabled card (discussed below): M1, a security processor, M2, an operations processor, an ISO 7816 input and output for Smart Card transactions and cardholder data population, memory, battery, keypad, and RC signal conversion module, and a broadcasting device that allows use in standard magnetic transaction swipes.

All the electronic components of the inventive transaction card, namely the two microprocessors (M1 and M2), the display, keypad, display driver, flex encoder, transaction sensor, functional switches, ON/OFF switch, and battery contacts with battery cell are fabricated on a flexible multi-layered printed circuit board. The flexible printed circuit board with all of the loaded components is embedded into a carrier with a front and a back cover film.

The inventive transaction card uses a dual microprocessor architecture (herein referred to as M1 and M2), in which M1 handles certain functions related to the generation of security codes to handle triple DES and the proprietary DAC algorithm. M2, a 16-bit processor, handles card operation functions such as power management, device management, display and user input. The dual processor architecture is advantageous over the single processor for reasons that are only tangentially related to this study. However, it should be noted that the processors do not have overlapping functions and cannot be viewed as a multiplicity of the same component. Most aspects regarding the functions of M1 are not relevant for this analysis other than the existence of a microprocessor that generates security information that is not directly connected to the M2 non-secure I/O ports. Some of the processes performed in the M1 processor are detailed in the publicly available intellectual property literature of the Applicant, which is incorporated by reference below.

M2 and M1 communicate with each other through a serial bus structure and communication protocol, the specifics of which are not relevant to this study. M2 includes an adapted 16-bit microprocessor comprising a Central Processing Unit (CPU), with a ROM, a RAM, a 16-bit parallel input port and a 16-bit parallel output port. M2 receives inputs through Input from a bank of switches. M2 also receives inputs from a keypad. M2 emanates control signals from output through a display driver and display. M2 also generates transaction signals.

Figure 1B:
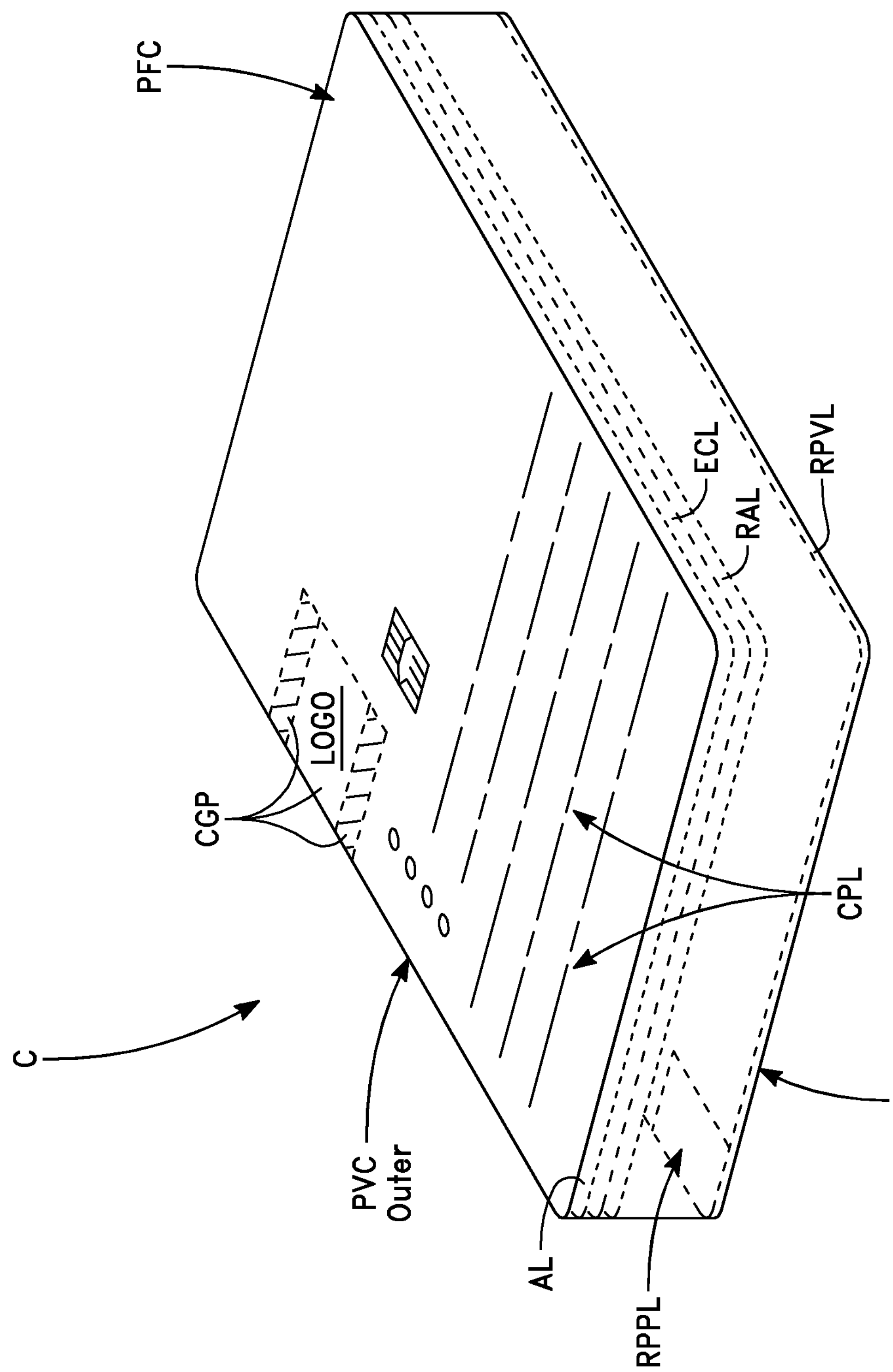
FIG. 1 B illustrates a physical layer overview of the inventive multi-standard transaction card.
FIG. 1C illustrates an electrical component overview of the inventive multi-standard transaction card.

Referring now to FIG. 1B, details of the structural functions of the various layers are illustrated. Card graphics printing CGP is typically by offset litho or silkscreen printing with issuer graphics and cardholder personal data on the surface of the second PVC layer of card. The white PVC front layer PFL can accept card graphics printing CGP and provides opacity to the cards inner layers. The clear PVC outer layer CPL protects the rear printed and inner layers ranging in thickness from 0.001 to 0.005 inches with a signature panel (not shown) and other surface features. The clear PVC outer layer CPL protects the printed front and inner layers ranging in thickness from 0.001 inches to 0.005 inches with the chip pad I/O contact points and other standard card surface features such as surface printing, holograms and signature panels.

FIG. 1B further illustrates a sample embodiment of the invention with many of the features that would be implemented in various commercial embodiments. The AL Adhesive layer tailored to bond the PVC printed layer PVL to the inner electronic circuit layer ICL. The adhesive layer can be thermally activated during lamination or cured/activated by UV or other radiation techniques. The next layer PFL is made up of a white PVC material suitable for being printed on by litho, screen presses or other printing process CGP. The printing CGP contains the bank graphics and other issuer related information common to all cards from that issuance. This layer with the printed inks is sufficiently opaque enough to block the inner electronics from being visible.

The adhesive layer AL is designed to provide adhesion between the PVC layers and the adapter circuit and electronic components (not shown) mounted on the circuit layer. The adhesive layer AL may be applied using several standard techniques to the printed PVC layer PVL or to the circuit layer ECL or to both layers. The adhesive can be activated by either UV curing or thermal activation during lamination or both. The adhesion layer AL provides for durability of card and seals the card from penetration of moisture and other environmental factors.

The rear adhesive layer RAL, rear PVC printed layer RPVL and the PVC protective overlay layer POL all perform the same functions as their equivalent front layers described above.

The electronic circuit layer ECL contains a base material to support all the electronic components and their interconnected wiring. The interconnected wiring (not shown) is achieved using standard etched and plated circuit board techniques. The electronic components of the transaction card C are determined by the functions and applications of the card.

The outer layer of the transaction card in most commercial embodiments is a standard clear PVC layer used in most plastic card construction and ranges in thickness from 0.001 to 0.005 inches in thickness. It provides physical protection to the printed graphics on the next PVC layer as well as provides a PVC surface compatible with surface features added to plastic cards such as holograms, ink jet or dye diffusion surface printing. This layer is typically identical to the rear clear layer RCL that serves most of the same functions as outer layer.

The electronic circuit layer ECL comprises an adapter circuit (not shown) that may be in the form of a flex or fixed circuit, with electronic components, switches, microprocessor chip, keypads, magnetic stripe coil broadcaster and battery, mounted on the flex circuit. The adapter circuit is discussed in FIGS. 41-49 below. The adhesive layer AL is tailored to bond the PVC printed layer PVL to the inner electronic circuit layer ECL. The white PVC rear layer RPRL is printed one side with issuer graphics and cardholder personal data and provides opacity to the rear side of the card.

Figure 1C:
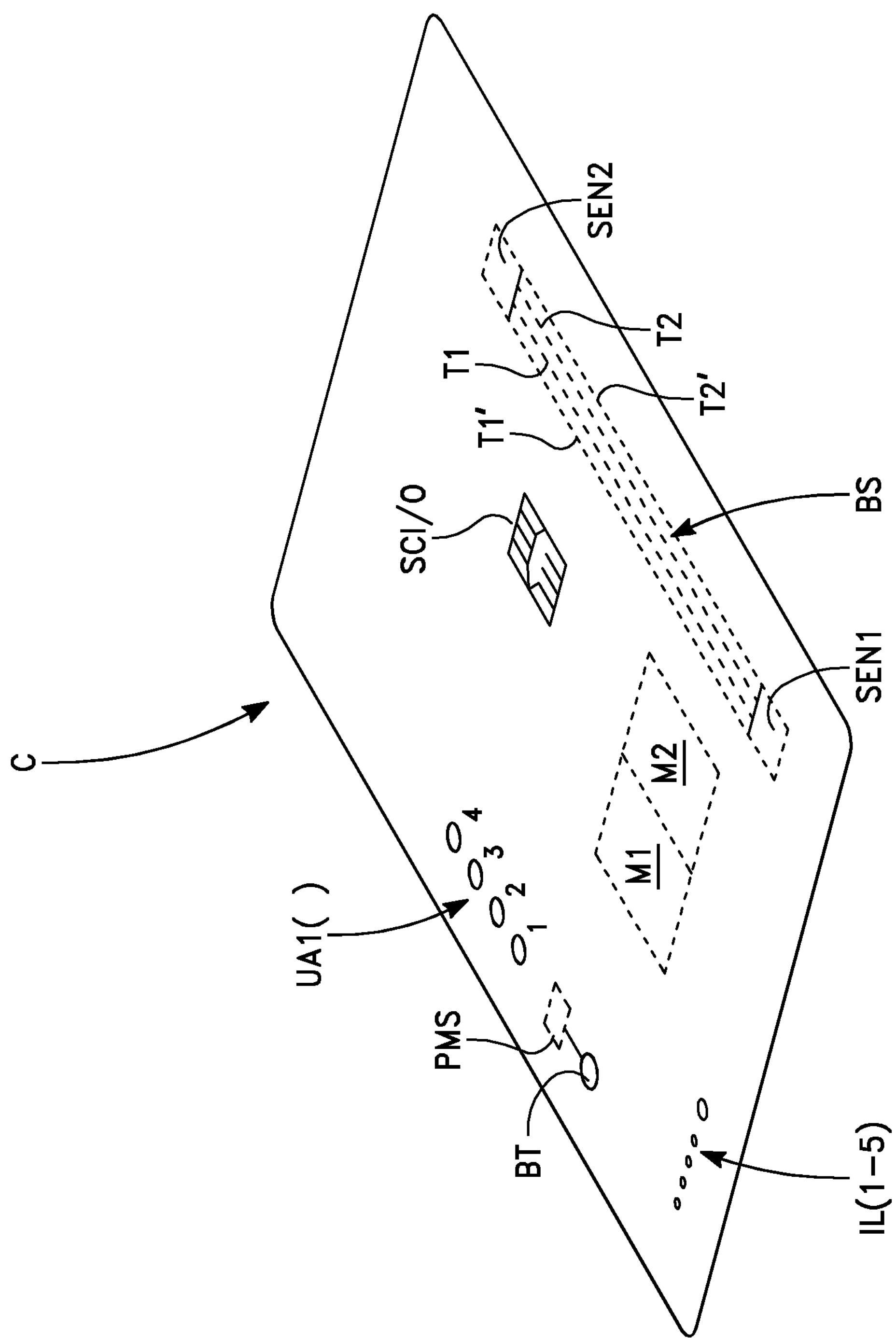

Referring now to FIG. 1C, features of particular embodiments of the transaction card C include the "Smart Card" data input/output area SCI/O, the microprocessor M1/M2, the user interface area UIA, the indicator light area IL, the magnetic stripe broadcaster area BS and the battery power management area BT-PMS. The Smart Card input/output data area consists of the ISO standard input/output plate SCI/O that allows the transaction card to work with standard Smart Card equipped terminals. The plate meets ISO standards, which are hereby incorporated by reference. The microprocessor area contains the microprocessor M1 or M2 and associated input/output electronic components (not shown) needed to interact with the other major components of the transaction card C. The microprocessor M1 or M2 contains the processor, random access memory (RAM, not shown) and electrical erasable program read only memory (EEPROM, now shown). The microprocessor M1 or M2 contains the following: software to interrupt the input information; operating systems software; card holder for personal data (account numbers, personal identification numbers, other banking or application user specific data); security operation systems software; and magnetic stripe broadcaster data formatting for various accounts and power management software. The ability of the microprocessor M1 or M2 to manage multiple inputs/outputs from standard Smart Card interface plates SCI/O, customer and user manual input switches UTA, user indicator lights IL, battery power BT and magnetic stripe broadcaster outputs BS provides the transaction card with interactive existing and future point-of-transaction terminal accessibility not found in any other plastic card. The user interface area consists of tactile switch buttons UIA (1-4) that enable the user to manually turn the Enabled Card on or off and choose different functions of the transaction card C and indicator lights IL (1-5) providing operational indications to the user. Using the manual input switch buttons UIA (1-4) the user can power on the card, to select different banking account or application functions such as credit account, debit account or rewards points program account. The indicator lights show IL (1-4) what transaction card functions have been selected and if power 12*e* has been turned on or off, or if there has been an error in operation in the Enabled Card. The magnetic stripe broadcaster area BS contains the output sections of the microprocessor power driver circuits (not shown) as well as the magnetic stripe terminal activation switches 13*b*-13*c* and broadcaster coils for Tracks 1 T1 and Tracks 2 12. In addition to the broadcaster coils for Tracks 1 and Track 2, the broadcaster area contains a Track 1 Helper coil T1' and a Track 2 Helper coil T2' that reduce the interactions of the broadcast magnetic fields from Track 2 into Track 1 coils and the broadcast magnetic field from Track 1 into Track 2 coils. The battery power area contains the thin (less than 0.020 inches thick) polymer 3-volt battery BT and power management system PMS.

Smart Card data input/output interface SC I/O plate provides standard connectivity to a Smart Card terminal for MCLR, clock data, power, ground and test points according to the ISO 7816 standards.

User interface section UIA with combination of tactile buttons UIA(1-4) provides user with the ability to select various functions and applications that have been programmed into the microprocessor M1 or M2.

UIA(1) Tactile manual input button can turn on or off power to Enabled Card; UIA(2) Tactile manual input button selects the first application program—A1 (for example a bank credit application); UIA(3) Tactile manual input button selects the second application program—A2 (for example a bank debit application); and UIA(4) Tactile manual input button selects the third application program—A3 (for example a bank or merchant points or reward program). IL User interface feedback section contains LED lights or other forms of illumination that will provide the user with an indication of the configuration and status of the transaction card C.

IL(1) User indication red LED light indicates when power to the microprocessor has been turned off or that an error in the setup or operations has occurred. IL(2) User indication green LED light indicates when power to the microprocessor has been turned on. IL(3) User indication LED light indicates that the first application program (A1) has been selected (for example a bank credit application). IL(4) User indication LED light indicates that the second application program (A2) has been selected (for example a bank debit application). IL(5) User indication LED light indicates that the third application program (A3) has been selected (for example a bank or merchant points—rewards program).

BS Magnetic stripe broadcaster module contains the magnetic stripe broadcaster Track 1 T1 and Track 2 T2 coils, the Track 1 T1' and Track 2 T2' Helper coils, the leading and trailing magnetic stripe trip switches and adapter circuit for mounting coils and interconnected wiring (not shown). Magnetic stripe broadcaster driver and pulse shape circuits form the coil magnetic stripe broadcaster driver voltages and currents supply. SEN1 Magnet trip switch at lead edge of stripe (right edge of stripe when facing side of card that would contain a magnetic stripe) consist of a high energy magnetic housed within the Enabled Card. The magnetic trip switch is activated by the attraction of the magnet to the magnetic read head ferrite core of a point-of-transaction terminal. SEN2 Magnetic trip switch at the trailing edge of the stripe (left edge of stripe) has the same configuration and purpose as the lead edge magnet trip switch in 13*b*.

This magnet trip switch is activated when the Enabled Card is swiped in a point-of transaction terminal in the reverse direction (trailing edge first).

T2 Track 2 magnetic stripe broadcaster coil broadcasts the Track 2 data from the microprocessor to the Track 2 read head in the point-of-transaction terminal. The magnetic stripe broadcaster coil consists of special would coils and ferromagnetic cores for flux amplification and control. T1 Track 1 magnetic stripe broadcaster coil broadcasts the Track 1 data from the microprocessor to the Track 1 read head in the point-of-transaction magnetic terminal. The Track 1 magnetic stripe broadcaster coil consists of a special would coil and ferromagnetic core for flux amplification and control.

T2' Track 2 Helper broadcaster coil is used to cancel out the Track 1 induced signal from the Track 2 broadcast coil. Phase and amplitude corrections are used to cancel out the Track 2 data picked up in Track 1. The Track 2 Helper coil is located above the Track 1 magnetic stripe broadcaster coil. T1' Track 1 Helper broadcaster coil is used to cancel out the Track 2 induced signal from the Track 1 broadcast coil. Phase and amplitude corrections are used to cancel out the Track 1 data picked up in Track 2. The Track 1 Helper coil is located below the Track 2 magnetic stripe broadcaster coil.

BT Special design polymer solid-state battery under 0.020 inches thick that provides stand alone 3 volts of power for operations of Enabled Card, independent of any terminal connections. PMC Power management circuits controls the amount of power sent to the various components of the transaction card C.

In particular embodiments the invention, the broadcasting card C, 1, 10, 51 is designed to function in an existing magnetic stripe point-of-transaction terminal environment (not shown). In this existing point-of-transaction infrastructure the magnetic stripe provides the access to the stored information on the card through the use of the microprocessor, battery power and circuit elements on the RC adapter circuit RCAC internal to the inventive Card. The Enabled Card provides the access to the stored information on the card by an electronic broadcaster system BS that produces a time varying magnetic field similar to the spatial/time varying magnetic field from the standard magnetic stripe. The electronic broadcaster unit produces a time varying and spatial varying magnetic field that is interpreted by the magnetic read head in the point-of-transaction terminal as originating from a standard magnetic stripe. The time varying magnetic field from the electronic broadcaster unit in the card magnetically induces in the point-of-transaction read head a time varying voltage signal nearly identical to the time varying voltage produced by the encoded magnetic field from the magnetic stripe card. The point-of-transaction terminal decodes electronics and can process this time varying voltage from the electronic broadcaster in the same way it processes the signals from a magnetic stripe and thereby decode the data stored in the Enabled Card using standard decoding procedures and plastic card specifications (ISO 7811-2/6). This allows the Enabled Card to be used in any point-of-transaction terminal without modification to the terminal or the network connected to the terminal. This gives the Enabled Card a much broader base of use and allows the applications to have a much lower implementation cost.

Figure 2C:
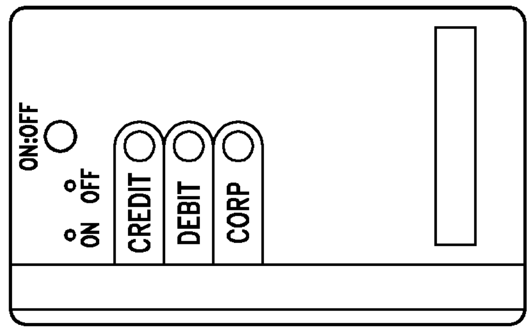
FIGS. 2A and 2C illustrate sample physical embodiments of the cards as may be implemented in a sample embodiment, FIGS. 2A and 2C being alternative embodiments of the backside of the card illustrated in FIG. 2B.
Figure 2B:
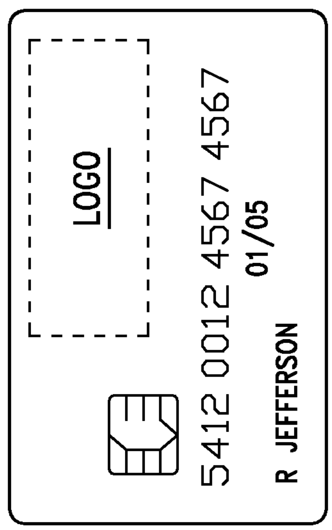
Figure 2A:
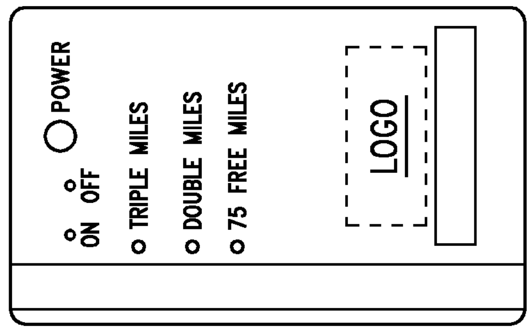

Sample finished commercial products may include the present invention are shown in FIGS. 2A(F)-D(R), from front and rear views, respectively. As can be appreciated by those skilled in the art, there also may be design aspects of this card that are can be protected as well.

The present invention uses many of the important security and transactions feature currently invented and assigned to the applicant. For the sake of economy, the following US patents and published patent applications are incorporated by reference for all purposes:

TABLE 1.0

Patents and Published Patent Applications owned by the Applicant, related to the present invention and incorporated by reference herein.

| Pat. or Publication No | Inventor | Date | Title |
|---|---|---|---|
| 6,805,288 | Routhenstein | Oct. 19, 2004 | Method for Generating Customer Secure Card Numbers Subject to Use Restrictions by an Electronic Card |
| 6,592,044 | Wong et al. | Jul. 15, 2003 | Anonymous electronic card for generating personal coupons useful in commercial and securing transactions |
| 6,609,654 | Anderson et al | Aug. 26, 2003 | Method for allowing a user to customize user of a payment card that generates a different payment card number for multiple transactions |
| 5,955,961 | Wallerstein | Dec. 17, 1996 | Programmable Credit Card |
| 2005/82362 | Anderson et al | Apr. 21, 2005 | Anonymous Merchandise Delivery System |
| 2003/61168 | Routhenstein | Mar. 27, 2003 | Method for Generating Customer Secure Card Numbers |

TABLE 1.0-continued

| Patents and Published Patent Applications owned by the Applicant, related to the present invention and incorporated by reference herein. | | | |
|---|---|---|---|
| Pat. or Publication No | Inventor | Date | Title |
| 6,755,341 | Wong et al | Jun. 29, 2004 | Method for storing data in payment card transaction |
| 2005/86160 | Wong et al | Apr. 21, 2005 | Method for storing data in payment card transaction |
| 2005/86177 | Anderson et al | Apr. 21, 2005 | Method for storing data in payment card transactions |
| 2005/80747 | Anderson et al | Apr. 21, 2005 | Method for generating customer one-time unique purchase order numbers |

Additionally, the present invention is not limited to the standard financial (merchandise and cash) transactions, but is also applicable to pseudo-cash transactions (see U.S. Pat. No. 5,913,203 issued to the Applicant, and incorporated by reference), cash back or reward programs (see U.S. Pat. No. 5,937,394 and incorporated by reference).

Other electronic features also currently owned by the Applicant are hereby incorporated by reference and include U.S. Pat. No. 6,755,341 to Wong et al. (Lo Battery Indicator), U.S. Pat. No. 6,607,127 to Wong, (Magnetic Stripe Bridge).

Figure 3:
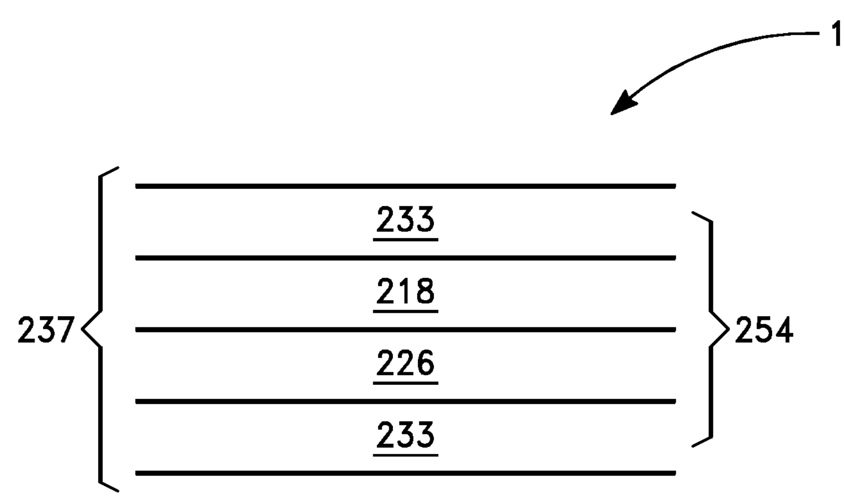
FIG. 3 illustrates the physical layer descriptions of a first embodiment of the multi-standard transaction card.

Referring to FIG. 3, a functional "layer" diagram of the first embodiment of the inventive transaction card 1 is shown. The layers are simplified for illustrative purposes in FIG. 3 and are not nearly shown to the scale and geometry that would be present in a commercial embodiment. A main PCB assembly 237 that comprises the components of the inventive transaction card 1 includes component layers: a finished stack assembly 254, a die carrier subassembly 256, a cover layer 233, and broadcaster core 178 disposed in the body of the assembly 1. The finished stack assembly 254 is also comprised of two sub-layers the PCB layout layer 218 and the stiffener layer 226.

Figure 4:
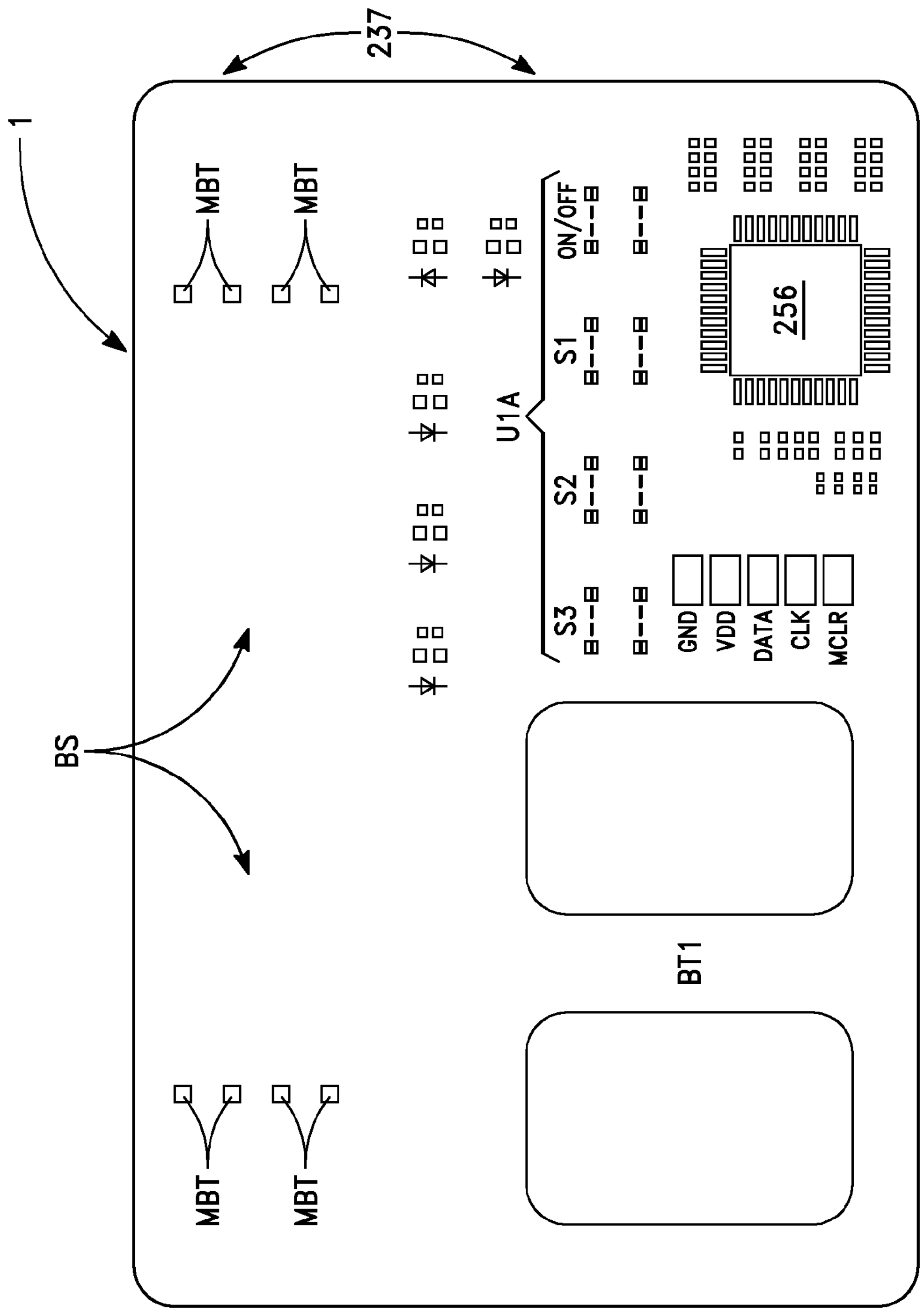
FIG. 4 shows many of the functional components of the first embodiment of the invention.

FIG. 4 is a detailed view of the components of the main assembly body 237 of the transaction card in a first embodiment 1.

The following table may be used with reference to FIG. 4 and FIGS. 7-231 to identify various features, components and configurations for the first illustrative embodiment of the invention.

TABLE 1.1

Figure 43A:
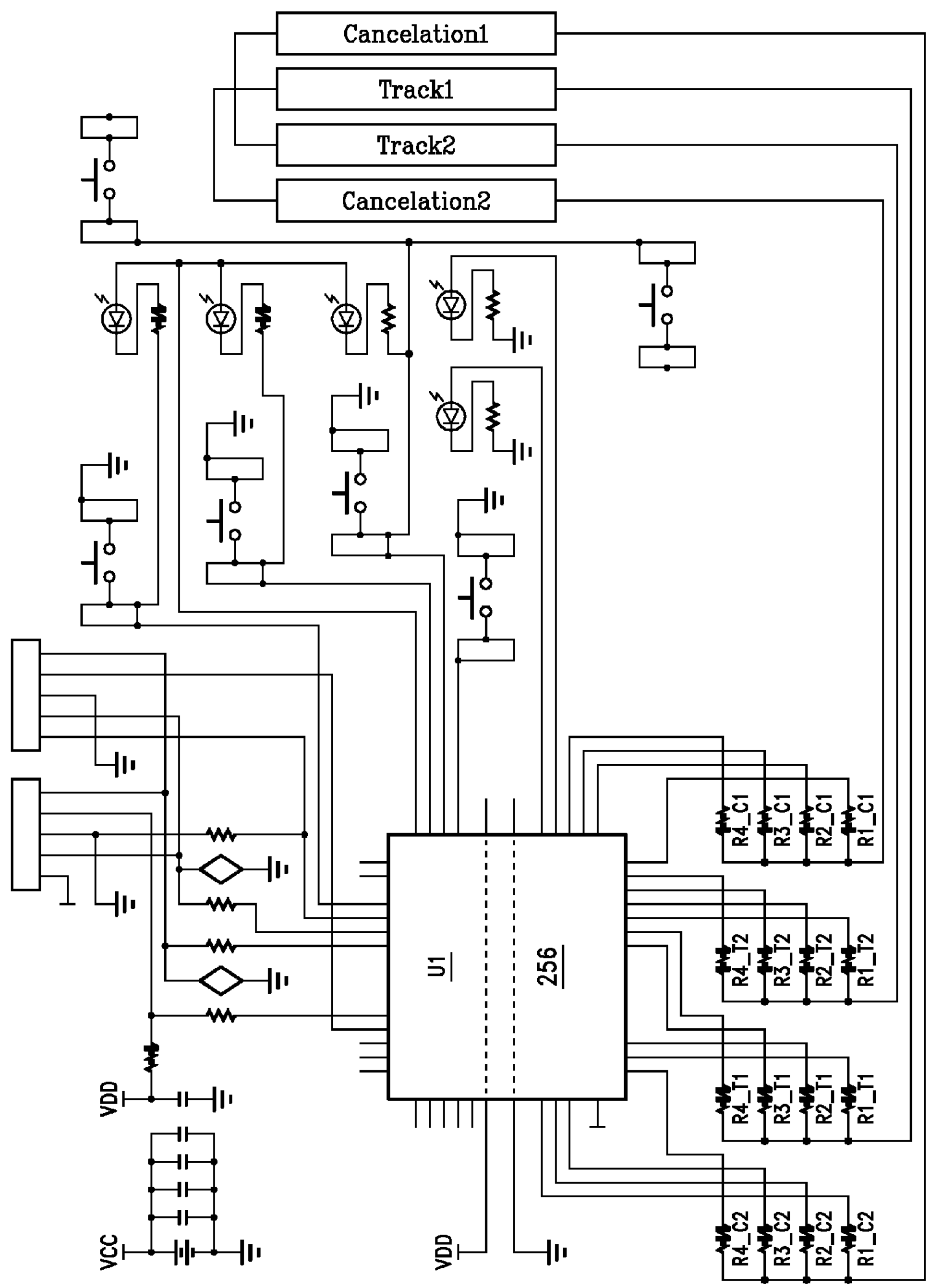
FIG. 43A illustrates a sample RC adapter broadcasting circuit, as it may be implemented in a first embodiment.

| Key #1 FIGS. 4 and 7-23 | | |
|---|---|---|
| INDEX | DESCRIPTION | FIGS. |
| N/A | Finished Stack Assembly | Note 1 |
| N/A | Cover FR4 with Embedded Trip Switch | Note 2 |
| C1-C4 | CAP, CER, .1 μf, 6.3 V, 0201 ± 10% X5R | FIGS. 4, 43A |
| C7, C8 | CAP, CER, .068 μF, 6.3 V, 0201 ± 10% X5R | FIGS. 4, 43A |
| C6 Do not populate | CAP, CER, 1.0 μF, 0402 ± 10% X5R | FIGS. 4, 43A |
| LD1-LD3 | LED Orange 0603, 2.4 V, 35 mcd, 589 nm | FIGS. 4, 43A |
| LD5 | LED Green 0603, 2.6 V, 3.7 mcd | FIGS. 4, 43A |
| LD6 | LED Red 0603, 2.5 V, 4.2 CANDELA | FIGS. 4, 43A |
| R_MCLR, R_SW2, R1-R5 | RES, CER, 200 Ω, 0402, 1/16 W, ±5% | FIG. 4 |

TABLE 1.1-continued

| Key #1 FIGS. 4 and 7-23 | | |
|---|---|---|
| INDEX | DESCRIPTION | FIGS. |
| R4_C1, R4_C2, R4_T1, R4_T2 | RES, CER, 220 Ω, 0402, 1/16 W, ±5% | FIG. 4 |
| R3_C1, R3_C2, R3_T1, R3_T2 | RES, CER, 470 Ω, 0402, 1/16 W, ±5% | FIG. 4 |
| R2_C1, R2_C2, R2_T1, R2_T2 | RES, 820 Ω, 0402, 1/16 W, ±5% | FIG. 4 |
| R1_C1, R1_C2, R1_T1, R1_T2 | RES, (1.2K)1200 Ω, 0402, 1/16 W, ±5% | FIG. 4 |
| R6, R33 | RES, 33 KΩ, 0402, 1/16 W, ±5% | FIG. 4 |
| ESD3, ESD4 Do Not Populate | RES, 10 MΩ, 0402, 1/16 W, ±5% | N/A |
| U1 | Wirebonding Assembly Drawing for PIC18F | FIGS. 18A-19B |
| ON/OFF, S1, S2, S3 | Dome Switches | FIGS. 4, 43A |
| BT1 | Varta Battery | FIG. 4 |
| N/A | Epoxy, Die Attach, Conductive | n/a |
| N/A | IC Fill | n/a |
| N/A | Z-Axis Tape 1" wide | n/a |
| N/A | Catalyst, Lamination Adhesive | n/a |
| N/A | Resin, Lamination Adhesive | n/a |
| TRACK 1&2 Cancelation 1&2 | Encoder Coils | FIG. 21A-23 |

A sample listing of component parts is listed for the first embodiment 1 in Appendix A of U.S. Ser. No. 60/675,388, which is incorporated by reference herein.

Figure 5:
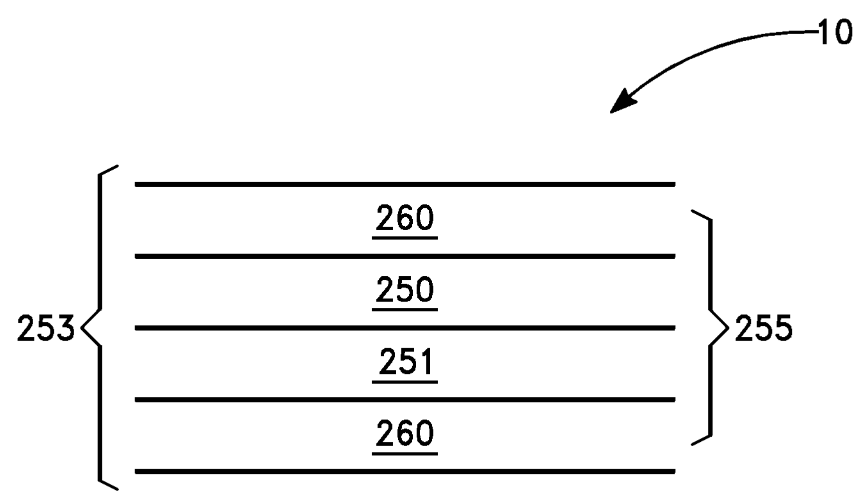
FIG. 5 illustrates the physical layer descriptions of the second embodiment of the multi-standard transaction card.

Referring now to FIG. 5, a second embodiment of the invention in the form of an inventive multi-standard transaction card 10 is illustrated in a "layer" diagram as well. Like the first embodiment 1 discussed in FIGS. 3 and 4, the "layers" are simplified in terms of dimension and geometry. A main assembly 253, includes a finished stack up assembly 255, cover layer(s) 260, and broadcaster core 242 disposed in the body of the cover layer 260. Alternately the core 242 may be disposed in the body of another layer.

Figure 6:
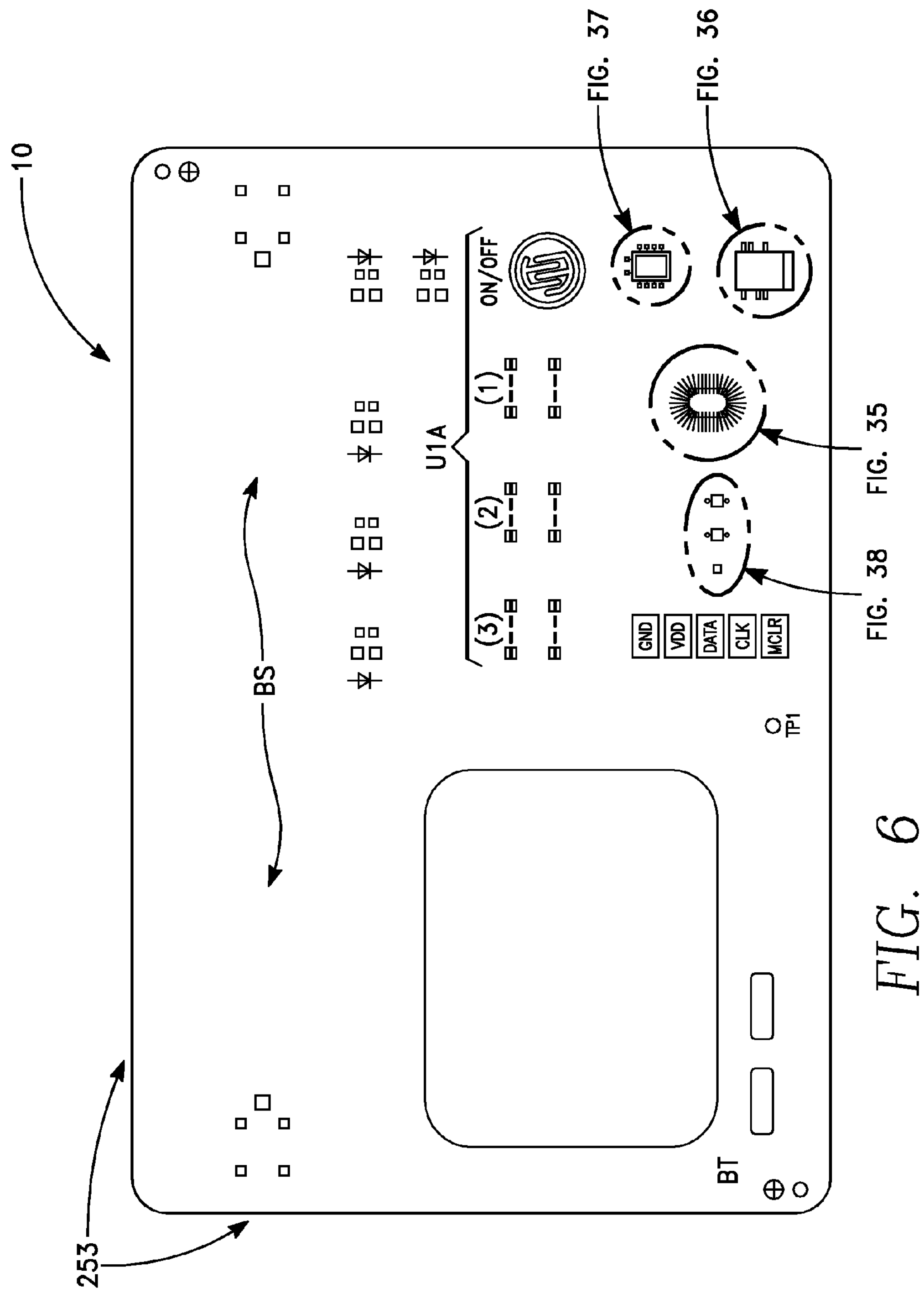
FIG. 6 illustrates the printed circuit board layout for the second embodiment of the inventive transaction card.

FIG. 6 is a detailed view of the main assembly 253 of the second embodiment of the transaction card 10. The following table may be used with reference to FIG. 6 and FIGS. 24-39 to identify various features, components and configurations for the second illustrative embodiment of the invention.

TABLE 2.1

| KEY TO FIGS. 6; 24-39B | | |
|---|---|---|
| Index | Description of Component | FIGS. (if relevant) |
| BT1 | 3 V BATTERY | FIG. 39 |
| N/A | FINISHED STACK UP ASSEMBLY | FIG. 24 |
| N/A | COVER FR4 PLATED WITRIPSWITCH | FIG. 6 |
| C2 | CAP, CER, 22 pF, 0201, ±10% COG, 25 V, X5R | FIG. 39 |
| C8 | CAP, CER, 1000 Pf, 0201, ±10% COG, 25 V, X7R | FIG. 39 |
| C3-C7, C10-C19, C21-C25 | CAP, CER, .1 NF, 0201, ±10% 6.3 V, X5R | FIG. 39 |
| C9 | CAP, CER, .022 pF, 0201 + 80/−20%.6.3 V, Y5V | FIG. 39 |
| C20, C1 | CAP, CER, .033 pF, 0201, +80/−20%, Y5V | FIG. 39 |
| LED1-LED3 | LED YELLOW 0603, 2.4 V, 35 mcd, 589 nm | FIG. 39 |
| LED4 | LED GREEN 0603, 2.6 V, 3.7 mcd | FIG. 39 |
| LED5 | LED RED 0603, 2.5 V, 4.2 CANDELA | FIG. 39 |

TABLE 2.1-continued

KEY TO FIGS. 6; 24-39B

Figure 35:
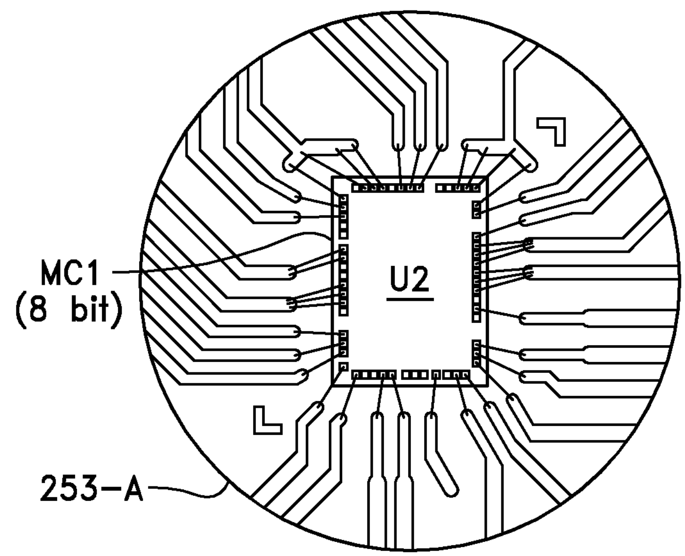
FIG. 35 illustrates the details of a sample 8 or 10-bit microcontroller as it may be implemented in the second embodiment of the invention.
Figure 36:
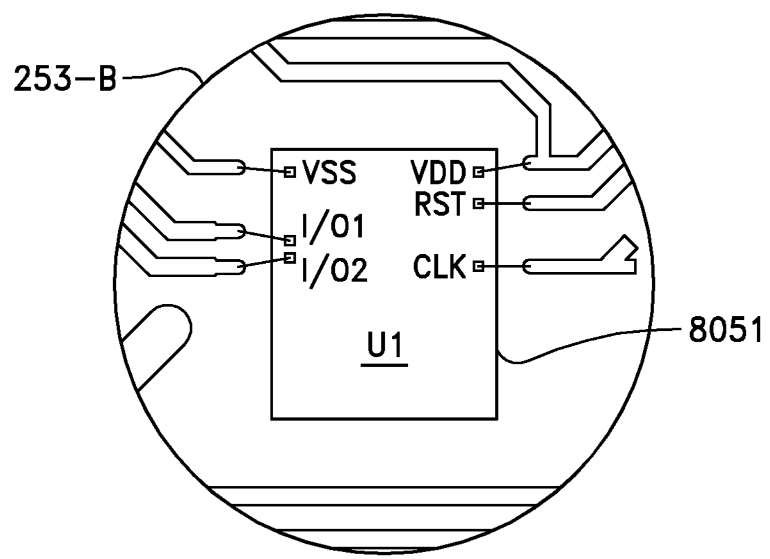
FIG. 36 shows a smart card processor as it may be implemented in the second embodiment.
Figure 37:
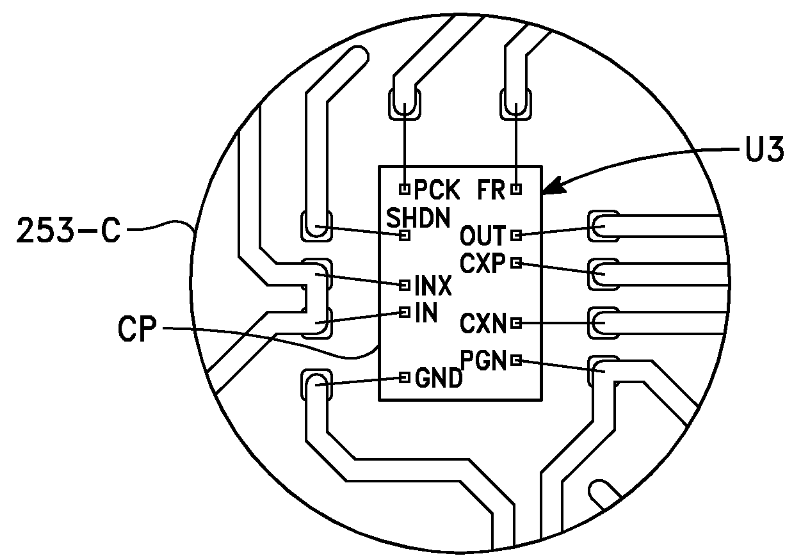
FIG. 37 illustrates a sample charge pump as it may be implemented in the second embodiment.
Figure 38:
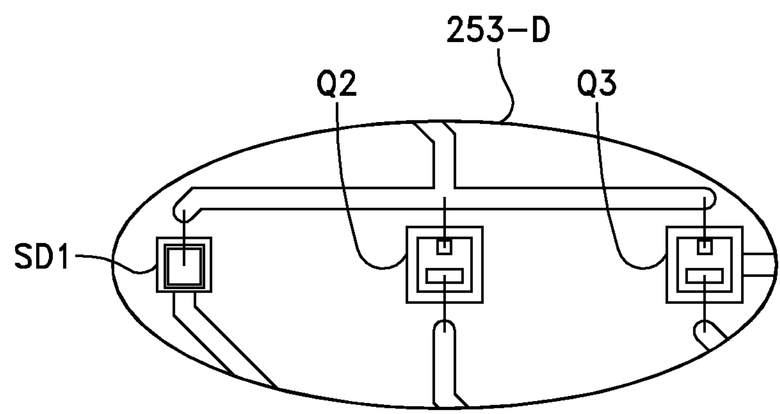
FIG. 38 illustrates three sample features of the second embodiment.
Figure 39A:
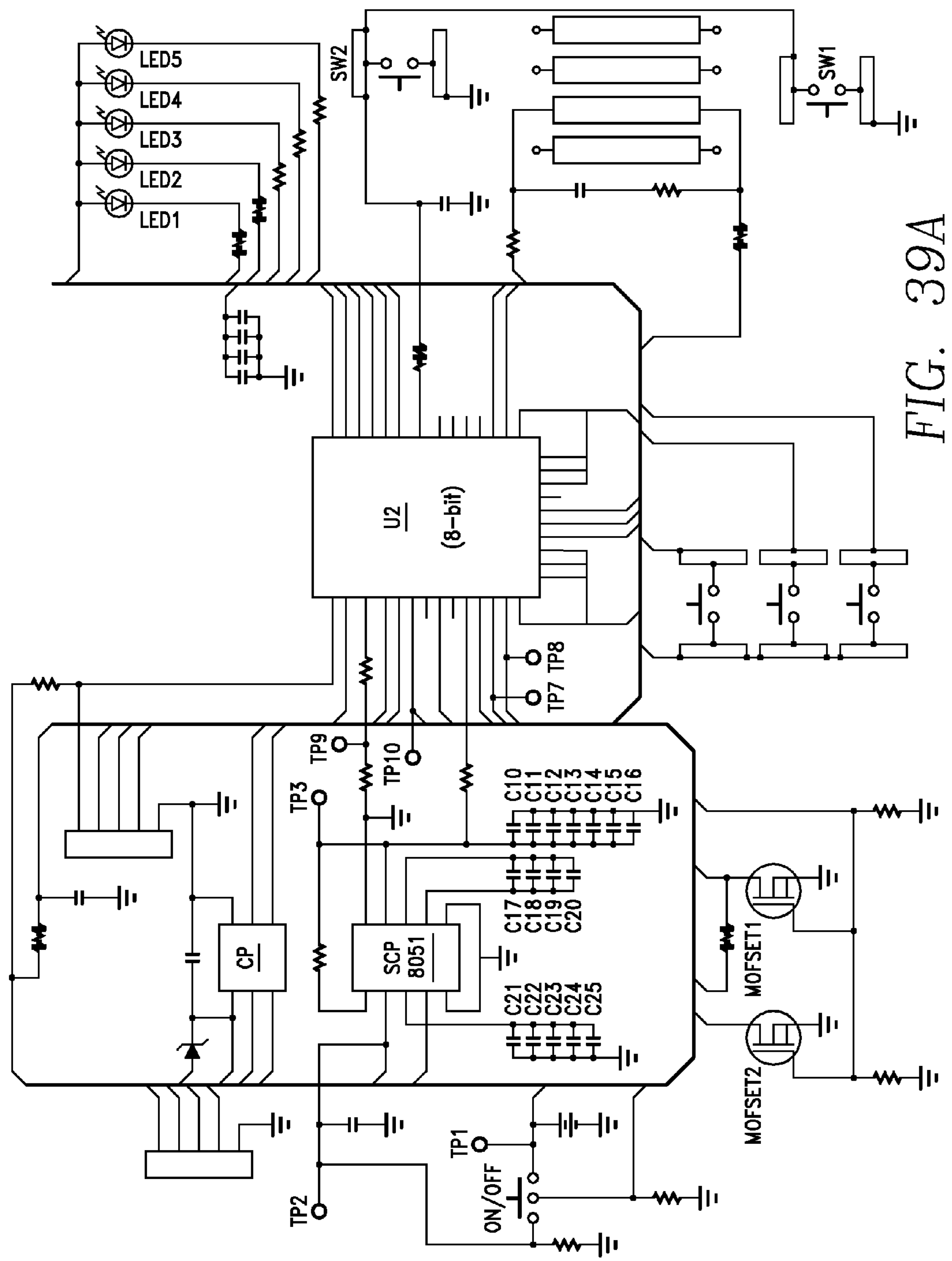
FIG. 39A illustrates the printed circuit board layout in a second embodiment of the invention.
Figure 39B:
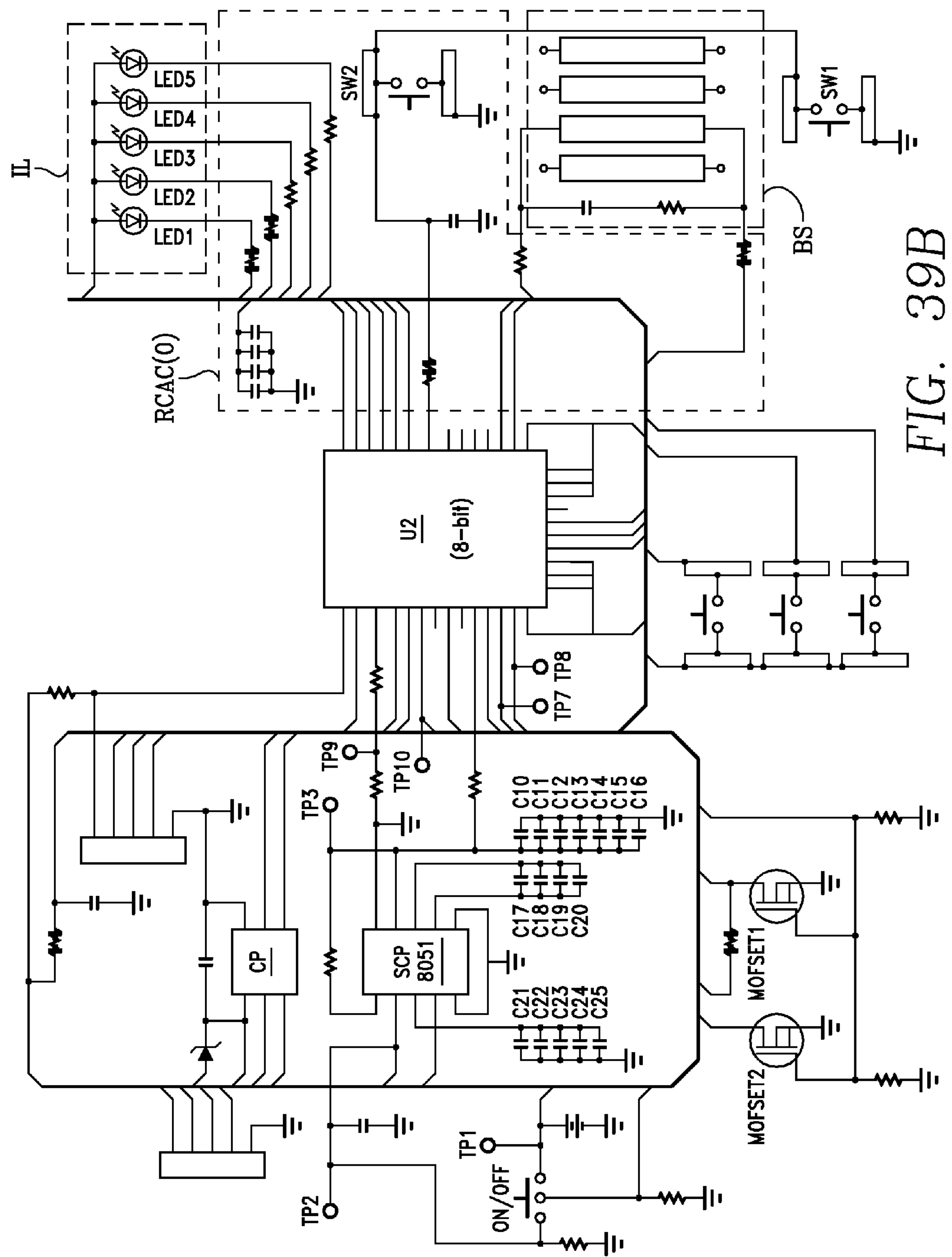
FIG. 39B illustrates a functional diagram of the printed circuit board shown in FIG. 39A.
Figure 40A:
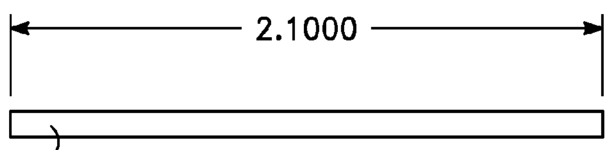
FIGS. 40A-D illustrate the broadcasting coil for the broadcasting core from 4 views, as it may be implemented in a second embodiment.
Figure 40B:
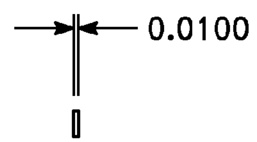
Figure 40C:
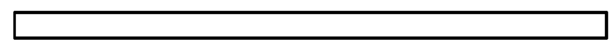
Figure 40D:
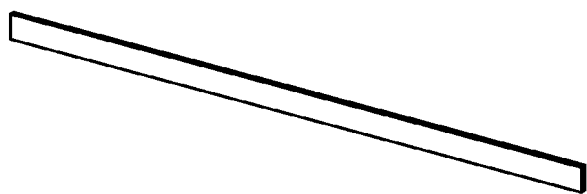

| Index | Description of Component | FIGS. (if relevant) |
|---|---|---|
| Q2, Q3 | CP324-2N7002-WS DIE, N CHANNEL MOSFET | FIGS. 38, 39 |
| R25 | RES, CER, 00, 0402 | FIG. 39 |
| R1, R22 | RES, CER, 4.7K0, 0402, 1/16 W, ±5% | FIG. 39 |
| R2 | RES, CER, 33KQ, 0402, 1/16 W, ±5% | FIG. 39 |
| R5, R6, R8 | RES, 6200, 0402, 1116 W, ±5% | FIG. 39 |
| R11 | RES, 3900, 0402, 1/16 W, ±1% | FIG. 39 |
| R12 | RES, 1.2K0, 0402, 1/16 W, ±1% | FIG. 39 |
| R15 | RES, 1.5K0, 0402, 1/16 W, ±1% | FIG. 39 |
| R16, R23, R24 | RES, 100KO, 0402, 1/16 W, ±1% | FIG. 39 |
| R27, R32, R33 | RES, 33011, 0402, 1/16 W, ±5% | FIG. 39 |
| R28, R30, R31 | RES, 39K0, 0402, 1/16 W, ±5% | FIG. 39 |
| R29 | RES, 1MU, 0402, 1/16 W, ±1% | FIG. 39 |
| SD1 | S9083__DIE, SCHOTTKY DIODE, DIE FORM, .035-0.5 V | FIGS. 38, 39 |
| U1 | P8WE6032AEV__DIE, SMART CARD 8051 BASED | FIGS. 36, 39 |
| U2 | PIC16F77__DIE, BBIT CMOS MICROCONTROLER | FIGS. 35, 39 |
| U3 | MAX1759__DIE, CHARGE PUMP BUCK/BOOST | FIGS. 37, 39 |
| S1, S2, S3 | DOME SWITCHES | FIG. 39 |
| ON/OFF | DOME SWITCHES | n/a |
| N/A | EPDXY, DIE ATTACH, CONDUCTIVE | H2OE |
| N/A | IC FILL | FP-6401 |
| N/A | CATALYST, LAMINATION ADHESIVE | n/a |
| N/A | Z-AXIS TAPE 1"WIDE | N/A |
| N/A | RESIN, LAMINATION ADHESIVE | n/a |
| | BROADCASTER COIL | FIGS. 40A-I |
| DIA: .001" TENS, 10 GRAMS, ELONG: 0.5-3.OG | WIRE FOR IC BONDING | N/A |
| N/A | NO CLEAN SOLDER | N/A |
| N/A | KAPTON | N/A |
| N/A | FLUX | N/A |

A sample listing of component parts is listed for the second embodiment 10 in Appendix B of U.S. Ser. No. 60/675,388, which is incorporated by reference herein.

Regarding many of the embodiments in general, FIGS. 4 and 6 show the various layers of the transaction cards 1, 10 from a front/top view. The dimensions of the electronic Smart Card are 3.375 inches wide by 2.125 high by 0.003 inches thick, which are the standard dimensions of a plastic transaction card—ISO 7813. The use of standard dimensions for the Enabled Card allows it to be used in all existing point-of-transaction magnetic stripe terminals and in all card issuing and personalization equipment. This critical achievement of meeting standard dimensional specifications of standard magnetic stripe cards is due in part to the unique components, construction techniques and procedures of the Enabled Card.

Figure 7B:
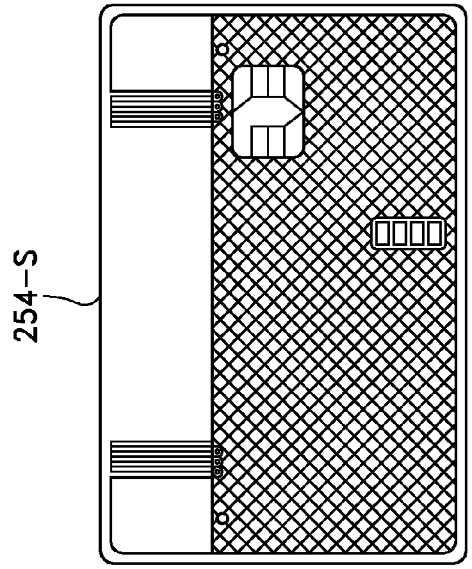
FIGS. 7A-C illustrate assembly parts in the form of a stack-up assembly for the first embodiment of the invention, from front, rear and assembled perspectives, respectively.
Figure 7A:
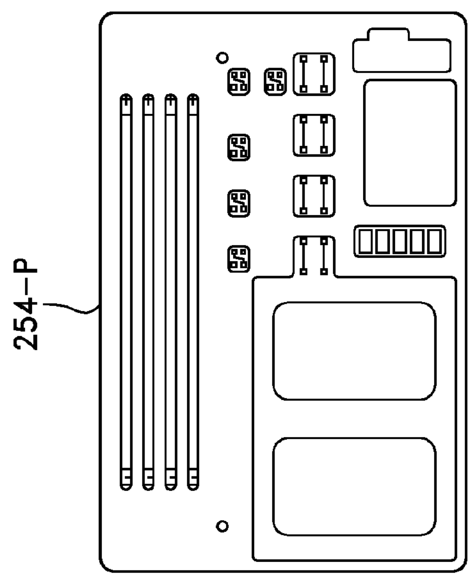
Figure 7C:
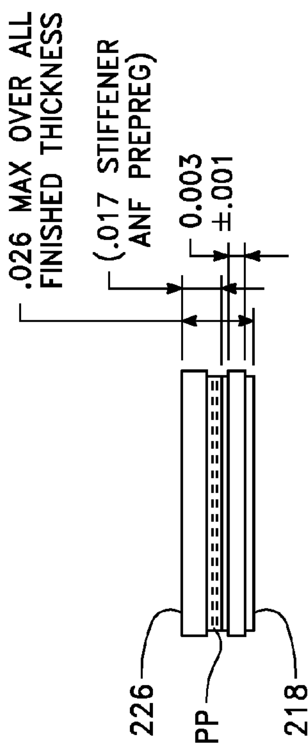

Referring now to FIGS. 7A-7C, the stack assembly 254 for the first embodiment of the inventive card 1 is shown from the front, rear and side views respectively. The stack assembly 254 generally includes two sublayers, the PCB layout 218 and the stiffener layer 226, each of which will be discussed individually in more detail below. FIG. 7C is a simplified illustration of the assembly of the two sublayers 218 and 226, which "sandwiches a prepreg PP layer-type adhesive in between the two sublayers 218 and 226. This is layer is made with Laminate FR4 stiffener to PCB on the primary side with prepreg material PP. In order to compensate prepreg PP, it is advantageous to avoid run off adhesive into open cavities areas. Bowing of PCB on open cavity areas of the stiffener is not allowed. PCB must be flat after lamination of stiffener to PCB.

Figure 8A:
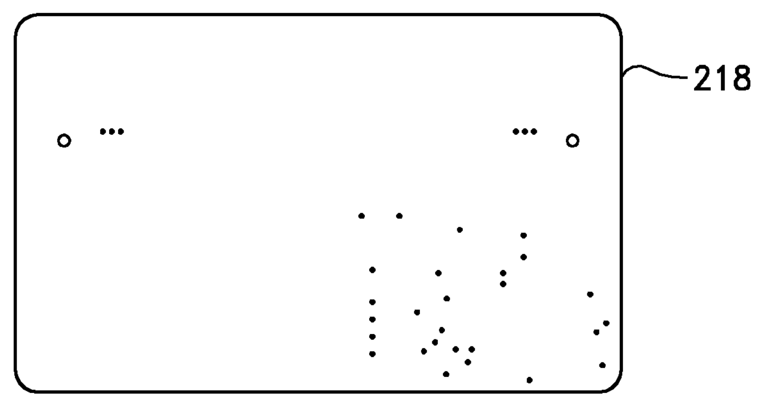
FIGS. 8A and B illustrate features of the stack-up assembly for the first embodiment from front and side views, respectively.
Figure 8B:
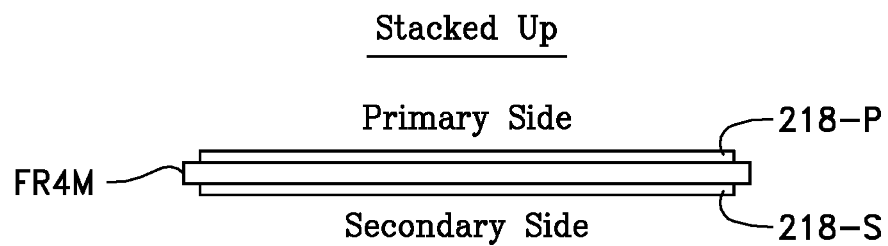

FIGS. 8A and 8B illustrate the properties of the PCB layout 218 of the first embodiment and illustrate the printed circuit board configurations from a top and side views, respectively. In order to make the PCB layer 218 in the present invention, the following steps are performed: the boards are fabricated in accordance with IPC-A-600, class 2 and all other IPC applicable specs unless other specified; the board material is in accordance with IPC-4101/24 or 25 (Tg>150 C) and the color is natural yellow. The board process is SMOBC/HSAL, the standards of which are hereby incorporated by reference. The mask is applied in accordance with IPC-SM-840 type B, class 2, the standard of which is incorporated herein by reference. The mask 218-L1-M should be probimer or equivalent LPU. The color should be green. The thickness is 0.0001 min. 0.001 max. The finish should be plating shall be 35 u" to 40 u" of soft gold top and bottom with over approximately 100 u" and 150 u" of nickel. The date code, vendor id and UL stamp are to be placed on a secondary side. In addition, tolerances require an etch that is +/−0.002 from design, so the artwork must be compensated to achieve nominal dims. 0.010 line min/0.007 space min. flatness/warp shall not exceed 0.007 inch/inch max.

Figure 11:
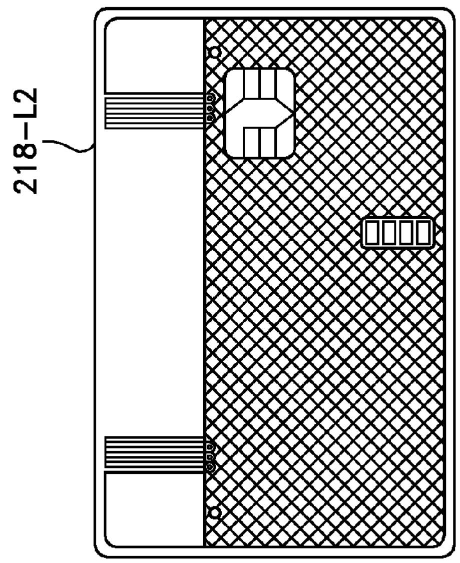
FIG. 11 illustrates the bottom portion for the printed circuit board layer or component in a first embodiment of the inventive transaction card.
Figure 12:
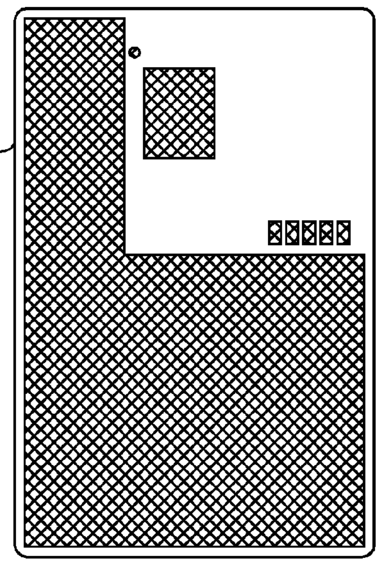
FIG. 12 illustrates the bottom mask portion for the printed circuit board layer or component in a first embodiment of the inventive transaction card.
Figure 9:
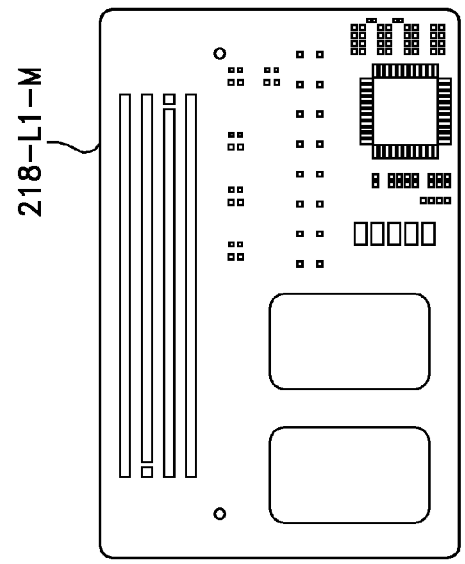
FIG. 9 illustrates top mask portion for the printed circuit board layer or component in a first embodiment of the inventive transaction card.
Figure 10:
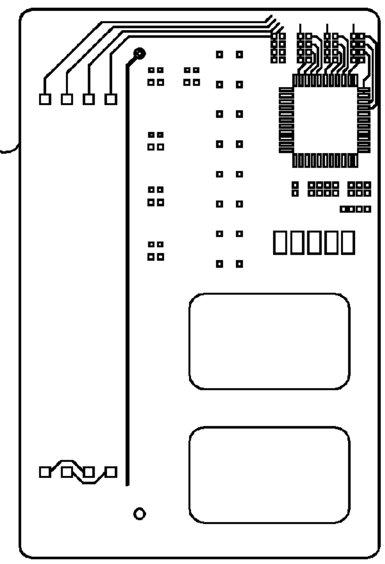
FIG. 10 illustrates top portion for the printed circuit board layer or component in a first embodiment of the inventive transaction card.

FIGS. 9-12 illustrate four sample layers of the PCB layer 218. The PCB layer 1 mask 218-L1-M is shown in FIG. 9 and the process of applying the mask is described above in FIG. 8A-B. FIG. 10 is the top of the first layer of the PCB layer 218-L1. FIG. 11 illustrates the bottom layer of the PCB 218-L2 for the first embodiment, and FIG. 12 illustrates a sample mask for the bottom layer of the PCB 218-L2-M.

Figure 13A:
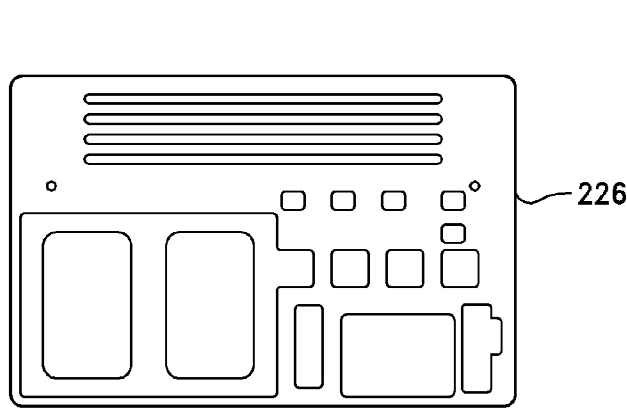
FIGS. 13A and 13B illustrate the plated stiffener for use in a first embodiment of the transaction card.
Figure 13B:
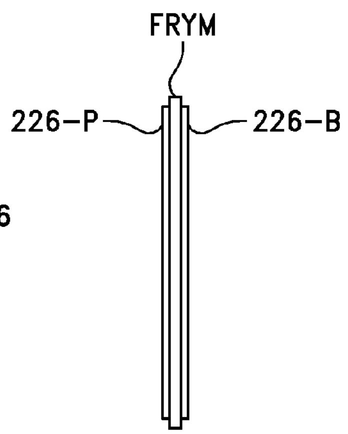

FIGS. 13A-15 illustrate the stiffening layer 226, for a first embodiment of the invention 1. FIGS. 13A and 13B illustrate the outline and sample dimensions of the plated stiffener. This stiffener 226 is created by performing the following steps: the boards are fabricated in accordance with IPC-A-600, class 2 and all other IPC applicable specs unless other specified, (the standards which are hereby incorporated by reference herein); the board material is in accordance with IPC-4101/24 or 25 (Tg>150 C) and the color is natural yellow. The finish is 100 u" and 150 u" max of nickel over copper. FIG. 13B illustrates that FR4 material FR4M is placed between 2 parts 226-P and 226-B of the stiffener layer 226.

Figure 14:
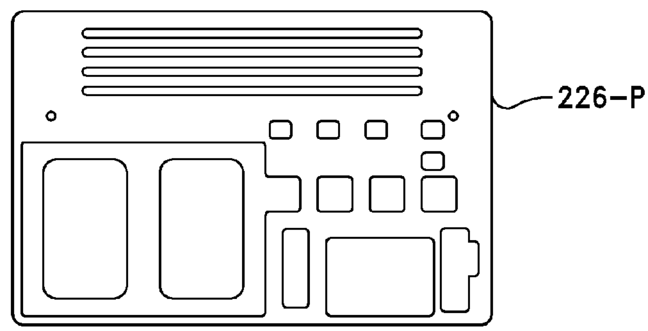
FIG. 14 illustrates the top layer of the plated stiffener.
Figure 15:
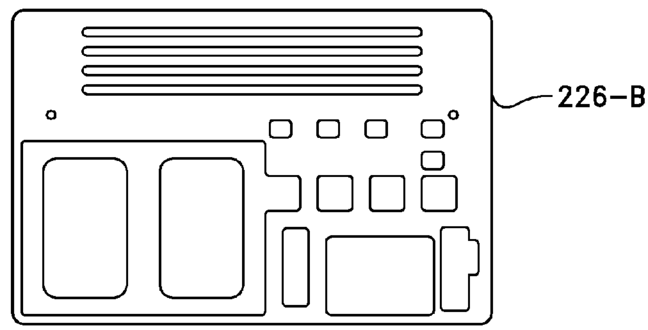
FIG. 15 illustrates the bottom layer of the plated stiffener.

FIGS. 14 and 15 illustrate the top or primary 226-P and bottom or secondary 226-B layers of the stiffener layer 226 for a first embodiment of the card 1.

Figure 16:
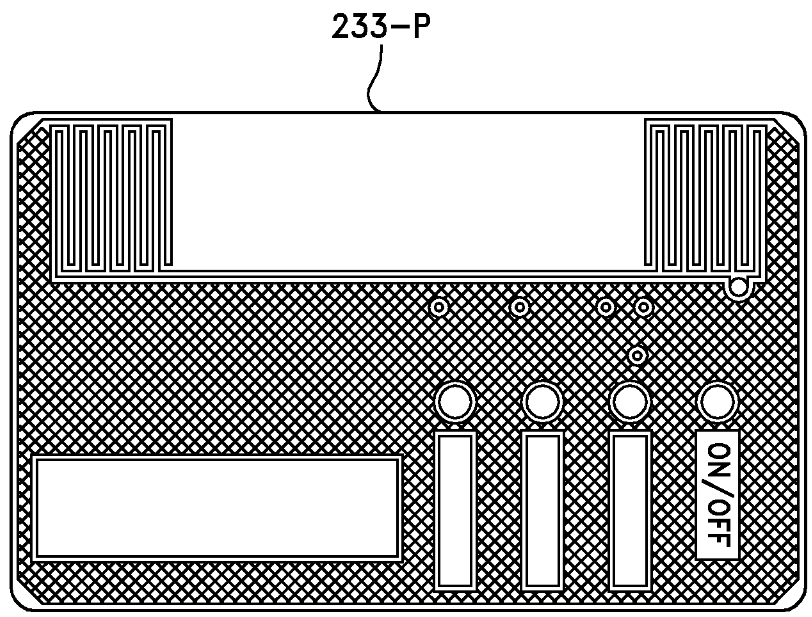
FIG. 16 illustrates the first layer top for the cover portion or layer of a first embodiment.
Figure 17:
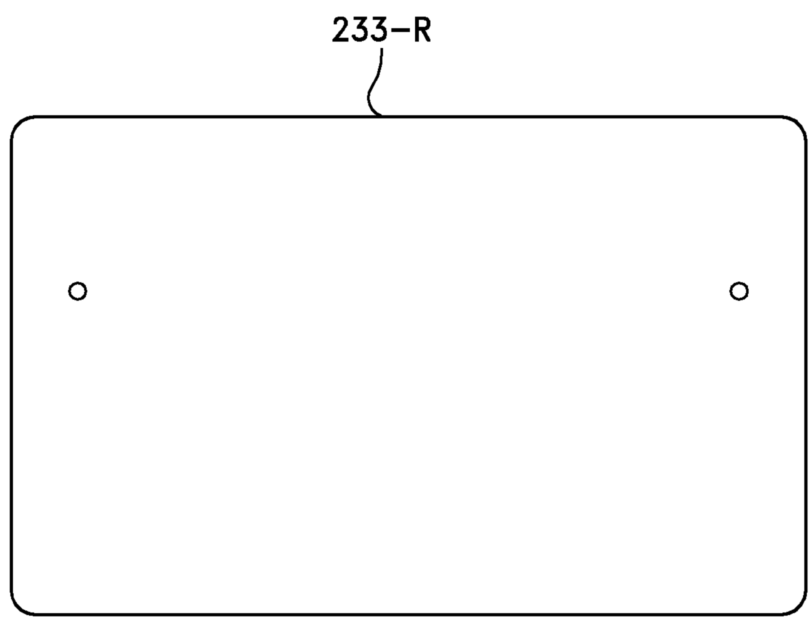
FIG. 17 illustrates the bottom layer of the cover portion of the inventive transaction card in a first embodiment.

FIGS. 16 and 17 illustrate two distinct layers of the cover layer 233 for the first embodiment. FIG. 16 is a top layer 233-P, which clearly shows the distinctive features of the first embodiment of the card 1 as shown in FIG. 4 (as well as FIGS. 1 B and 1 C). FIG. 17 illustrates the bottom layer 233-R of the cover layer 233.

FIGS. 18A and B illustrates the PCB die layout 234 from a front and side view, respectively. The boards are fabricated in accordance with IPC-A-600, class 2 and all other IPC applicable specs unless other specified. The board material is in accordance with IPC-4101/24 or 25 (Tg>150 C) and the color is natural yellow. The board process is SMOBC/HSAL. The finish requires that plating shall be 35 u" to 40 u" of soft gold top and bottom; ver approximately 100 u" and 150 u" of nickel. The date code, vendor id and UL stamp are placed on a secondary side.

FIG. 19A illustrates the front of the die assembly 234-F/U1 as it may be implemented in the first embodiment 1. The specific functional and electrical aspects of the microprocessor U1 in the first embodiment are discussed below in FIGS. 43A-B et seq. FIG. 19B illustrates the rear wiring of the microprocessor U1.

Figure 20A:
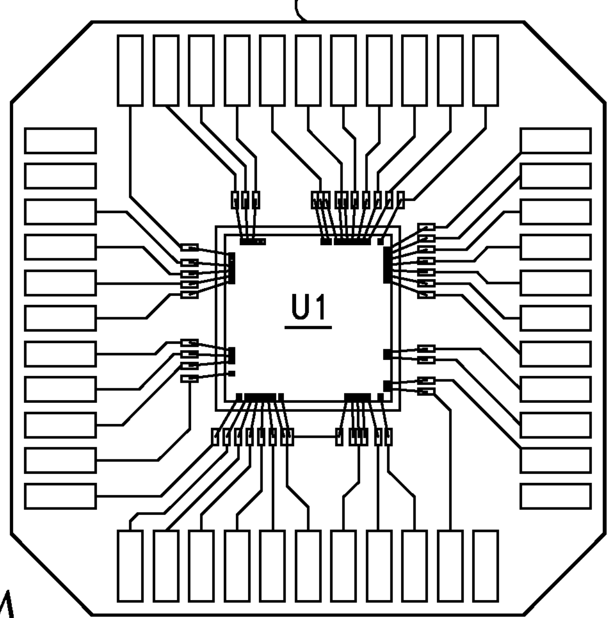
FIG. 20A illustrates a sample details and pins of the microprocessor in a first embodiment.
Figure 20B:
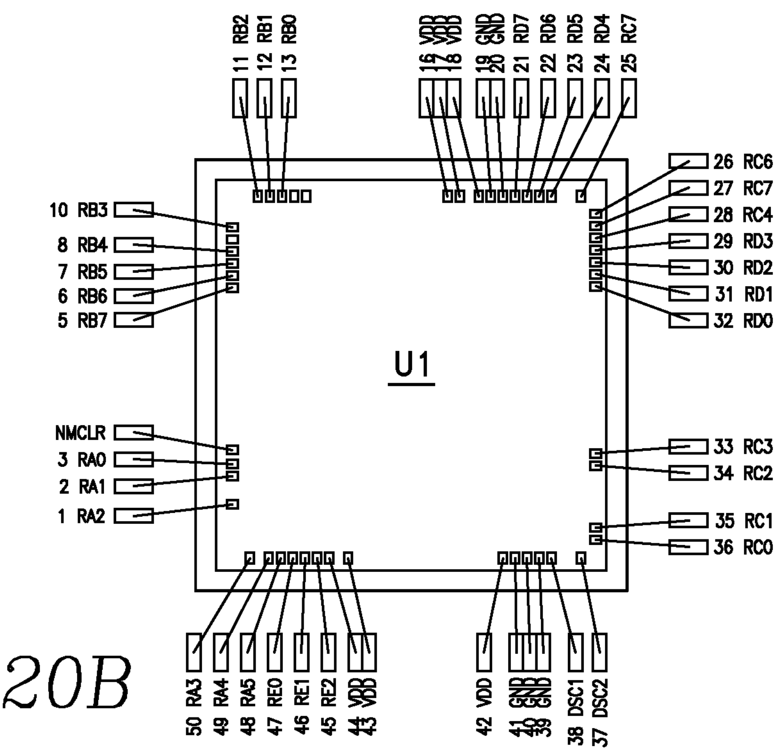
FIG. 20B illustrates the details of the pins for wirebonding assembly in a first embodiment.

FIG. 20A illustrates the wire bond diagram from the die assembly 256 for the primary processor U1 for the first embodiment. FIG. 20B illustrates the wire assembly from a rear view. In a preferred embodiment, the processor is a Microchip 10-bit microcontroller model 18F4520, the specifications of which are included in Appendix D of U.S. Ser. No. 60/675,388, and are hereby incorporated by reference. As can be appreciated by those skilled in the art, other microprocessors could serve as a replacement for the model used in the first embodiment. However, considerations of manufacturing and commercial practicality should inform the choice.

Referring now to FIGS. 21A-23, a broadcaster coil assembly 178 for the first embodiment is shown. The material for the broadcaster coil assembly 178 is specifically designed for the facilitation the magnetic flux broadcast, and is made of a Cartech HYMU 80 CORE 109. FIGS. 21A-D illustrate four different views of the coil 178.

In preparing the coil 178 for assembly, it is important that the sharp edges be sanded and that the core winding 109 of the type as shown in FIGS. 22A-C are used. A sleeving type of stock number 10-1004-OOA is preferable and the sleeving length is 3.05+/−0.003. A heat-shrinkable sleeving is to be added to the core 178 prior to winding. The resistance of the 36.6+/−0.5 Ohms is preferable for the first embodiment and inductance is 7.9+/−10% mH. There should not be any short between the winding 109 and the core 178. The end of the coils 178E-178E' are to be tacked into place with instant adhesive (not shown).

Figure 23A:
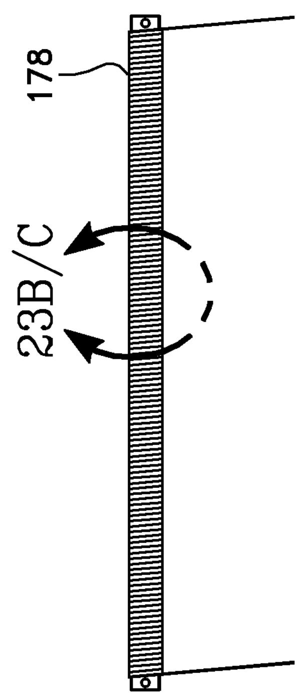
FIG. 23 illustrates details for the proper broadcasting core winding in a first embodiment.
Figure 23C:
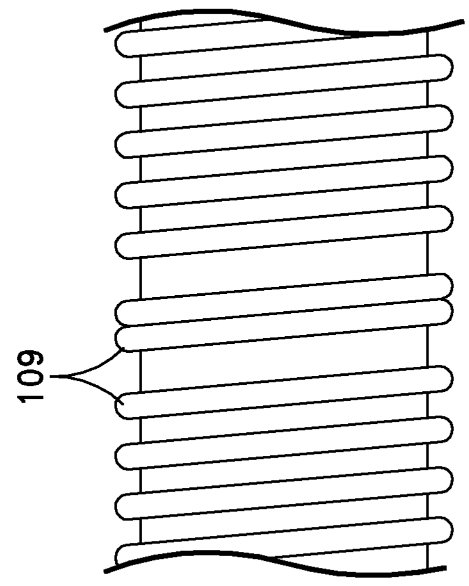
Figure 23B:
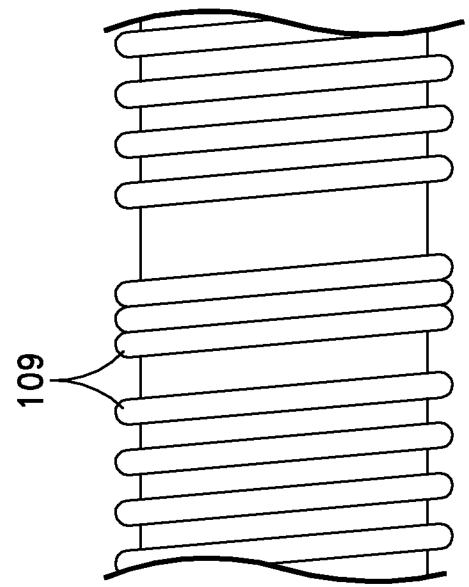

FIG. 23 illustrates the proper winding for the core material 109. The core should be wound with a right hand sense. In a preferred configuration of the first embodiment 44 wire gauge is used, turned 685 times with a 0.0035 pitch. As can be appreciated, the core should be free of defects. The wire is preferably MWS INDUSTRIES NEMA MW80-C 40QPN-155 NATURAL N/A MAGNET WIRE, 40 GA, 3 A/R N/A 10-1003-OOA Advanced Polymers P/N:080050CST N/A The SLEEVING MATERIAL is ϕ.080.

Figure 24A:
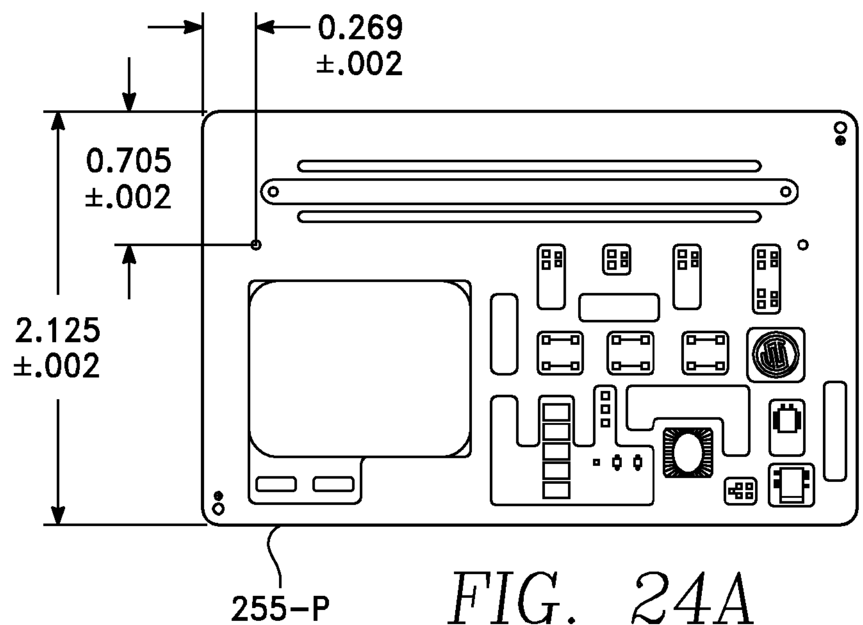
FIGS. 24A-C illustrate the front, rear and side of the stack assembly for use in the second embodiment.
Figure 24B:
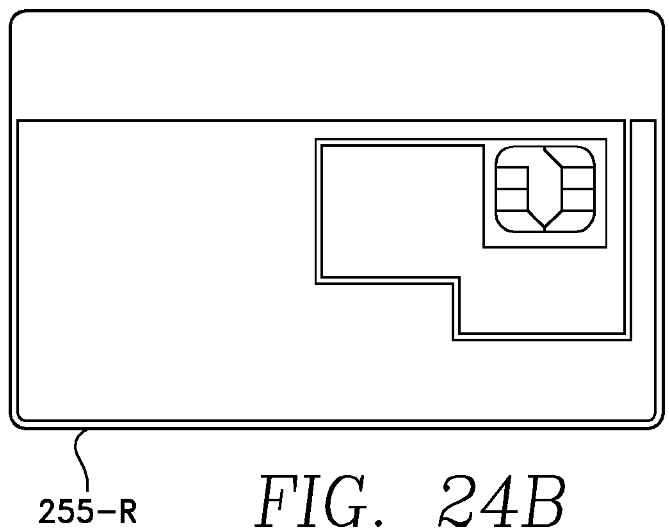
Figure 24C:
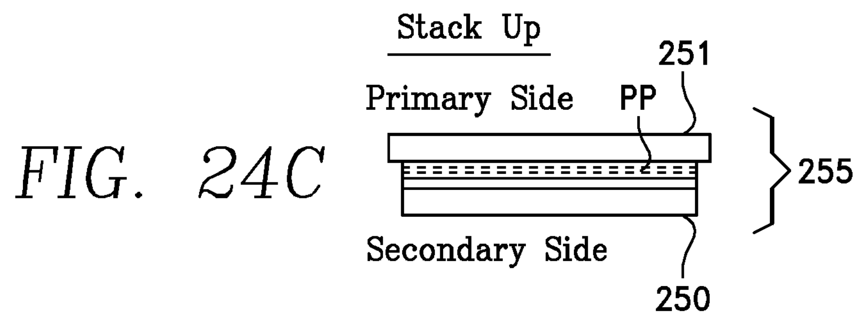

Now returning to the second embodiment 10 of the inventive transaction card, and the components that comprise it, FIGS. 24A-C illustrate the stack assembly 255 for the second embodiment, from front, rear and side views, respectively. Like the stack assembly in the first embodiment, discussed in FIGS. 7A-C, this is layer is made with Laminate FR4 stiffener to PCB on primary side with prepreg material PP. Compensate prepreg PP to avoid run off of adhesive into open cavities areas. Bowing of PCB on open cavity areas of the stiffener is not allowed. PCB must be flat after lamination of stiffener to PCB.

Figure 25A:
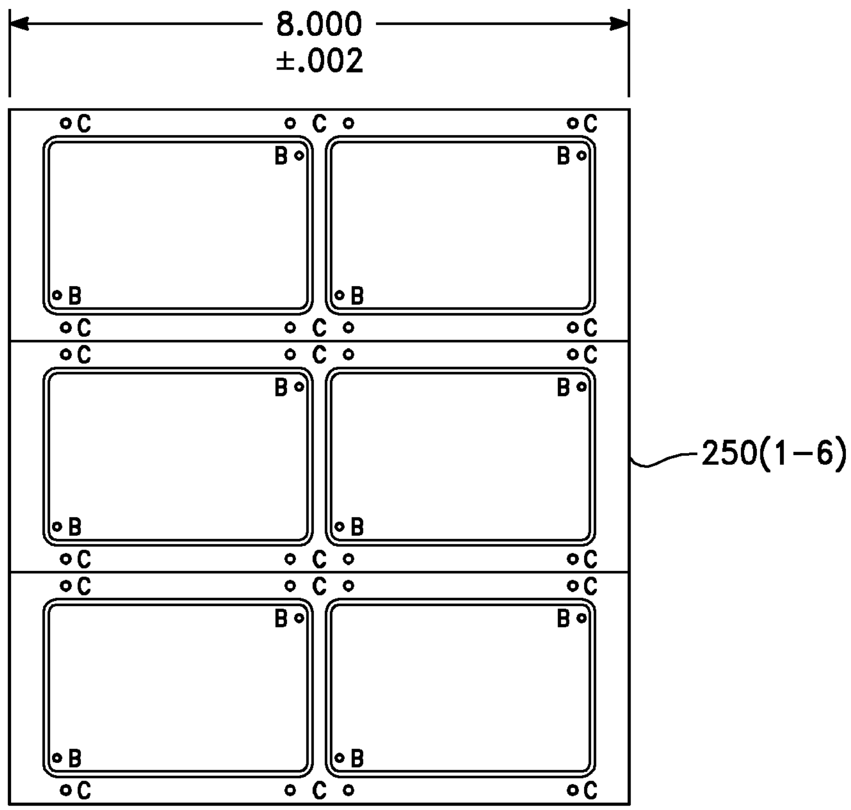
FIGS. 25A and B illustrate a sheet of printed circuit boards from front and side views, respectively.
Figure 25B:
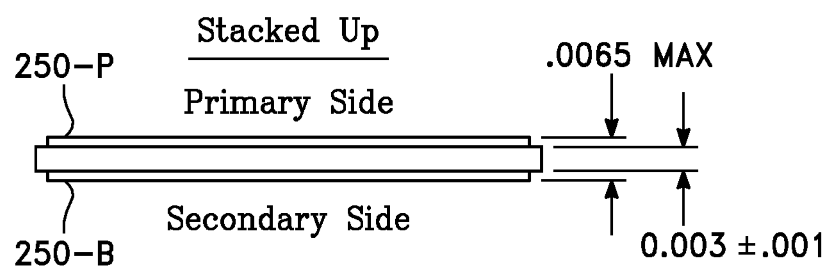

FIGS. 25A and B illustrate how the printed circuit board components 250 may be manufactured in a "sheet" of six, 250(1-6) in order to facilitate efficient manufacturing of the cards, which must be cost-effectively built. Other numbers of components per sheet may also be used depending on the needs of the end-user, but six is used in a preferred embodiment. In order to make the, PCB layer 250 for the second embodiment, the following steps are performed: fabricate boards in accordance with IPC-A-600, class 2 and all other IPC applicable specs unless other specified; the board material is in accordance with IPC-4101/24 or 25 (Tg>150 C) color is Natural yellow. The board process is SMOBC/HSAL, the standards of which are hereby incorporated by reference. Apply mask in accordance with IPC-SM-840 type B, class 2, the standard of which is incorporated herein by reference. Mask 218-Li-M to be probimer or equivalent LPU. Color to be green. Thickness 0.0001 min, 0.001 max; finish: plating shall be 35 u" to 40 u" of soft gold top and bottom; Over approximately 100 u" and 150 u" of nickel; date code, vendor id and UL stamp to be placed on secondary side. In addition, tolerances require an etch that is +/−0.002 from design, compensate artwork to achieve nominal dims. 0.010 line min/ 0.005 space min. flatness/warp shall not exceed 0.007 inch/ inch max.

Figure 27:
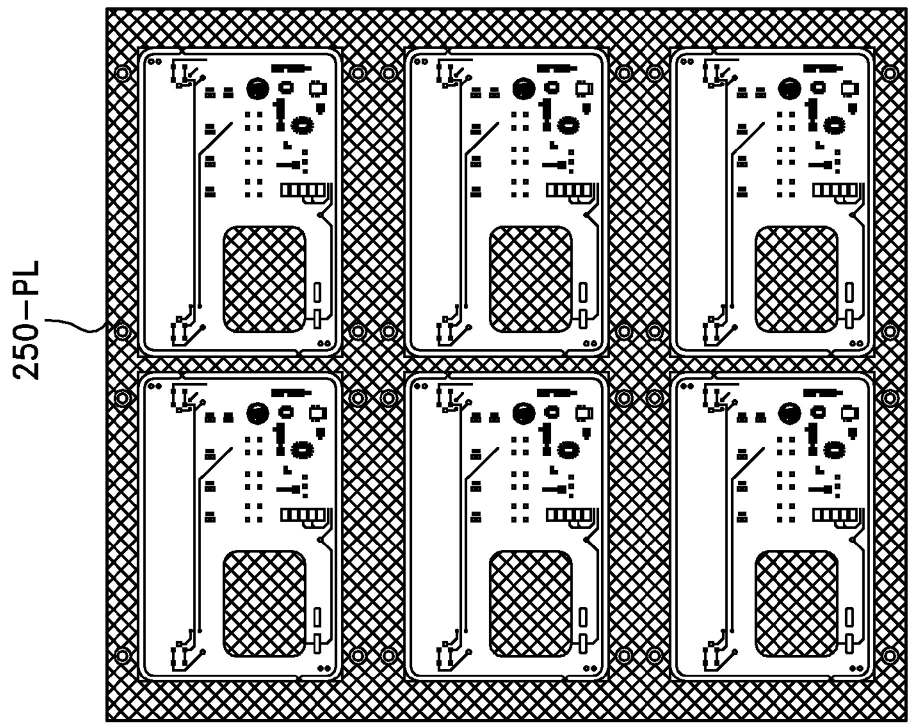
FIG. 27 shows the top layer of the PCB for the second embodiment.
Figure 26:
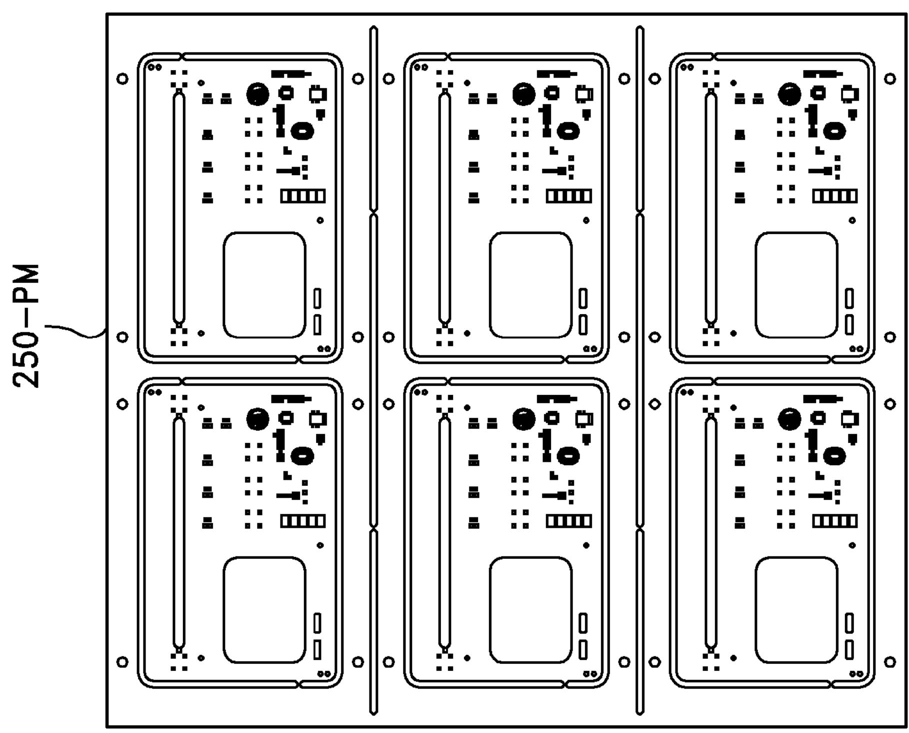
FIG. 26 shows the mask for the top layer of the PCB for the second embodiment.
Figure 29:
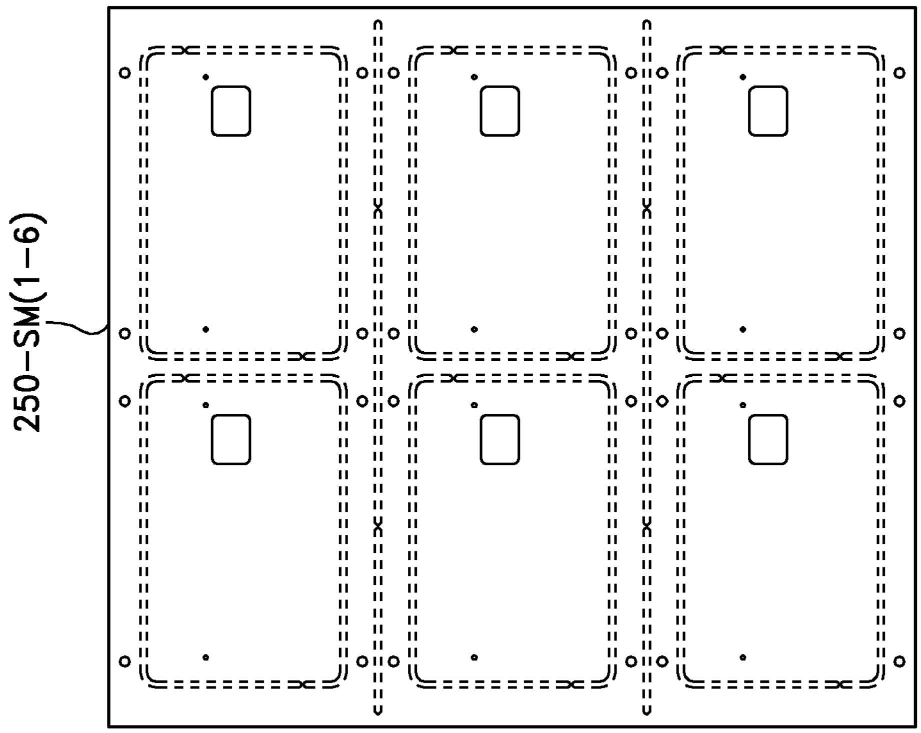
FIG. 29 shows the mask for the bottom layer of the PCB for the second embodiment.
Figure 28:
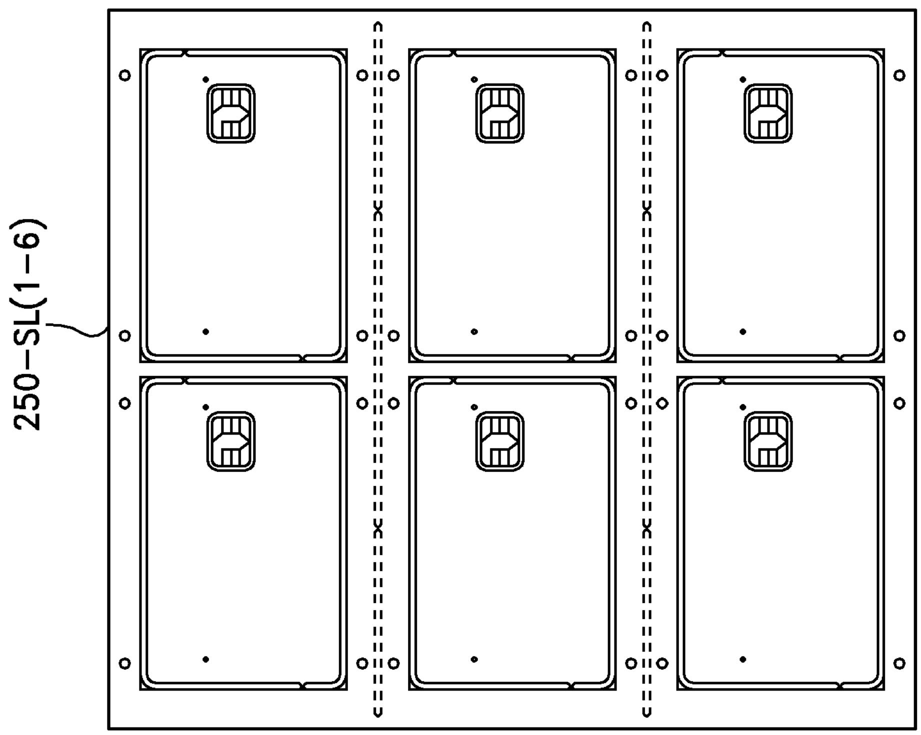
FIG. 28 shows the bottom layer of the PCB for the second embodiment.

FIGS. 26-29 show the other "six-sheet manufacturing layers" of the PCB 250 for the second embodiment of the card 10. FIG. 26 is the mask for the first layer of the PCB 250-P-M (1-6); FIG. 27 is the first or primary layer 250-PL(1-6). FIG. 28 is the bottom or secondary layer 250-S(1-6); and FIG. 29 is the mask for the bottom or secondary layer 250-S-M (1-6).

Figure 30A:
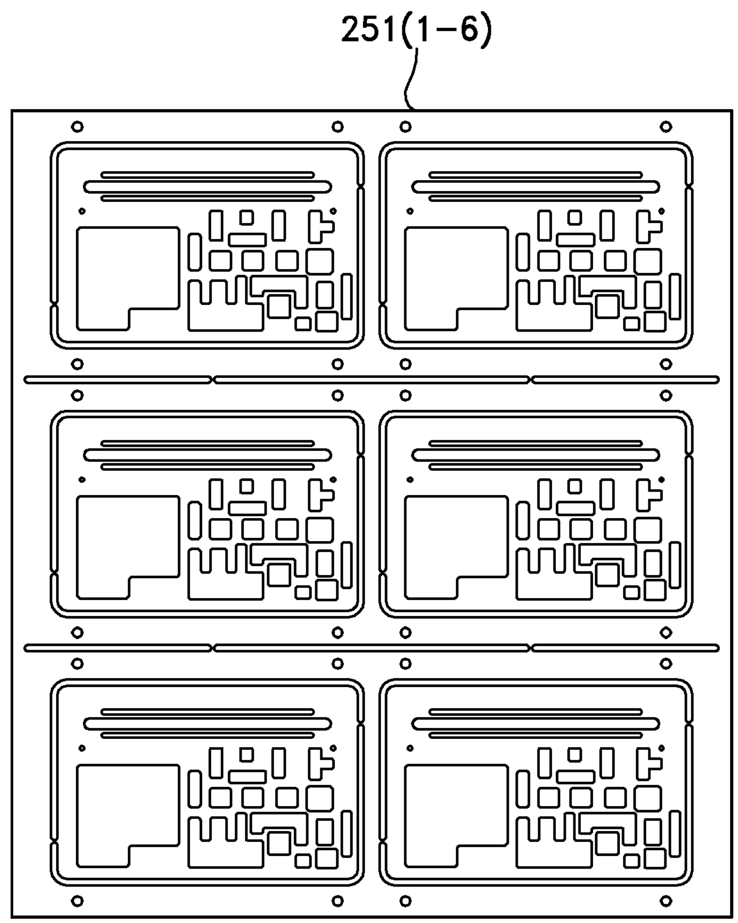
FIGS. 30A and B show the sheet of the stiffener for the second embodiment of the transaction card, from front and side views, respectively.
Figure 30B:
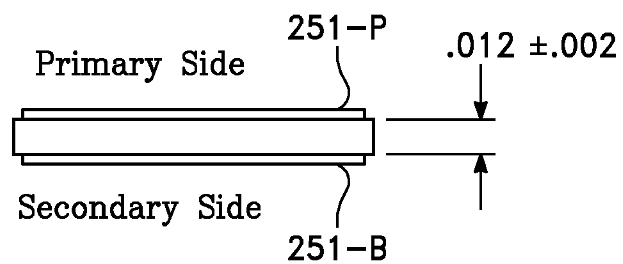

FIGS. 30A and B show the sheet of the stiffener layer 251 (1-6) in the form of a six unit sheet, for the second embodiment of the invention, from front and side views, respectively: This stiffener layer 251 is much like the one described above in FIGS. 13A and B. Laminate FR4 stiffener to PCB on primary side with prepreg material. Compensate prepreg PP to avoid run our of adhesive into open cavities areas. Bowing of PCB on open cavity areas of the stiffener is not allowed. PCB must be flat after lamination of stiffener to PCB. Boards are fabricated in accordance with IPC-A-600, class 2 and all other IPC applicable specs unless other specified. The board material is in accordance with IPC-4101/24 or 25 (such that Tg>150 C) and the color is generally, but not limited to Natural yellow. The board process is HSAL 0.0003" min.

Figure 32:
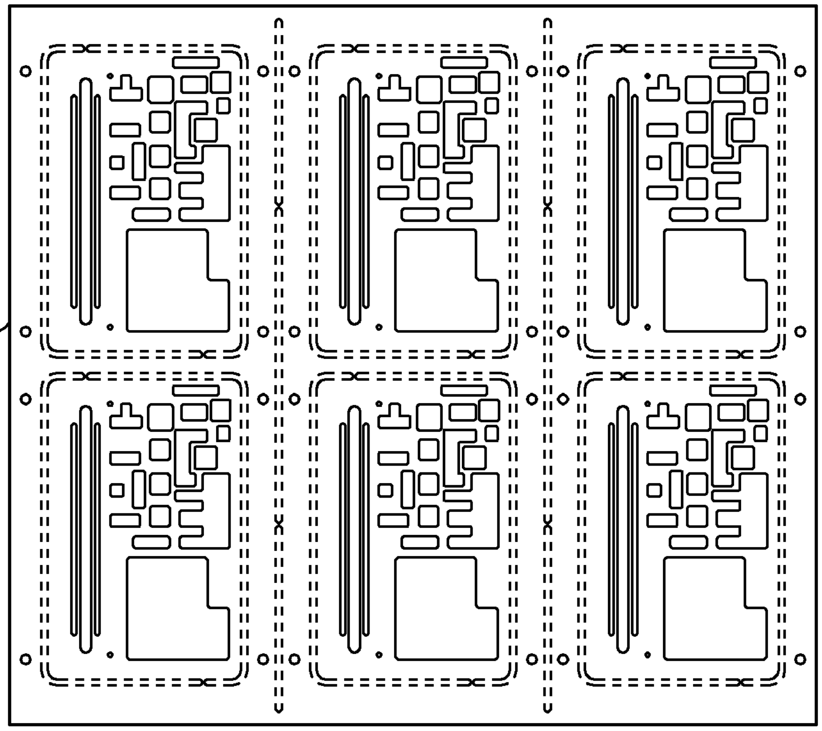
FIG. 32 illustrates the bottom of the stiffener for the second embodiment.
Figure 31:
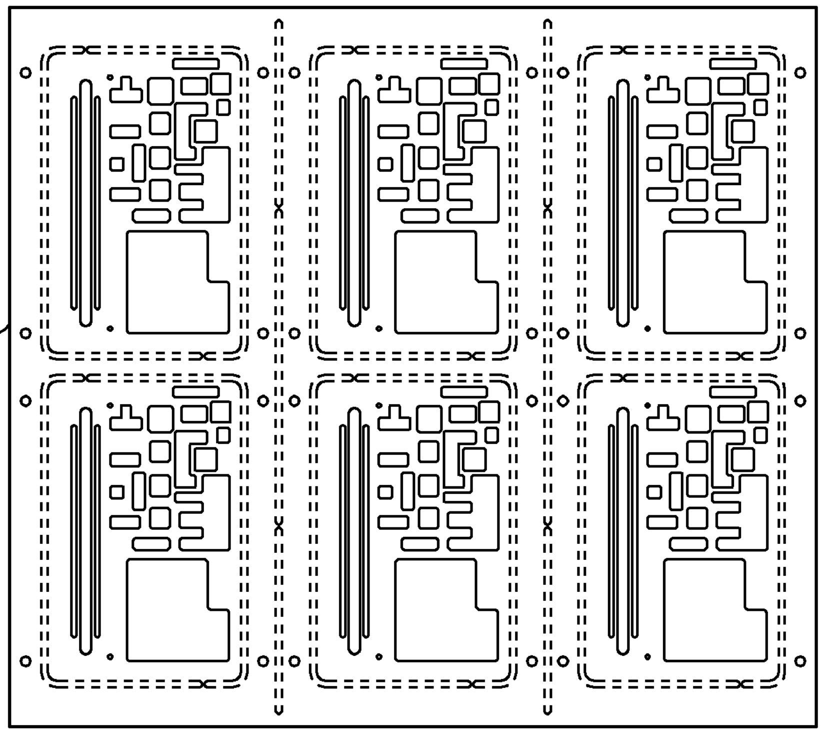
FIG. 31 illustrates the top of the stiffener layer for the second embodiment.

FIGS. 31 and 32 illustrate the primary or front 251-P(1-6) and bottom 251-B (1-6) layers of the stiffener layer 251, respectively, as manufactured in a six-unit sheet.

Figure 33:
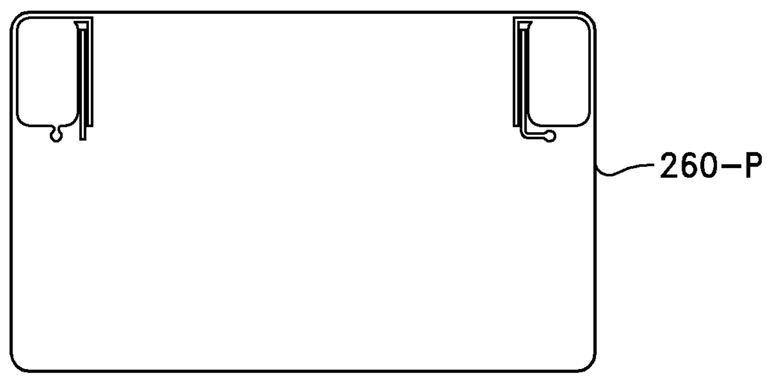
FIG. 33 illustrates the top layer of the cover for the second embodiment.
Figure 34:
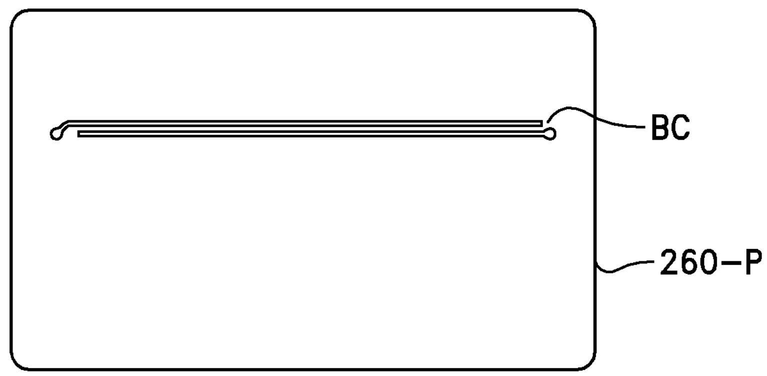
FIG. 34 illustrates the bottom layer of the cover for the second embodiment.

FIGS. 33 and 34 show the top 260-P and bottom 260-B of the outer layer 260, for the second embodiment, respectively.

FIG. 35 illustrates the detail of a sample 8-bit microprocessor U2 as it may be implemented in the second embodiment 253-A. In certain embodiments, other low-power processors can be used. However, as shown in the second embodiment, a Microchip 8-bit microcontroller model PIC16LF77 is used (see FIGS. 39A and B). The technical details of this microprocessor U2 are included in Appendix C of U.S. Ser. No. 60/675,388 which is specifically incorporated herein by reference. As can be appreciated by skilled artisans, the choice of particular microcontrollers must be informed by manufacturing, cost, and commercial use considerations. Therefore, other microcontrollers may replace this particular model, but must meet the practical requirements for use in the inventive transaction card 10.

FIG. 36 illustrates a sample processor U4 for a smart card interface. In particular embodiments, the processor is a Philips 6032 8-bit smart card microcontroller, the details of which are included in Appendix E and are incorporated by reference herein.

FIG. 37 shows a charge pump CP, and the surround connections 253-C, which may be implemented in the second embodiment 10 of the invention. In a preferred embodiment the charge pump is a Maxim Integrated Products model 1759. The details of the sample charge pump are included in Appendix F of U.S. Ser. No. 60/675,388, and are hereby incorporated by reference.

FIG. 38 shows various MOSFETs Q2 and Q3 which may be implemented, as well as a diode SD1.

Referring now to FIGS. 40A-42, a broadcaster coil assembly 242 for the first embodiment is shown. The material for the broadcaster coil assembly 242 is specifically designed for the facilitation the magnetic flux broadcast, and is made of a Cartech HYMU 80 CORE 109. FIGS. 40A-D illustrate four different views of the coil 174 for use in the assembly 242.

In preparing the coil 242 for assembly, it is important that the sharp edges be sanded and that the core winding 242W of the type as shown in FIGS. 41A-C are used. A sleeving type of stock number 10-1004-OOA is preferable and the sleeving length is 3.05+/−0.003. A heat-shrinkable sleeving is to be added to the core 242 prior to winding. The resistance of the 13.0+/−0.5 Ohms is preferable for the first embodiment and inductance is 2.5+/−20% mH. There should not be any short between the winding 174 and the core 242. The end of the coils 242E-242E are to be tacked into place with instant adhesive (not shown). Unlike the embodiment in FIG. 21A, the entire core 242 is to be dipped in polyurethane and heat cured.

Figure 42A:
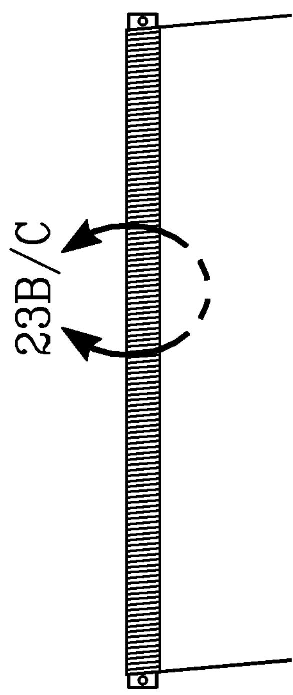
FIG. 42 illustrates characteristics of the winding of the broadcasting core in FIGS. 41A-D.
Figure 42B:
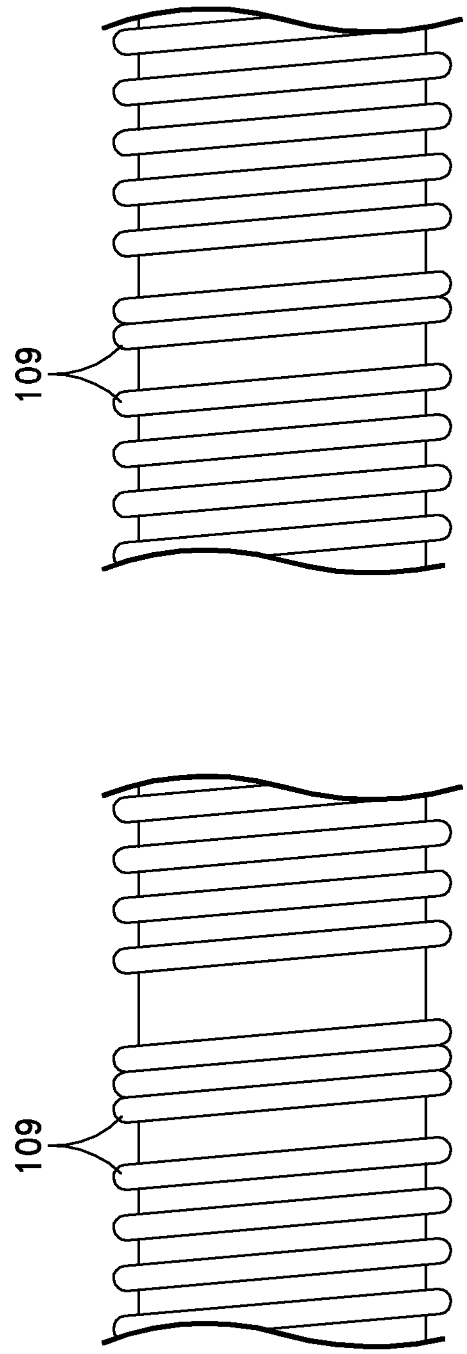
Figure 42C:
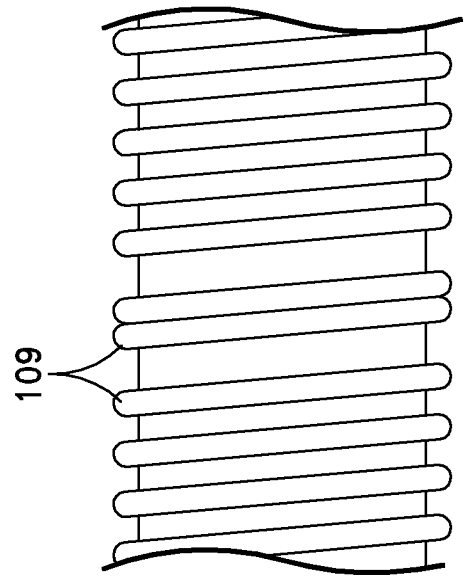

FIG. 42 illustrates the proper winding for the core material 174. The core should be wound with a right hand sense. In a preferred configuration of the first embodiment 44 wire gauge is used, turned 444 times with a 0.0045 pitch. As can be appreciated, the core should be free of defects.

Referring now to FIG. 43A, the adapter circuit RCAC is shown in a sample for the first embodiment 1, but can be used in any embodiment of the inventive transaction card.

Figure 43B:
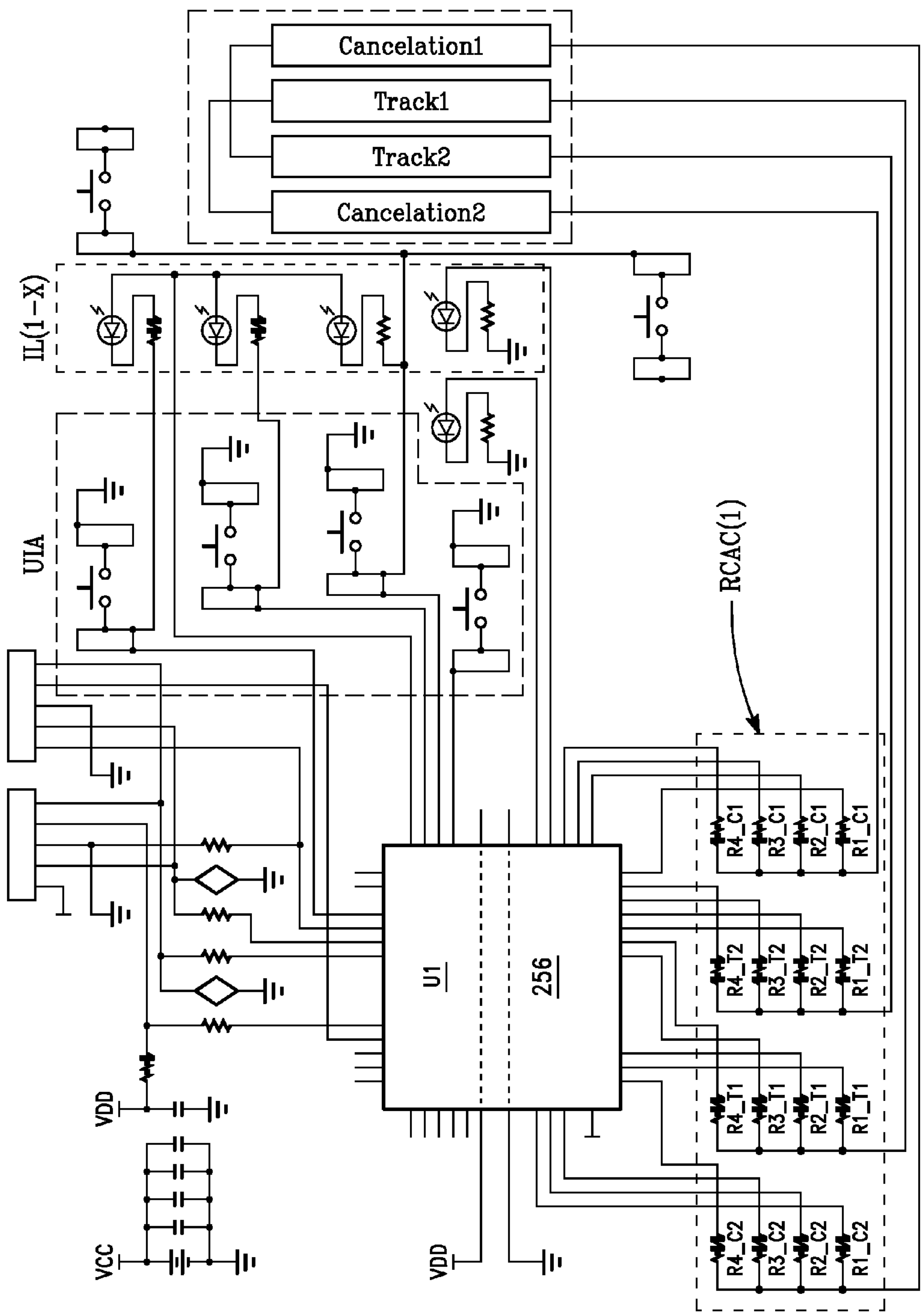
FIG. 43B illustrates a components of the RC adapter broadcasting circuit.
Figure 44:
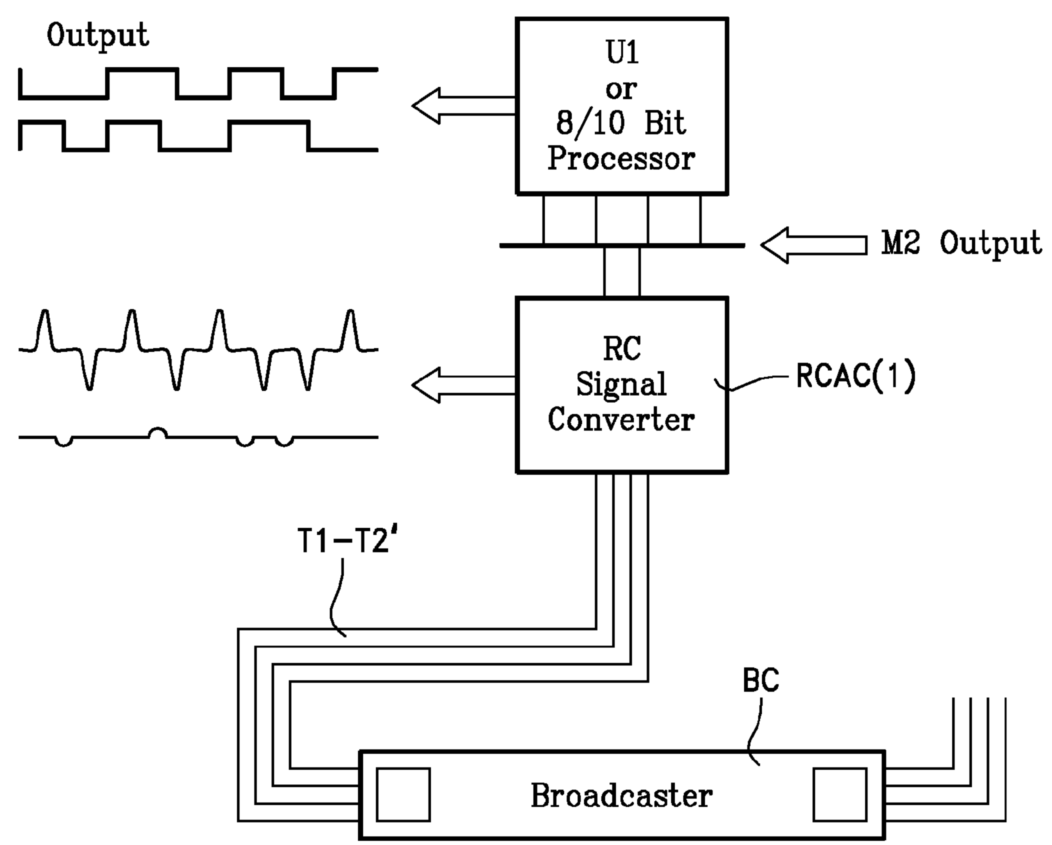
FIG. 44 illustrates a the functions of the components digital-to-analog adapter circuit.

A functional diagram of the RC adapter circuit RCAC is shown in FIG. 43B.

The present invention as embodied in the transaction card includes a device constructed of multiple proprietary components which essentially "broadcasts" the appropriate and industry compliant magnetic signals to the transaction reader when the card is properly placed. Please refer to FIGS. 45 and 46, below for a highly simplified description of the operation of the generation and broadcast of the waveform transform.

In a highly-simplified representation of the invention, the RC network outputs signals to a number of broadcast connections, represented by connections and circuit configurations T1, T1', T2 and T2' in the drawings. The circuit configurations are designed in order for the waveform signal to be properly converted into a magnetic broadcast when the signals pass through the broadcasting device.

Figure 45:
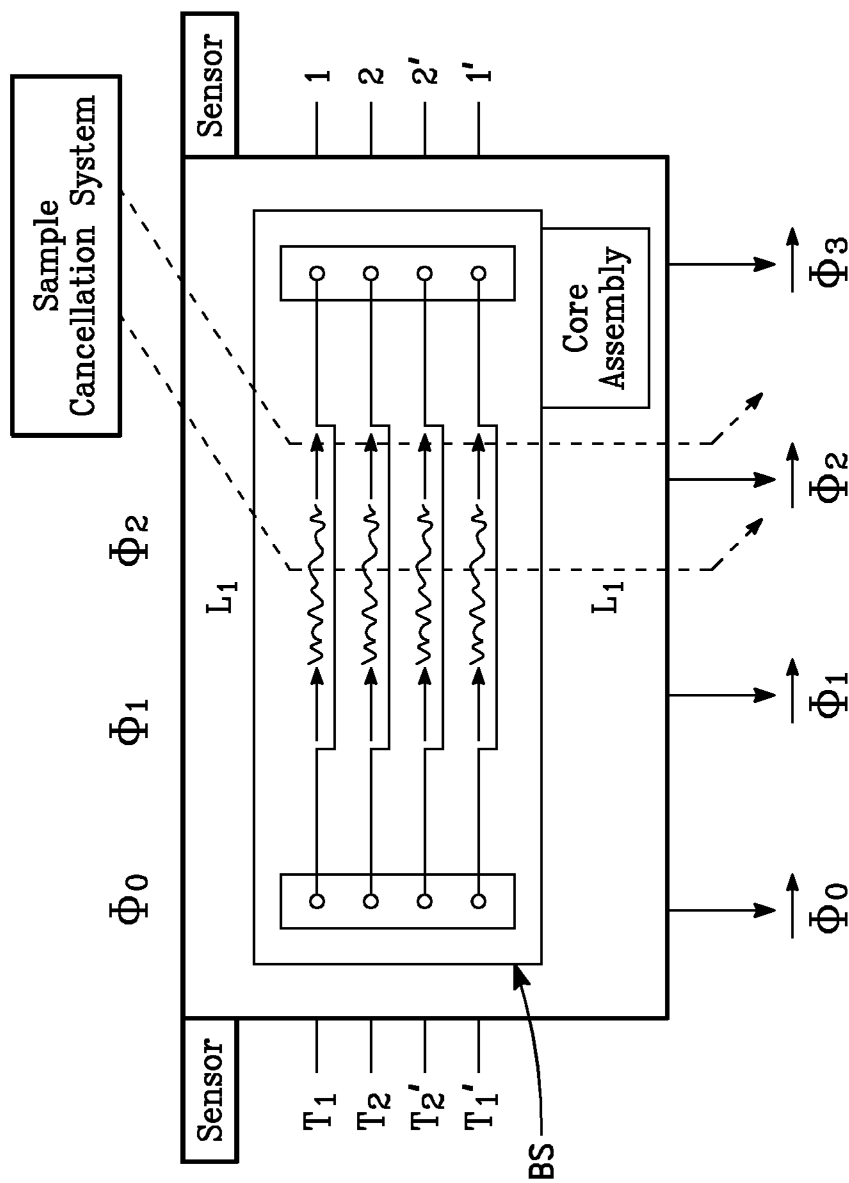
FIG. 45 illustrates functional details of the broadcaster coil assembly with two sets of complementary broadcasting tracks.
Figure 46:
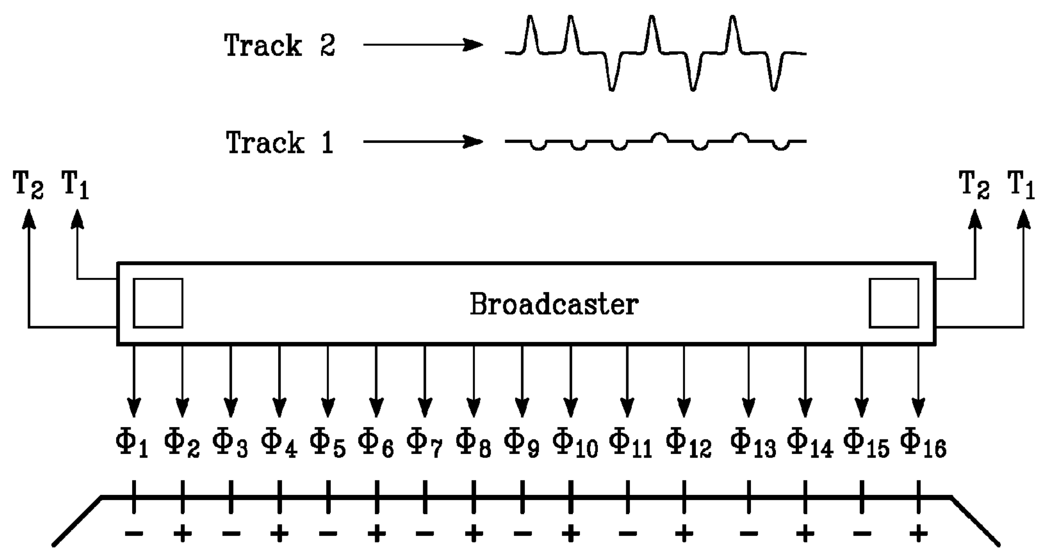
FIG. 46 shows a two-track magnetic stripe broadcaster coil card and two track magnetic read head in a point-of-transaction terminal with cross-talk flux illustrated in Track 1.

The output transaction waveform signal is converted to compliant magnetic flux reversal broadcast in the broadcaster. An illustrative diagram of the broadcaster BS is shown in FIG. 45 and includes a core of specialty material chosen for its magnetic permeability as well as other important chemically-related properties. This is discussed above in FIGS. 21A-23 and 40A-42. The core is surrounded by the multiple waveform circuit configurations made of another types of specialty material chosen for it electrical and magnetic properties. Together, the core, and the surrounding circuitry and the structures for attachment to the card may be considered a "flex encoder." Furthermore, in order to prevent cross-contamination "cross-talk" of the magnetic field broadcast, a cancellation structure is also included in the broadcast waveform generation device, the magnetic field(s) to be generated/broadcast is not to be operable or readable by the transaction device in the inventive transaction card system and the cancellation structure is not static.

The broadcaster also includes sensors SEN1 and SEN2 that determine when the inventive transaction card is being swiped. These sensors are connected to the processor U1 or U2 to activate the broadcast process.

Figure 47:
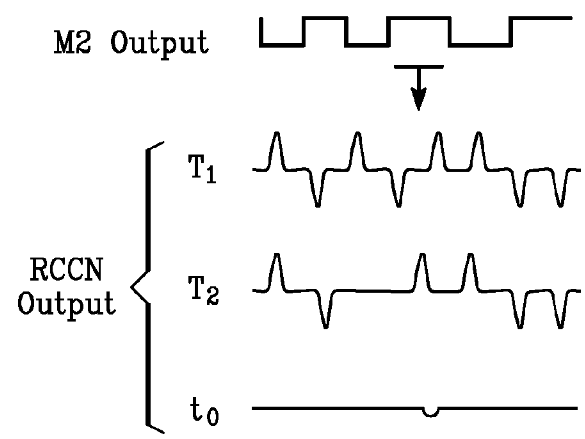
FIG. 47 shows a waveform transform in a first embodiment of the RC adapter broadcasting circuit.

FIG. 47 shows that the waveform signal passed through the broadcasting device generates a magnetic field at the appropriate detection locations on the reader. The Magnetic flux reversals are broadcast for an appropriately determined amount of time to ensure that the transaction is completed.

The broadcasted flux reversals are read by a conventional magnetic stripe reader and are then processed in exactly the same fashion as a conventional credit card number and credit cardholder name since such information can be sent to a credit card approval agent for approval of the transaction. The credit card approval agent has all of the information necessary to determine if the transaction is valid or fraudulent.

Figure 48:
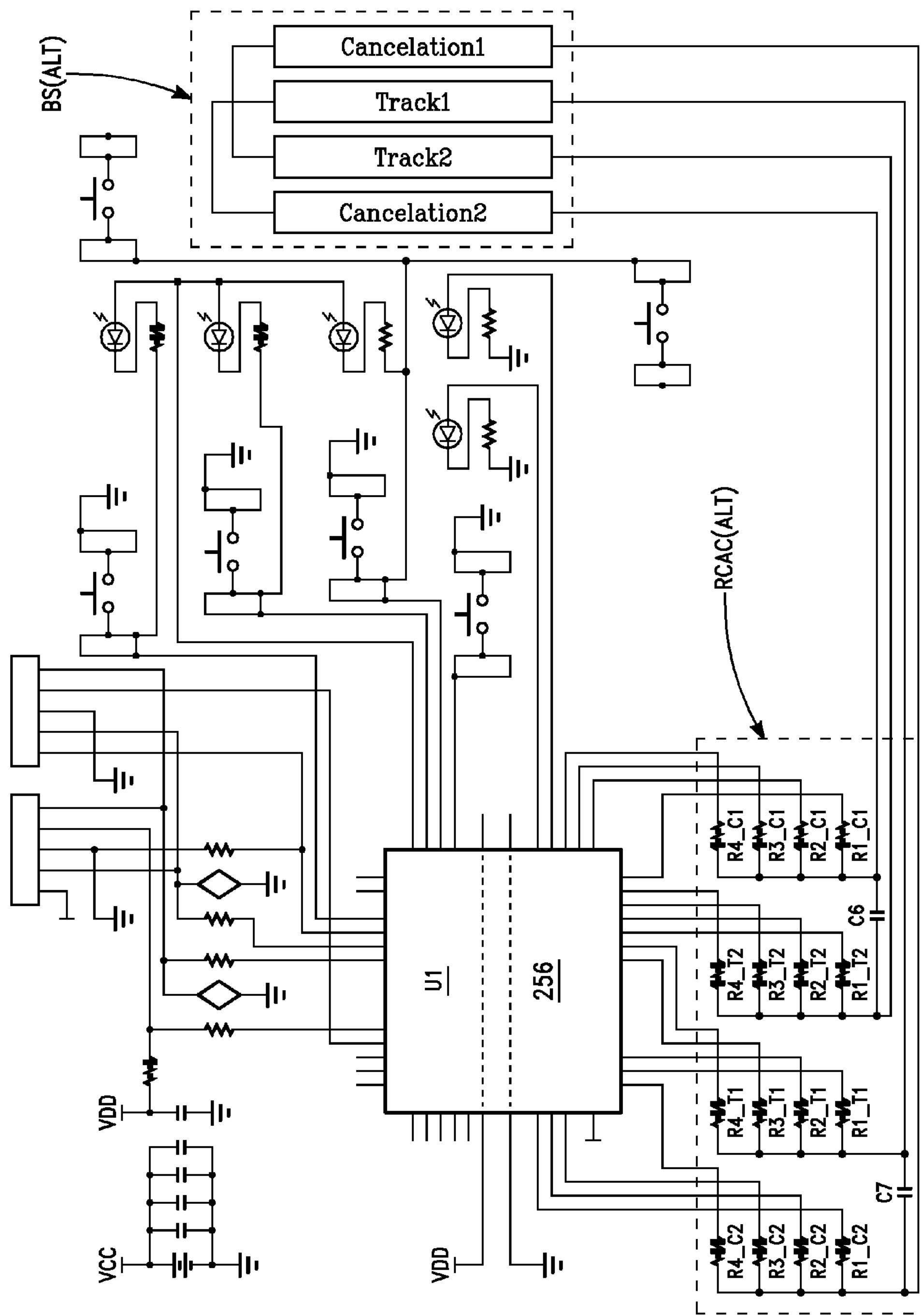
FIG. 48 illustrates a first alternate embodiment of the RC adapter broadcasting circuit.

A first alternate of the RC adapter circuit RCAC' is shown in FIG. 48. Many of the characteristics of this adapter circuit are similar to those shown in the first embodiment in FIGS. 43A and B, but with some important variations.

Figure 49:
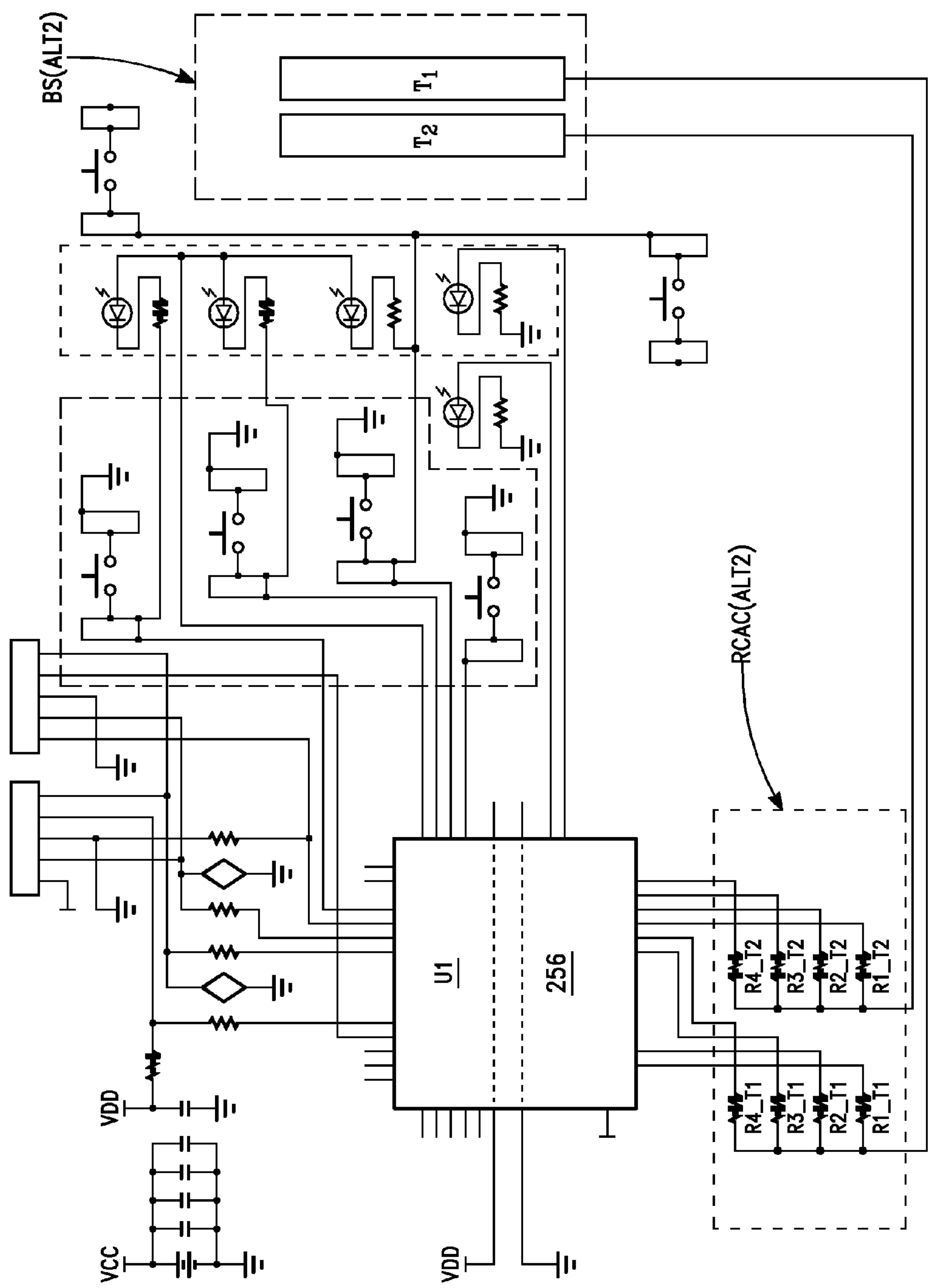
FIG. 49 illustrates a second alternate embodiment (non-cancellation) of the RC adapter broadcasting circuit.

A second alternate RC adapter circuit RCAC" is shown in FIG. 49 from primarily a functional perspective. The second alternative RC adapter circuit RCAC" does not use the "cancellation" tracks shown in FIGS. 39A-B, 43A-B and 44-48, but directed produces the desired magnetic signals from a two or more track system in the alternate broadcasting system BS'.

Figures 50A, 50B:
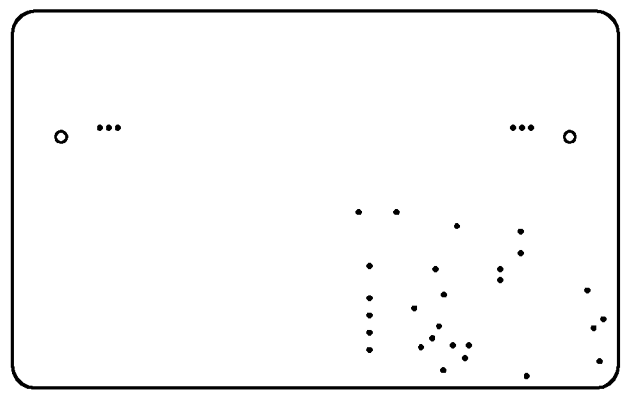
FIG. 50A illustrates an alternate embodiment of a printed circuit board, in which the features illustrated in FIG. 3 and FIG. 5 are integrated.
FIG. 50B shows the PCB layout in the alternate embodiment.

A printed circuit board (PCB) layer in an alternate embodiment 51 is shown in FIGS. 50A and B, from front and side views, respectively 51-PCB. The alternate embodiment implements features and configuration, as well as omits others, that are included in the first 1 and second 10 embodiments discussed above, in FIGS. 3-4; 6-23 and 5-6 and 7-40, respectively. FIG. 50B illustrates the positioning of the mask and top and bottom layer(s) in the circuit board for the alternate card 51*pcb*.

Figure 53:
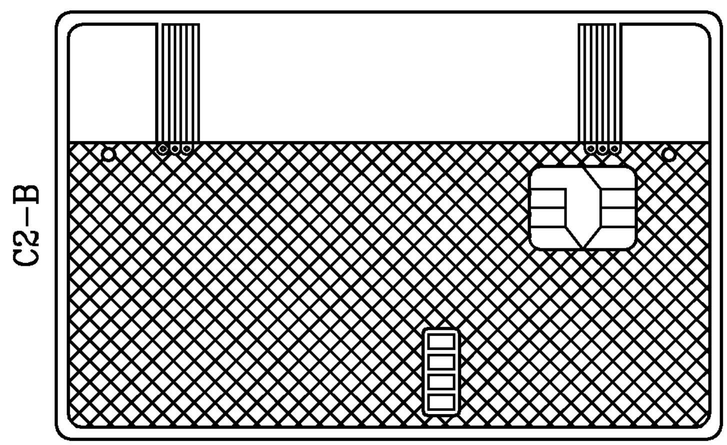
FIG. 53 illustrates the bottom layer of the PCB layer in the sample alternate embodiment.
Figure 52:
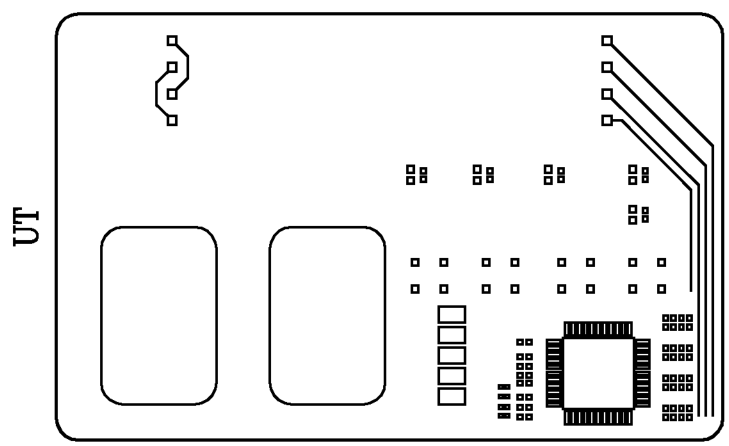
FIG. 52 illustrates the top layer of the PCB in the sample alternate embodiment.
Figure 51:
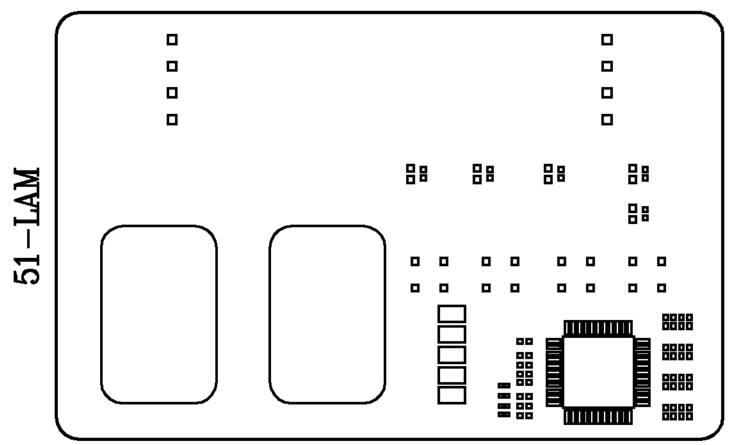
FIG. 51 illustrates the mask of the top layer of the PCB layer in the sample alternate embodiment.

FIG. 51 illustrates the layer 1 mask-51-L1-M. FIG. 52 shows the top layer 51-L1 for the alternate PCB and FIG. 53 shows the layer 2 bottom, 51-L2.

The magnetic field illustrated by the magnetic lines of flux generated by the broadcaster coil and is extended outward from the coil in continuous paths always passing thru the magnetic stripe broadcaster coil and then out into the space around the coil, re-entering the coil to complete the continuous path of flux lines. The flux lines have the greatest intensity at very close distances to the coil and decrease in strength and density as you move away form the coil. The greatest concentration of magnetic flux is both at the ends of the magnetic stripe broadcaster as well as all along the length of the coil. The magnetic flux lines (magnetic field) extend from the top and the bottom of the coil in opposite directions to complete their continuous paths. The flux lines intercepted by Track 1 magnetic read head add confusing noise at 75 bpi into the Track 1 decoding circuits and this needs to be avoided.

Of particular interest are the magnetic flux lines that are intercepted by the magnetic read head in the terminal. The magnetic read head contains a ferrite core that is very conductive to magnetic flux (low reluctance), much greater than the air and material surrounding the core of the magnetic read head. The magnetic flux near the gap in the magnetic read head is diverted from its path in free space to follow the more conductive path through the core of the magnetic read head. As such the magnetic flux passes through the magnetic read head coil and induces a voltage in the magnetic read head coil representing the time variation or strength variation in the magnetic field generating the magnetic flux. This changing pattern of voltage can be detected and decoded into binary zeroes and ones by the terminal detection circuits. This method of capturing magnetic flux in a magnetic read head and generating a time varying voltage representing the time varying magnetic field is well known in the industry. The magnetic stripe broadcaster in the inventive transaction card when powered by the battery and driven by a formatted data signal generated by the microprocessor is formatted to represent the F2F data of an encoded magnetic stripe; by the magnetic stripe broadcaster driver circuits will generate a time varying voltage in the magnetic read head of the terminal that will be decoded by the terminal decoding circuits into the binary digits of the encoded data just as if the data had come from a standard encoded magnetic stripe card. This allows the microprocessor, internal to the Enabled Card, to communicate with a standard magnetic stripe terminal using the standard magnetic read head in the terminal with no modifications to the terminal or the infrastructure of the existing magnetic stripe system. Thus the inventive transaction card acts as a Smart Card and can work within the extensive magnetic stripe point-of-transaction infrastructure with minimal procedural and cost impact.

The introduction of a second, third or more magnetic stripe broadcaster coils is possible using the Enabled Card microprocessor and power management system, additional magnetic stripe broadcaster coils could be added in similar fashion. With the addition of a second magnetic stripe magnetic read head for Track 1 and Track 1 decoded circuit in a two track point-of-transaction terminal, there exists the possibility of magnetic flux 523 from the Track 2 magnetic stripe broadcaster coil may be picked up by the Track 1 magnetic read head. The Track 1 detection circuits can detect this "leakage" flux and produce an analog signal that will be processed by the Track 1 F2F decoding. Typically the leakage flux detected by the Track 1 read head and amplified into an analog wave shape by the Track 1 detection electronics will be lower in amplitude from the "primary" flux. The "primary" flux is detected by the Track 2 magnetic read head and Track 2 detection amplifier electronics=into the analog wave shape=at 75 bpi but it is enough to confuse the Track 1 decoding circuits that are looking for encoded data at 210 bpi and not an induced 75 bpi signal from Track 2.

In a similar set of conditions, the Track 1 magnetic stripe broadcaster coil will produce magnetic flux that can leak into Track 2 magnetic read head of the point-of-transaction terminal. The Track 2 Detection circuits will detect the lower level leakage flux signal from the Track 2 magnetic read head and produce an analog wave form at 210 bpi. The analog wave form at 210 bpi will confuse the Track 2 decoded electronics which is looking for 75 bpi data from the magnetic stripe broadcaster coil located in the Track 2 location on the inventive transaction card.

In both cases, the decoded electronics of the point-of-transaction terminal could produce errors if the leakage or cross-talk magnetic flux from the magnetic stripe broadcaster coils in Track 1 and Track 2 locations in the card is high enough to be decoded as data at different bits per inch then what is expected in a standard Track 1 (210 bpi) and Track 2 (75 bpi) encoded magnetic stripe. The Enabled Card has a unique fix for this cross-talk flux leakage from magnetic coils which tries to emulate an encoded magnetic stripe. The transaction card uses a Helper Coils and phase related driver circuits to cancel out the cross-talk flux from Track 1 leaking into a Track 2 magnetic read head from cross-talk from Track 2 flux leaking into a Track 1 magnetic read head.

Since the Track 1 and Track 2 bit densities (210 bpi and 75 bpi respectively) are so different, the mixing of signals from both tracks magnetic flux in a magnetic read head will lead to decoding errors and the inability to read the data transmitted from the coil to the standard magnetic stripe point-of-transaction terminal. The transaction card uses the Helper Coils to cancel the leakage flux picked up by either Track 1 or Track 2 magnetic read heads in the point-of-transaction terminal and thereby avoids the problems of decoding errors and no-read conditions at the terminal. The microprocessor, power management and coil driver circuits, and the Helper Coil driver circuits act in conjunction to provide the magnetic stripe broadcaster coils and Helper Coils with the correct voltage and driver currents. These are represented by the F2F data wave shapes for broadcast from Track 1 and Track 2 magnetic stripe broadcaster coils. The shifted phase and amplitude voltages and currents to the Track 1 and Track 2 Helper Coils produce the analog wave shapes, which are detected by the Track 1 and Track 2 Detection Amplifiers in the point-of-transaction terminal.

Another embodiment of the Enabled Card with the magnetic trip switches is the use of the invention as a monitoring system to be able to identify what type of point-of-transaction terminal is being used to read the Enabled Card, called the Self-Monitoring System. The tripping of the leading and trailing magnetic trip switches by the passing by of the core of the Track 1 and Track 2 magnetic read head in the terminal produces two sets of pulses separated in time by the time it takes for the Enabled Card to move past the magnetic read head core designated T1 and T2 in block. The lead magnetic trip switch produces the first pulse sent to the microprocessor and the trailing magnetic trip switch produces the second pulse sent to the microprocessor. This timing sequence activation of both magnetic trip switches can only occur if the complete card is swiped or transported past the magnetic read head. This specific timing sequence tells the microprocessor that a complete lead edge to trail edge scan of the Enabled Card has been completed.

Another popular method of reading a magnetic stripe card is to use a dip reader or letterbox slot reader. Dip readers are popular at self-pay gasoline pumps where the card is read on the way into the read and on the way out. This double read gives the terminal two attempts to read the data on the card and provides greater reliability at the gasoline pump. In a dip reader, the entire card does not pass the read head. Only the data portion of the encoded stripe, block, is read in either direction allowing the user who is maintaining hand contact with the card to remove the card from the dip reader. The Enabled Card will produce a different set of magnetic trip switch pulses than those that are obtained in the swipe reader or motorized transport reader where the whole card length is passed in front of the magnetic stripe read head.

The inventive transaction card, when read in a dip reader, produces two sets of pulse signals from only the leading magnetic trip switch. The first pulse is from the leading magnetic trip switch with the insertion of the leading edge of the Enabled Card into the insertion reader. The second pulse is also from the leading magnetic trip switch as the card is removed in the outward direction from the dip reader. This unique set of pulses from the just lead edge magnetic trip switch allows the microprocessor to identify that the Enabled Card is being used in a dip read with only a partial transport of the magnetic stripe broadcaster coils passing the magnetic read head of the dip reader. The microprocessor can adjust the timing of the magnetic stripe broadcaster to accommodate this reading on the way into the dip magnetic read head gap of the magnetic read head and provide an additional read on the removal of the Enabled Card from the dip read past the magnetic read head. The two attempts at reading the data from the magnetic stripe broadcaster of the Enabled Card provides higher success read rates. The dip reader's use of a human hand to insert and remove the card from the reader would produce a lower number of successful reads if only one of the directions was read.

In a preferred embodiment of the overall operation of the inventive transaction card, the user first turns on the power to the transaction card 1 or 10, shown above, by pressing the ON key tactile switch button SB1. The microprocessor U1, U2 etc. will be activated and the battery BT power will be connected to the power management circuits PMCs. The power management will light the Power-ON indicator light PIL that provides the user with the indication that the transaction card 1 or 10 has been activated. If the power management sequence is not correctly activated then the Power-OFF/Error light PEL is turned on by the microprocessor U1, U2, which provides the user with the indication that the transaction card has not been activated and the Power-ON switch will need to be pressed again to turn on the card 1 or 10. Upon indication by the activated Power-ON light, the user can now select from one of three or more functional accounts using tactile switch buttons SB2, SB3, . . . . Once the user has selected which function or account they want to activate (for example credit, debit, or mileage points) the pressing of the corresponding tactile switch buttons SB2, SB3, tell the microprocessor which data and what data format is to be provided to the magnetic stripe broadcaster driver circuits BC. The selected function indicator light SB2, . . . is turned on, to indicate to the user which card 1 or 10, that the function or account has been activated. The power to the microprocessor U1, U2, . . . _, indicator lights ILs and other management functions have been in a reduced power mode during this initial activation phase. The user has a fixed period of time, as determined by the microprocessor program, to use the initially-powered card in a point-of-transaction terminal.

If the user or clerk at the point-of-transaction places the transaction card in a magnetic stripe swipe or transport reader, the movement of the card passing the read head activates the leading or trailing magnetic trip switches, depending on which way the card is inserted into the card swipe or transport. Once the magnetic trip switch is activated, the microprocessor/power management system turns on the full power of the battery to the magnetic stripe broadcaster coils and sends the selected formatted data/functions to the coils for broadcast to the magnetic read head of the point-of-transaction terminal. After activation of the chosen account function in block and if the Enabled Card does not encounter a magnetic read head within the allocated waiting time period, the time out function of the microprocessor, block sends a signal to the Power-OFF/Error indication light to turn on and to indicate to the user that the transaction card has been turned off. This process conserves battery power if the transaction card has not been placed in a point-of-transaction terminal. After the successful broadcast of the selected account data by the magnetic stripe broadcaster coils to the magnetic read head, the transaction card will wait again for a further manual input from the function button switches. When the microprocessor receives the signal from the magnetic trip switch the battery power is increased to full power to coils. The microprocessor and the signal processing circuits provides the Track 1 and Track 2 formatted data (accounts A1, A2 or A3) full power voltage wave shapes for the F2F code representing the respective accounts selected to the magnetic stripe broadcaster coils and the phase and amplitude shifted cancellation signals to the Helper Coil. The point-of-transaction terminal then utilizes the received signals as standard magnetic stripe data and processes the account information in the terminal and network to authorize the transaction as is commonly known in the industry.

If a function switch SB(x) is pressed again within the allocated waiting period then the operational sequence is begun again. If the waiting period is completed without an activation of a function button, then the power management system flashes the Power-Off indicator light and turns off the power to the microprocessor completing the use of the transaction card. The user can manually turn off the Enabled Card by pressing the Power-ON/OFF button at any time during the waiting period, which again flashes the Power-ON/OFF indicator light.

The disclosure of U.S. Ser. No. 60/675,388 included the disclosure of the following methods.

Method 1. A method for broadcasting transaction-based information from a transaction device embodied in a plastic card including the acts of: generating digital signals from a microprocessor; converting said digital signals from said microprocessor into at least two tracks of analog signal wave form; driving said first waveform signal on an analog track and driving said second waveform signal on a second analog track such that said first and second waveform signals cancel each other out, such that a simulated magnetic field is generated along a target area located on said transaction card.

Method 2. The method recited in Method 1, wherein said target area corresponds to a magnetic stripe area on a normal transaction card.

Method 3. The method recited in Method 1, wherein said first analog waveform is transmitted along two signal lines.

Method 4. The method recited in Method 1, wherein said second waveform is transmitted along two analog signal lines.

Method 5. The method recited in Method 1, wherein said target area includes a material capable of magnetic broadcasting.

Method 6. The Method recited in Method 5, wherein said material includes specialty copper.

Method 7. The method recited in Method 1, further compressing an activation staff, in which said previously defined steps are activated by a pressure mechanism located in said target area.

Method 8. The method recited in Method 7, wherein said target or activation area is activated by a user's grasp (sounds like) of the target area.

Method 9. The method recited in Method 1, wherein said broadcasting steps are activated by a user action.

Method 10. The method recited in Method 9, wherein said user action is pressing of a specialty button.

Method 11. The method recited in Method 9, wherein said user action is punching in a sequence on a numeric or alpha numeric key pad.

Method 12. The method recited in Method 1, wherein the broadcasting steps are activated by driving the card through a card swipe.

Method 13. The method recited in Method 1, wherein the said broadcasting steps are activated by placing the card in an automatic teller machine.

Method 14. A method for conducting a financial transaction over a communications network comprising a terminal, a payment network including a transaction authorization issuer, and a payment card having a chip, comprising:

storing on said card account information having a first portion readable by a first machine-readable technology and a second portion readable by a second different machine-readable technology, said stored account information including a payment account number, an expiration date, a service code, and wherein said chip maintains a transaction counter, and receives a terminal challenge number from the terminal;

securely storing on said chip a unique per-card cryptographic key;

supporting on said chip a cryptographic algorithm for calculating an authentication code using at least said key, said authentication code to be used for verification by said transaction authorization issuer;

wherein said authentication code is calculated using at least portions of said unique per-card cryptographic key, said account number, said expiration date, said service code, a value associated with said counter, and said challenge number, and employing both of said first and second technologies to capture said card account information for conducting said financial transaction.

Method 15. The method of Method 14, wherein said stored account information includes Track 2 data comprising said expiration date, said service code, and discretionary data, and wherein said chip is an RE chip which stores said Track 2 data.

Method 16. The method of Method 15, further comprising reformatting the discretionary data of said Track 2 data with said authentication code, said transaction counter, and said terminal challenge number; and making said reformatted data available for reading by said terminal.

The disclosure of U.S. Ser. No. 60/675,388 included the disclosure of the following cards.

A card for use in a financial transaction, that is capable of multi-standard operation, including the acts of: activating said card through an activation mechanism; driving a set of user data from a first secure microprocessor through a signal line to a second microprocessor; processing said data in said second microprocessor to generate a series of digital transaction signals; driving said transaction signals into a RC specialty circuit; converting said digital signals into two distinct analog waveform signals; driving said two sets of analog waveform signals along at least two tracks such that said first analog signal and said second analog signal cancel each other magnetically so that the resulting magnetic flux at a target broadcast area replicates the magnetic field created in a magnetic stripe.

An improved transaction card for use in a standard magnetic reader, wherein said improved card conforms to smart-card standards, said card including:

a first processor operative couples to a power supply and a second processor; at least two transmission lines connecting said second processor to an RC conversion;

at least two broadcasting lines connected to output from said RC conversion circuit and would around a strip of magnetic broadcasting enhancement material;

wherein said signals from second processor are converted in said RC conversion circuit such that when said converted signals are pulsed on said at least two broadcasting lines, magnetic flux patterns are present on said strip that simulates a static magnetic strip.

It should be noted that additional disclosure is set forth in the non-provisional application that claimed priority benefit from U.S. Ser. No. 60/675,388, the disclosure of which is set forth in U.S. Pat. No. 7,954,724. However, because the two disclosures are different, yet contain some overlapping material, inclusion of both disclosures in a single document would result in much duplication, with the potential for some confusion due to different numbering nomenclature and its use in connection with different figures. For this reason, the present application sets forth the entire disclosure of U.S. Ser. No. 60/675,388, without setting forth the entire disclosure set forth in U.S. Pat. No. 7,954,724. Still, U.S. Pat. No. 7,954,724 does provide additional disclosure relevant to understanding the present disclosure, such as some of the following examples.

The aforementioned embodiments for the coils teach winding a wire around a ferromagnetic core. In alternate embodiments, the coils can be made in other fashions. For example, coils can be made with various deposition, patterning, and etching techniques. As will be appreciated by those skilled in the art, a ferromagnetic core can be coated with an insulating film, and then coated with a conductive (usually metal) layer of, for example, copper or aluminum or alloys thereof by, by way of example and not limitation, sputtering and nano-sputtering techniques. A mask can then be applied to the conductive layer to define the coil, and portions of the conductive layer can be etched away to provide the windings. The mask can be made photolithographically, by spraying with, for example, ink jet technologies, or by other techniques well known to those skilled in the art. The etching can be accomplished with an acid which attacks the conductive layer but which is stopped by the insulating film. This method of coil production may have advantages in high-volume manufacturing situations.

For example, a ferromagnetic coil can be prepared and cleaned. An insulating and/or etch stop layer can be applied by a variety of techniques including, but not limited to, dipping, spraying, coating, sputtering, CVD, etc. A metal or other conductive layer can then be applied, again by a variety of techniques including, but not limited to, dipping, spraying, coating, sputtering, CVD, etc. A mask layer can be applied as a photolithographic material, by painting, printing, spraying, stenciling, etc., as will be appreciated by those skilled in the art. The etching of the conductive layer through the mask layer can be accomplished by a variety of techniques including, but not limited to, dipping, spraying, immersing, and plasma etching techniques. The mask layer is then removed, and a passifying layer may be applied to protect the coil assembly.

As will be appreciated by those skilled in the art, there are other ways to produce the effects of the "coils" of the broadcaster. For example, magnetic material can be lithographically sputtered to create the broadcaster coil effect. There are a variety of mass production techniques such as those noted above, by example, which will be apparent to those skilled in the art of semiconductor and micro-machine manufacturing.

The broadcaster may further include one or more sensors, which are electrically coupled to the general processor. These sensors are used to signal to the general processor that the physical act of swiping the card body through a legacy card reader has commenced. These sensors also communicate to the general processor when contact is lost with the magnetic stripe reader, which receives and interprets magnetic flux impulses from the broadcaster. Such sensors may take various forms including physical switches, pressure sensors or other alternatives which will be apparent to those of skill in the art. The broadcaster achieves its waveform subsequent to the activation of one or more sensors.

When used in a legacy Smart Card mode, the secure processor is powered by bus from a Smart Card reader device. The reader device can be used to program and personalize the secure processor with various information including, by way of example and not imitation, firmware code, account numbers, cryptographic keys, PIN numbers, etc. This information, once loaded into the secure processor, prepares the secure processor for an operational mode which no longer requires the use of the Smart Card reader device.

In this "independent" mode, the secure processor communicates with the general processor and provides services such as cryptographic functions and the dynamic generation of authentication information which is used to communicate via the general processor and the magnetic stripe emulator with a magnetic stripe reader. Also in this example, the authentication code may be used only once for a single transaction. Subsequent transactions require new authentication codes to be generated. The secure processor can also send account information and/or DACs via RF and IR.

In an alternative embodiment, the card body continues to be used with reader device a Smart Card reader device and also with a magnetic stripe reader device. In this alternate embodiment, the card detects the mode in which it is being used and automatically switches the usage of a bus appropriately for the detected mode of operation. This is achieved in an optional bus arbitrator. In other embodiments, there is no bus arbitrator. An optional bus arbitrator can detect when it is being used with a Smart Card reader device because power is provided by such a device via electrical connectors to a bus of the card. Similarly, an optional bus arbitrator can detect that power is being provided by the general processor and switch to the corresponding mode of operation, which services the general processor and the various I/O devices connected thereto. In yet another alternative embodiment, an optional bus arbitrator allows for the dynamic communication of both general and secure processors with each other respectively, and with a Smart Card reader device. This requires bus arbitration logic which is well known to those skilled in the art. In a further alternative embodiment, the general processor is interposed between the secure processor and electrical connectors so that the general processor acts as a "go-between" or a "front end" for the secure processor.

In another exemplary alternative embodiment, the general processor is comprised of an ASIC chip, which optionally includes one or more other components of an exemplary transaction card. For example, the ASIC assumes the role of buffering circuit as well as the duties of other components associated with a general processor in the previously disclosed embodiments. Further, the ASIC embodiment could, for example, produce adjusted waveforms for the track 1 and track 2 coils so that it is not necessary to include a track 1 cancellation coil or track 2 cancellation coil. For example, the ASIC could apply a correction to the amplitude and phase of the waveform of the track 1 coil because of the anticipated effect of magnetic flux interference from the track 2 coil. Likewise, a correction would be applied to the waveform for the track 2 coil, to cancel the effect of the track 1 coil. Also, when reference is made to providing something to "cancel" the "cross talk" effect, by "cancel" it is meant that the cross talk is at least significantly reduced.

Note that the corrections applied to the waveform may vary with time because the interference from the opposing broadcaster coil may vary with time (at different parts of the waveform). Thus, the correction constitutes two new waveforms for the two respective broadcaster coils of this exemplary embodiment. Note also that the correction waveform for a given broadcaster coil will itself cause interference with the opposing broadcaster coil, and vice versa.

In some additional exemplary embodiments, an additional correction is applied to compensate for the effect of the previous correction. In still further exemplary embodiments, one or more additional corrections are applied until the diminishing effect of interference becomes negligible as the series converges. Note that these corrections are performed in a computational manner before the corresponding portions of the waveforms reach the broadcaster.

In a further alternative embodiment, the crosstalk cancellation is performed in a linear RC circuit which outputs corrected waveforms to track 1 coil and track 2 coil. This RC circuit could be disposed within the exemplary ASIC described above or external to the ASIC. Again, this embodiment is provided by way of example and not limitation.

Although various embodiments have been described using specific terms, and devices, such description is for illustrative purposes only. The words used are words of description rather than of limitation. It is to be understood that changes and variations may be made by those of ordinary skill in the art without departing from the spirit or the scope of the present invention, which is set forth in the following claims. In addition, it should be understood that aspects of various other embodiments may be interchanged either in whole or in part. It is therefore intended that the claims be interpreted in accordance with the true spirit and scope of the invention without limitation or estoppel.

What is claimed is:

1. A process for conducting a transaction with an electronic card, comprising the steps of:

determining whether the transaction is being conducted with a smart card reader or with a magnetic stripe reader;

activating either a smart card reader mode if the transaction is being conducted with the smart card reader or a magnetic stripe reader mode if the transaction is being conducted with the magnetic stripe reader;

generating a transaction specific dynamic field of data within the electronic card which includes a single use authentication code; and either transmitting the transaction specific dynamic field of data to the smart card reader if the smart card reader mode is activated or transmitting the transaction specific dynamic field of data to the magnetic stripe reader by use of a magnetic stripe broadcaster only if the magnetic stripe reader mode is activated;

wherein the magnetic stripe broadcaster broadcasts a magnetic stripe signal that is a time varying and spatial varying magnetic field that is interpreted by a magnetic read head of the magnetic stripe reader as if originating from a standard magnetic stripe.

2. The process of claim 1 wherein the electronic card determines whether the transaction is being conducted with the smart card reader or with the magnetic stripe reader without use of a user input.

3. The process of claim 2 wherein the electronic card contains at least one sensor that detects the presence of a magnetic read head of the magnetic stripe reader that triggers activation of the magnetic stripe reader mode.

4. The process of claim 2 wherein the electronic card triggers activation of the smart card reader mode by physical contact between the electronic card and the smart card reader.

5. The process of claim 1 wherein the electronic card determines whether the transaction is being conducted with the smart card reader or with the magnetic stripe reader by use of a user input.

6. The process of claim 5 wherein the user input is provided by a user activation button.

7. The process of claim 6 wherein the user activation button is not a power on user input button.

8. The process of claim 1 wherein the electronic card is activated from a reduced power mode to a full power mode after either the smart card reader mode or the magnetic stripe reader mode is activated.

9. The process of claim 8 wherein the dynamic field of data is not generated until the full power mode is activated.

10. The process of claim 1 comprising the further step of selecting an account function from a plurality of account functions.

11. The method of claim 10 wherein the plurality of account functions includes at least one function from two different types of accounts selected from a group of different types of account functions comprised of a credit account, a debit account and a rewards points program account.

12. An apparatus, comprising:

a microprocessor that dynamically generates a transaction specific data packet;

at least one sensor for detecting a magnetic read head of a magnetic stripe reader;

a broadcaster that can broadcast a magnetic stripe signal that contains the transaction specific data packet;

a communications port that can communicate the transaction specific data packet to a smart card reader; and electronics for activating either a smart card reader mode in which the transaction specific data packet is communicated to the smart card reader or a magnetic stripe reader mode in which the magnetic stripe signal is broadcast to the magnetic stripe reader;

wherein the magnetic stripe signal is a time varying and spatial varying magnetic field that is interpreted by the magnetic read head of the magnetic stripe reader as if originating from a standard magnetic stripe; and wherein the electronic card is activated from a reduced power mode to a full power mode after either the smart card reader mode or the magnetic stripe reader mode is activated.

13. The apparatus of claim 12 wherein the electronic apparatus is a card compliant with a CR80 format.

14. The apparatus of claim 13 further comprising a user activation interface.

15. The apparatus of claim 14 wherein the user activation interface is not a power on user input button.

16. The apparatus of claim 15 wherein the user activation interface allows a user to select an account function from a plurality of account functions.

17. The apparatus of claim 16 wherein the plurality of account functions includes at least one function from two different types of accounts selected from a group of different types of account functions comprised of a credit account, a debit account and a rewards points program account.

18. The apparatus of claim 16 wherein a user display selection indicator indicates which of the plurality of account functions has been selected.

19. The apparatus of claim 16 further comprising a user communication output that provides a user with at least one piece of data necessary to complete a financial transaction involving the account function.

20. The apparatus of claim 12 wherein the transaction specific data packet is not generated until the full power mode is activated.

* * * * *